(12) United States Patent
Aiouaz et al.

(10) Patent No.: US 11,907,080 B1
(45) Date of Patent: Feb. 20, 2024

(54) BACKGROUND-OPERATION-BASED AUTONOMOUS COMPUTE STORAGE DEVICE SYSTEM

(71) Applicant: Dell Products L.P., Round Rock, TX (US)

(72) Inventors: Ali Aiouaz, Bee Cave, TX (US); Gaurav Chawla, Austin, TX (US); Leland W. Thompson, Tustin, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/969,769

(22) Filed: Oct. 20, 2022

(51) Int. Cl.
*G06F 11/14* (2006.01)
(52) U.S. Cl.
CPC ...... *G06F 11/1466* (2013.01); *G06F 2201/84* (2013.01)
(58) Field of Classification Search
CPC .......... G06F 3/061; G06F 3/0619; G06F 2212/7205; G06F 3/064; G06F 3/0604; G06F 3/0653; G06F 3/0688; G06F 3/0679; G06F 12/0246
See application file for complete search history.

(56) References Cited

U.S. PATENT DOCUMENTS

| 8,595,415 B2 | 11/2013 | Van Aken et al. |
| 2022/0188028 A1* | 6/2022 | Mesnier ................. G06F 3/067 |

* cited by examiner

*Primary Examiner* — Hau H Hoang
(74) *Attorney, Agent, or Firm* — Joseph Mencher

(57) ABSTRACT

An autonomous compute storage device system includes a computing device and a storage device that is coupled to the computing device. The storage device performs a first background operation for a storage subsystem that is included in the storage device and copies first data from the storage subsystem to a memory subsystem that is accessible to the storage device as part of the performance of the first background operation. If the storage device determines that a first autonomous compute signature matches the first data that was copied to the memory subsystem, it executes a first autonomous compute application to perform first compute operations that are associated with the first data that was copied to the memory subsystem during the performance of the first background operation and generate at least one first compute operation result.

20 Claims, 48 Drawing Sheets

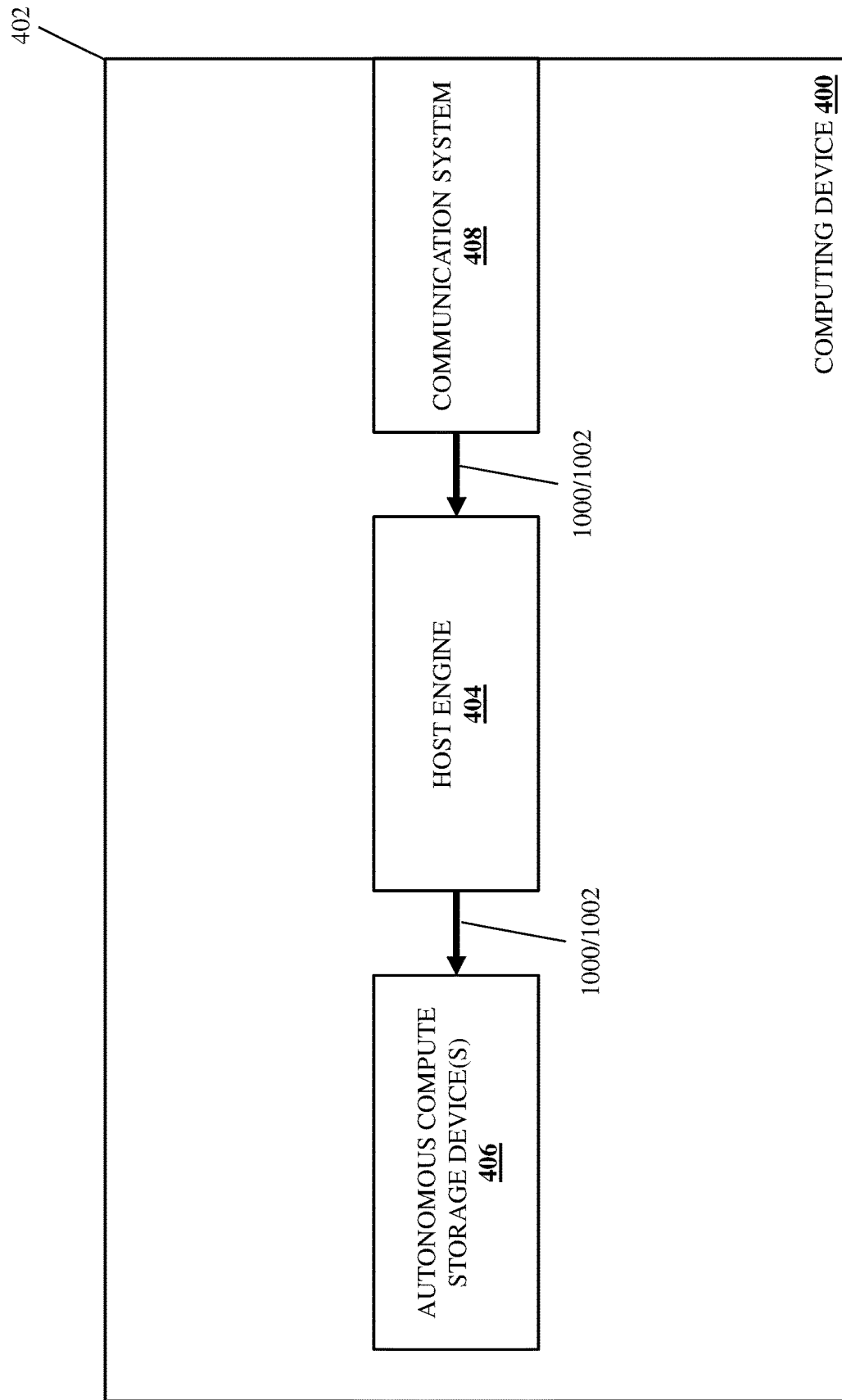

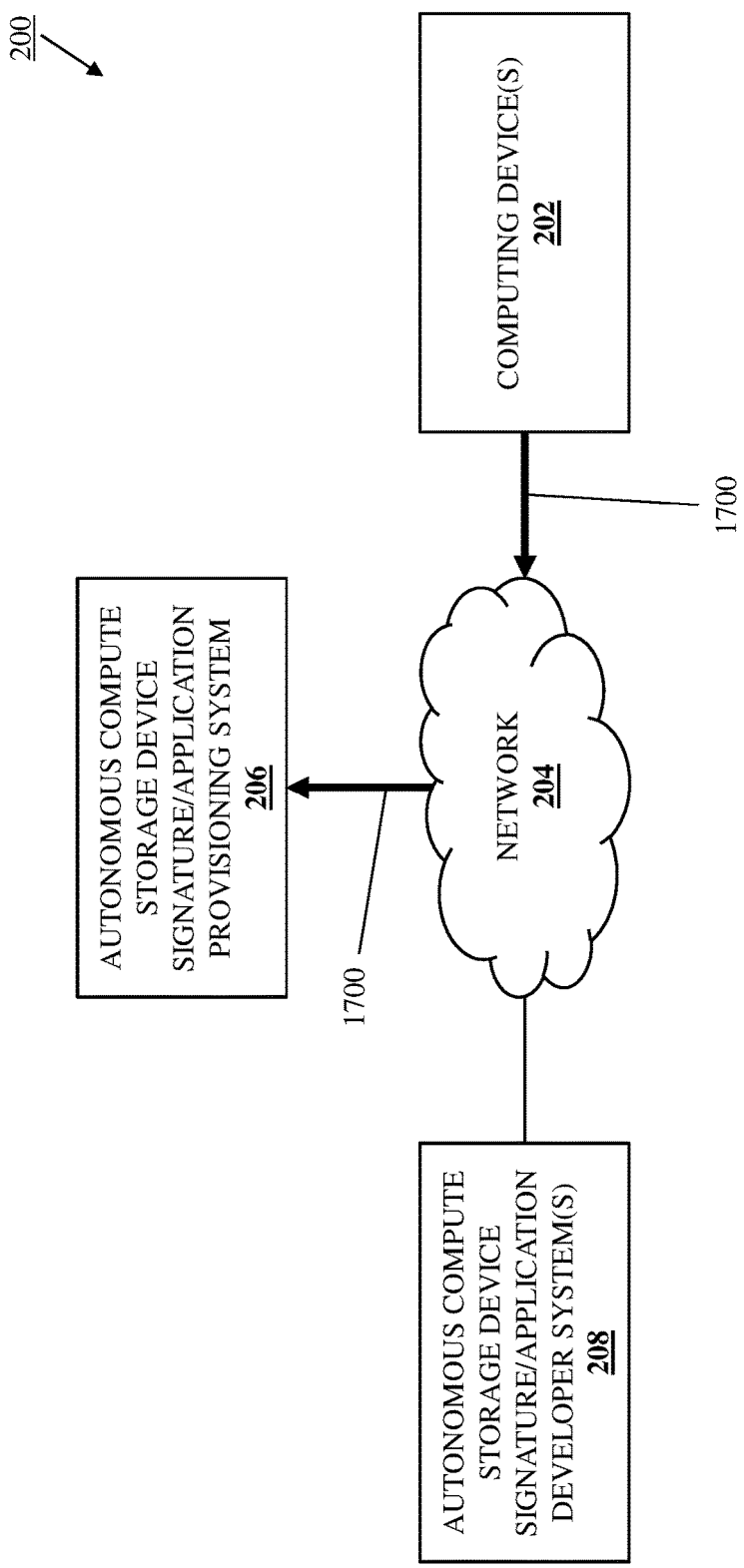

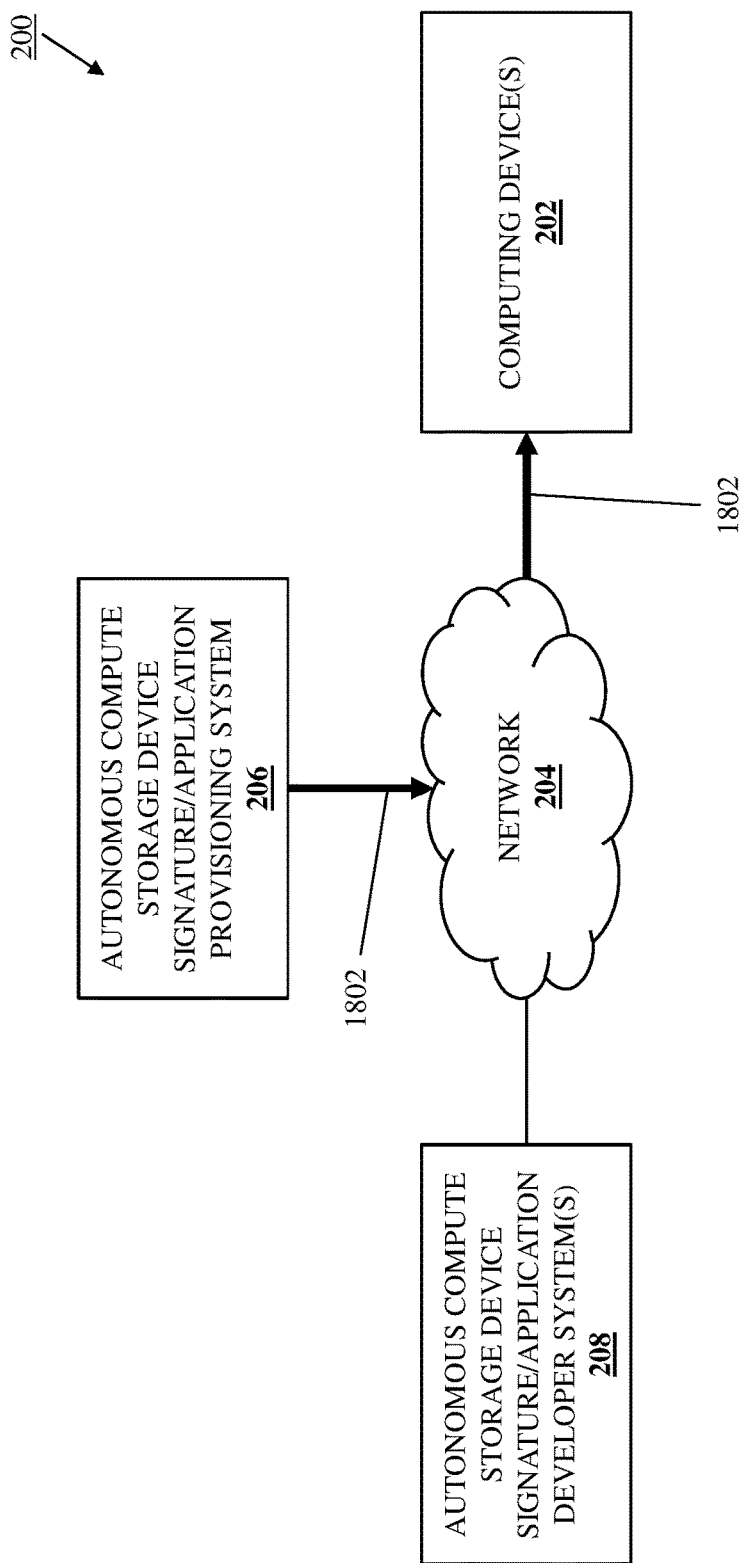

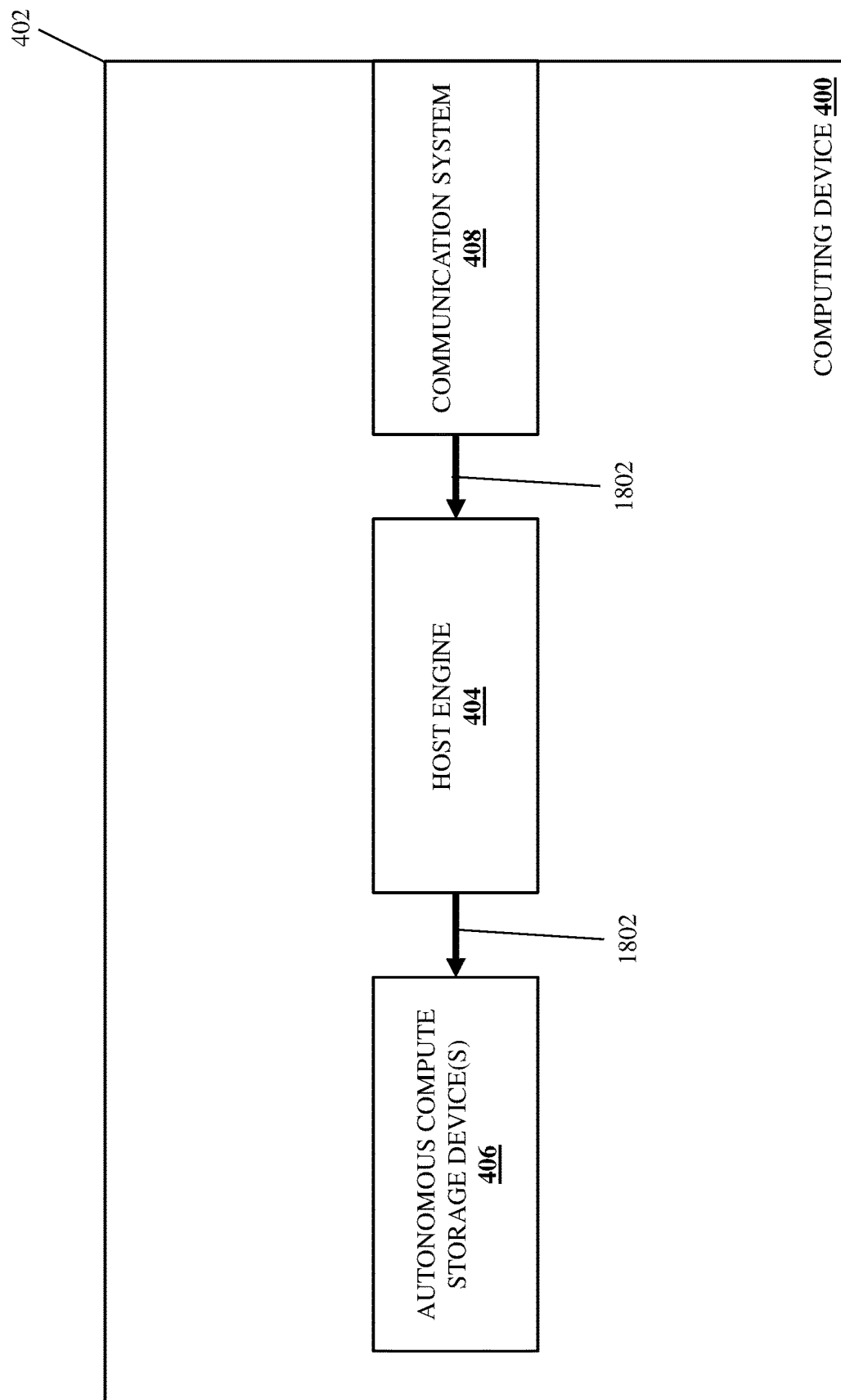

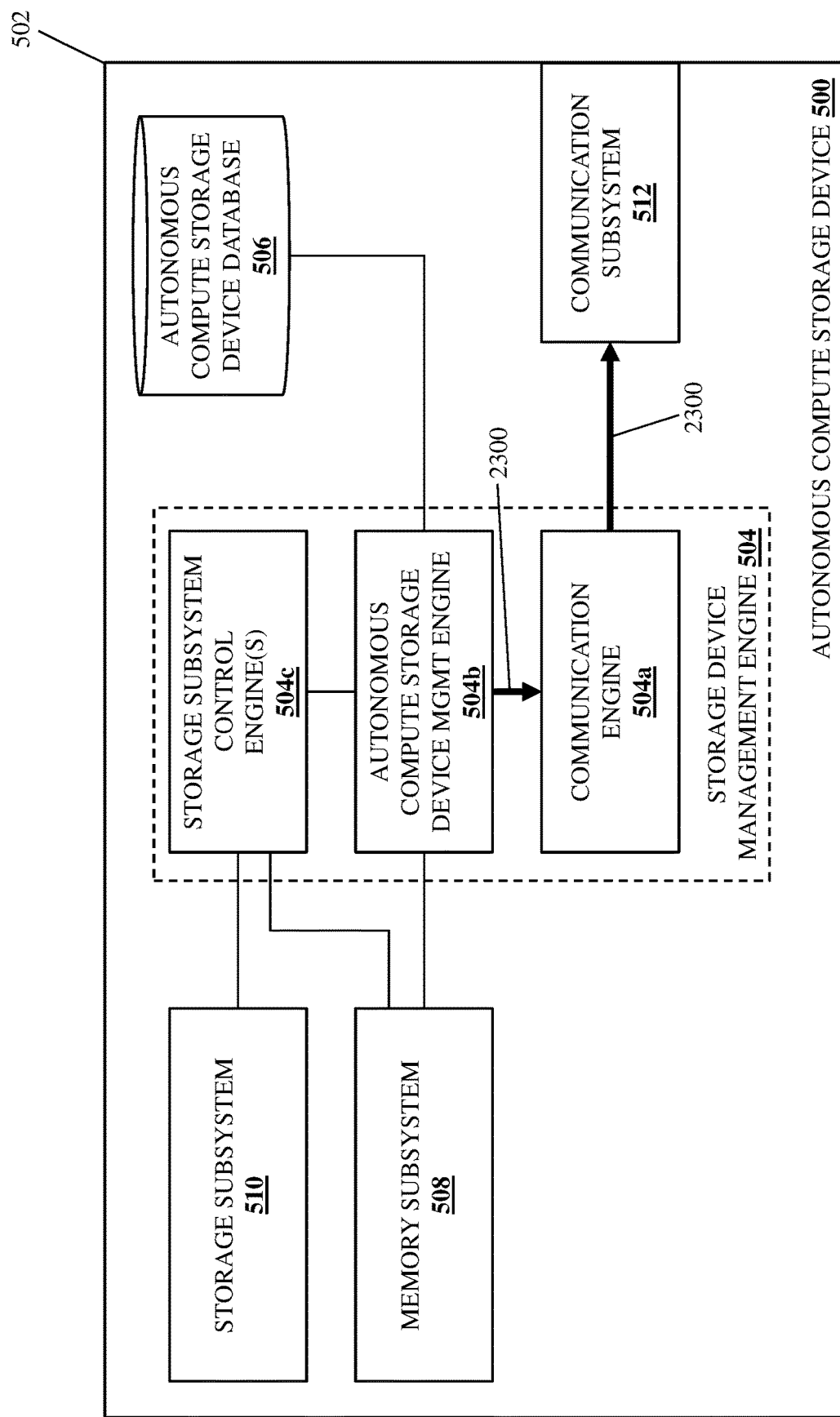

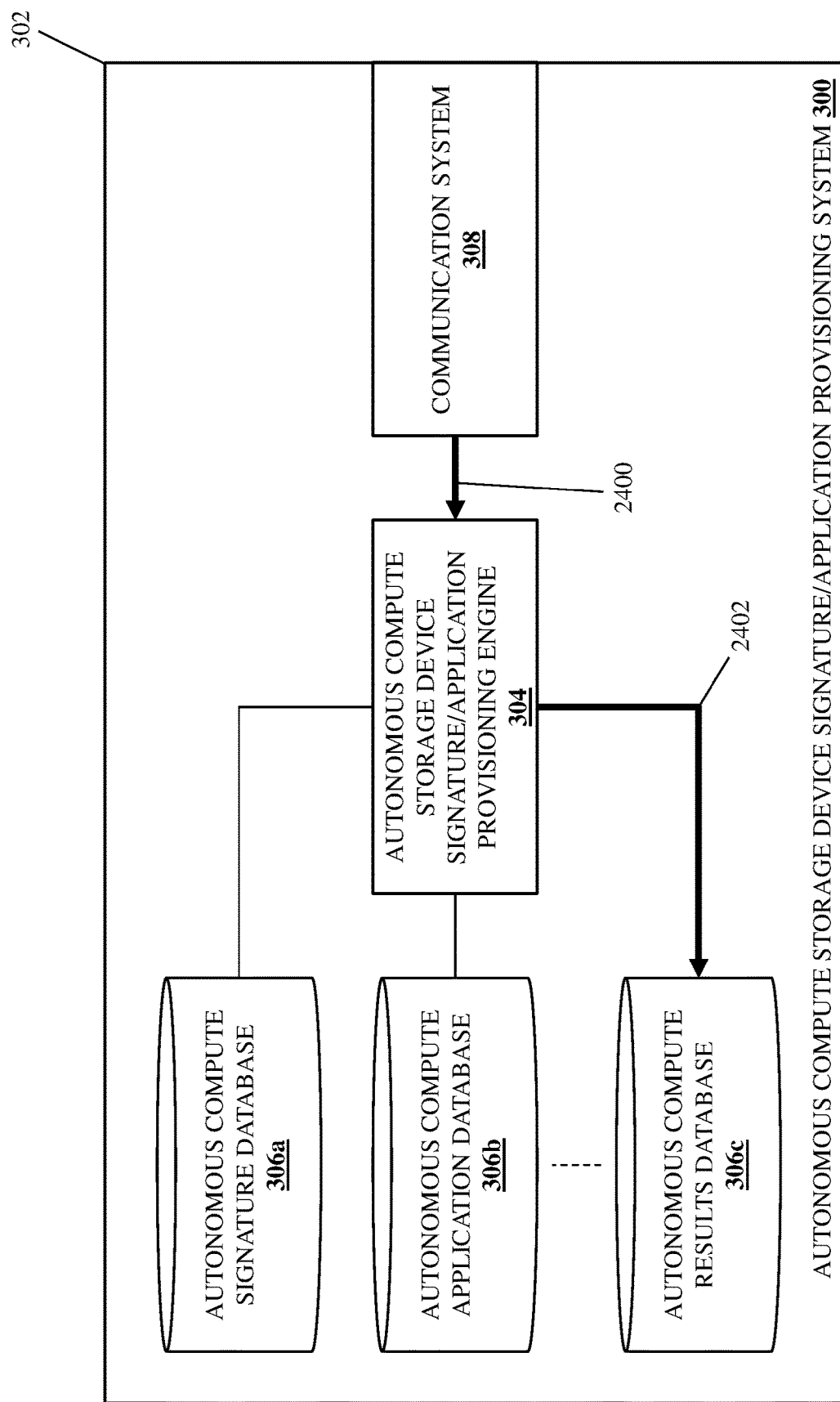

BACKGROUND-OPERATION-BASED AUTONOMOUS COMPUTE STORAGE DEVICE SYSTEM

BACKGROUND

The present disclosure relates generally to information handling systems, and more particularly to autonomously performing compute operations using storage devices included in information handling systems and based on background operations performed in those storage devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, have traditionally performed computing operations using a Central Processing Unit (CPU) or other "host" subsystem in the computing device. To provide one example, a CPU in a computing device may perform conventional compute operations by first receiving/retrieving data (e.g., receiving data from an application, retrieving data from a storage device, etc.) and writing that data to a memory system in the computing device, and then performing the compute operations on the data in the memory system. However, efforts to offload compute operations from the CPU are being developed. For example, the Non-Volatile Memory express (NVMe) Computational Storage Task Group is developing "computational storage" capabilities for NVMe storage devices that enable NVMe storage devices to offload compute operations from the CPU in the computing device in which they are used.

The computational storage systems discussed above generally require the CPU in the computing device to sequence the compute operation steps that offload the compute operations discussed above and then direct the storage device to perform those compute operation steps, and may include the CPU providing a storage device compute application on the storage device, reading data from its local persistent storage (e.g., NAND flash storage device) into a local memory in the storage device, instructing the start of the compute operations by the storage device, reading the results of the compute operation from the storage device, as well as other conventional CPU-directed computational storage operations known in the art. However, the inventors of the present disclosure have identified several issues with such conventional computational storage systems.

For example, the development of such conventional computational storage systems focuses on existing CPU compute operation paradigms and is primarily based on the modification of existing software, and requires identification of compute operation elements that may be offloaded from the CPU, as well as the creation of the storage device compute applications, command sequences, and other functionality required to enable those compute operation element offloads. Furthermore, conventional computational storage systems have a relatively limited set of developers due to the need to understand NVMe programming constructs, how data is stored and/or manipulated in the storage devices (e.g., a storage device stack in the storage device may perform data manipulation operations such as encryption, compression, etc.), where data is stored (e.g., particularly when data redundancy techniques such as Redundant Array of Independent Disks (RAID) are used), storage device implementation specifics (e.g., a type of processor included in the storage device), etc. Further still, the different capabilities of different storage devices present difficulties in making computational storage capabilities functional across different generations of devices or devices from different manufacturers, while presenting limitations on how those computational storage capabilities are implemented (e.g., due to storage size limitations on the number and/or size of storage device compute applications). Finally, different users and/or deployments may require storage device compute applications like those discussed above to be configured differently (e.g., a storage device compute application providing a particular computational storage capability (e.g., data filtering) may be provided in different deployments that require different deployment configurations for that storage device compute application).

Accordingly, it would be desirable to provide a computational storage system that addresses the issues discussed above.

SUMMARY

According to one embodiment, an Information Handling System (IHS) includes a storage device chassis; a storage device processing system that is included in the storage device chassis; and a storage device memory system that is included in the storage device chassis, that is coupled to the storage device processing system, and that includes instructions that, when executed by the storage device processing system, cause the storage device processing system to provide an autonomous compute storage device engine that is configured to: perform a first background operation for a storage subsystem that is included in the storage device chassis; copy, as part of the performance of the first background operation, first data from the storage subsystem to a memory subsystem that is accessible to the autonomous compute storage device engine; determine that a first autonomous compute signature matches the first data that was copied to the memory subsystem; and execute, in response to the determining that the first autonomous compute signature matches the first data that was copied to the memory subsystem during the performance of the first background operation, a first autonomous compute application to perform first compute operations that are associated with the first data that was copied to the memory subsystem during the performance of the first background operation and generate at least one first compute operation result.

BRIEF DESCRIPTION OF THE DRAWINGS

FIG. 10D is a schematic view illustrating an embodiment of the computing device of FIG. 4 operating during the method of FIG. 8.

FIG. 17C is a schematic view illustrating an embodiment of the networked system of FIG. 2 operating during the method of FIG. 11.

FIG. 18B is a schematic view illustrating an embodiment of the networked system of FIG. 2 operating during the method of FIG. 11.

FIG. 18C is a schematic view illustrating an embodiment of the computing device of FIG. 4 operating during the method of FIG. 11.

FIG. 23 is a schematic view illustrating an embodiment of the autonomous compute storage device of FIG. 5 operating during the method of FIG. 11.

FIG. 24C is a schematic view illustrating an embodiment of the autonomous compute storage device signature/application provisioning system of FIG. 3 operating during the method of FIG. 11.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
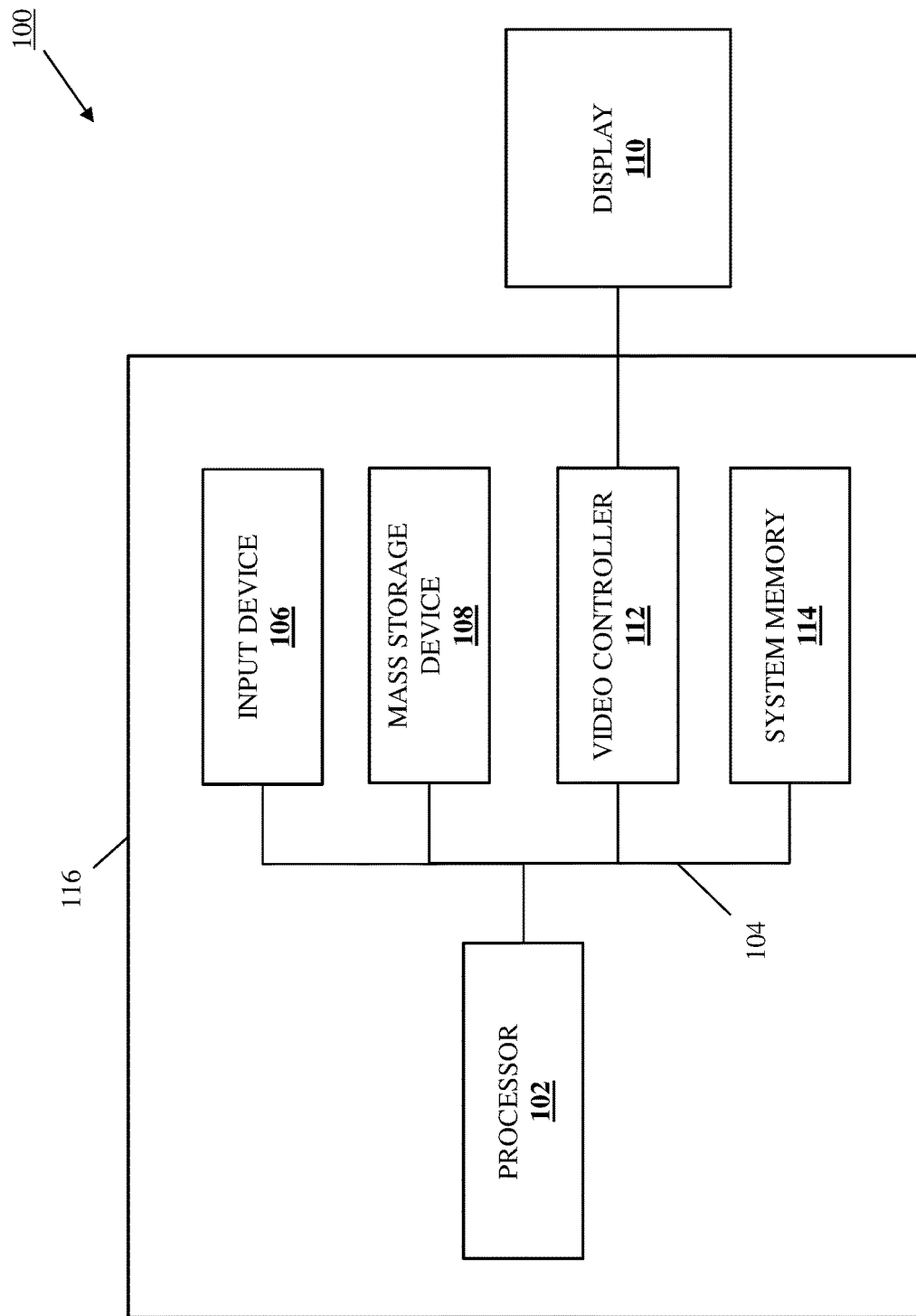
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
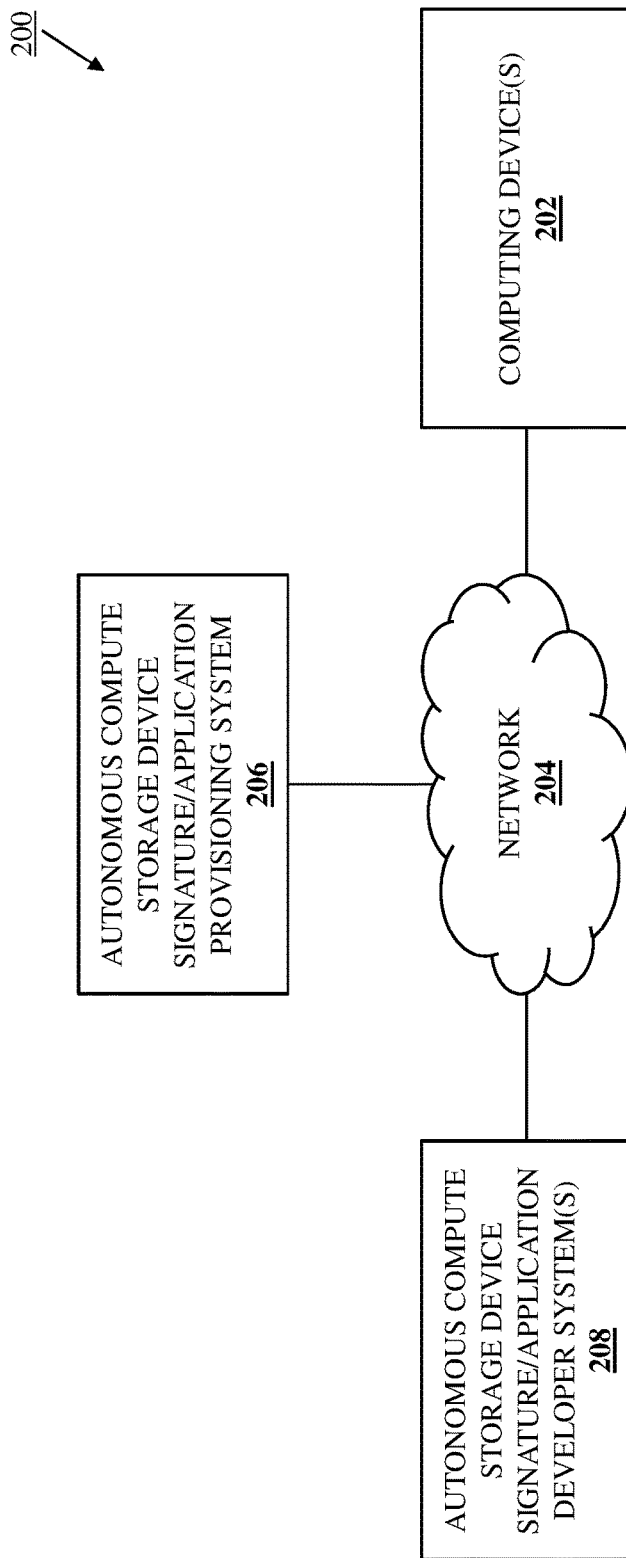
FIG. 2 is a schematic view illustrating an embodiment of a networked system that may provide the autonomous compute storage device system of the present disclosure.

Referring now to FIG. 2, an embodiment of a networked system 200 is illustrated that may provide the autonomous compute storage device system of the present disclosure. In the illustrated embodiment, the networked system 200 includes one or more computing devices 202. In an embodiment, the computing device(s) 202 may be provided by the IHS 100 discussed above with reference to FIG. 1, and/or may include some or all of the components of the IHS 100, and in specific examples may include server devices, desktop computing devices, laptop/notebook computing devices, tablet computing devices, mobile phones, and/or other computing devices that would be apparent to one of skill in the art in possession of the present disclosure. However, while illustrated and discussed as being provided by particular computing devices, one of skill in the art in possession of the present disclosure will recognize that the autonomous compute storage devices of the present disclosure may be provided in a variety of systems or devices that are configured to operate similarly as the computing device(s) 202 discussed below.

As illustrated, the computing device(s) 202 may be coupled to a network 204 that may be provided by a Local Area Network (LAN), the Internet, combinations thereof, and/or other networks that would be apparent to one of skill in the art in possession of the present disclosure. Furthermore, in the illustrated embodiment, an autonomous compute storage device signature/application provisioning system 206 is coupled to the network 204. In an embodiment, the autonomous compute storage device signature/application provisioning system 206 may be provided by the IHS 100 discussed above with reference to FIG. 1, and/or may include some or all of the components of the IHS 100, and in specific examples may include one or more server devices. However, while illustrated and discussed as being provided by server devices, one of skill in the art in possession of the present disclosure will recognize that the autonomous compute storage device signature/application provisioning system of the present disclosure may be provided in a variety of systems or devices that are configured to operate similarly as the autonomous compute storage device signature/application provisioning system 206 discussed below.

As described in further detail below, the autonomous compute storage device signature/application provisioning system 206 may provide an autonomous compute storage device application store ("app store") that is accessible via the network 204 by autonomous compute storage device(s) in the computing device(s) 202 to retrieve the autonomous compute storage device signatures and autonomous compute storage device applications for utilization in providing the autonomous compute functionality described below. As such, in the illustrated embodiment, one or more autonomous compute storage device signature/application developer systems 208 are coupled to the network 204. In an embodiment, the autonomous compute storage device signature/application developer system(s) 208 may be provided by the IHS 100 discussed above with reference to FIG. 1, and/or may include some or all of the components of the IHS 100, and in specific examples may include desktop computing devices, laptop/notebook computing devices, and/or other computing devices that would be apparent to one of skill in the art in possession of the present disclosure. However, while illustrated and discussed as being provided by particular computing devices, one of skill in the art in possession of the present disclosure will recognize that the autonomous compute storage device signature/application developer system(s) of the present disclosure may be provided in a variety of systems or devices that are configured to enable the autonomous compute storage device signature/application development required to develop the autonomous compute storage device signatures and autonomous compute storage device applications described below.

For example, the autonomous compute storage device signature/application developer system(s) 208 may be utilized to develop any autonomous compute storage device signature/application combinations described below that allow the autonomous compute storage devices of the present disclosure to perform any of the autonomous compute functionality described below, and then publish, transmit, and/or otherwise provide those autonomous compute storage device signature/application combinations via the network 204 to the autonomous compute storage device signature/application provisioning system 206. The autonomous compute storage devices of the present disclosure may then register with the autonomous compute storage device signature/application provisioning system 206 and subscribe, download, and/or otherwise retrieve autonomous compute storage device signature/application combinations needed to perform desired autonomous compute functionality. As such, a variety of autonomous compute functionality may be developed by "third-party" developers and then made available to autonomous compute storage devices via an autonomous compute storage device app store using the networked system 200 illustrated in FIG. 2.

However, while a specific networked system 200 has been illustrated and described, one of skill in the art in possession of the present disclosure will recognize that the autonomous compute storage device system of the present disclosure may be provided using a variety of components and/or component configurations while remaining within the scope of the present disclosure as well. For example, rather than having the autonomous compute storage devices connected to the autonomous compute storage device signature/application provision system 206 via the network 204 as illustrated in FIG. 2, the autonomous compute storage device signature/application provisioning system of the present disclosure may be included in a computing device (e.g., a server device) with the autonomous compute storage devices that use it in order to provide a "localized app store" for those autonomous compute storage devices (e.g., a localized app store enabled by a CPU in that server device for the autonomous compute storage devices in that server device).

Figure 3:
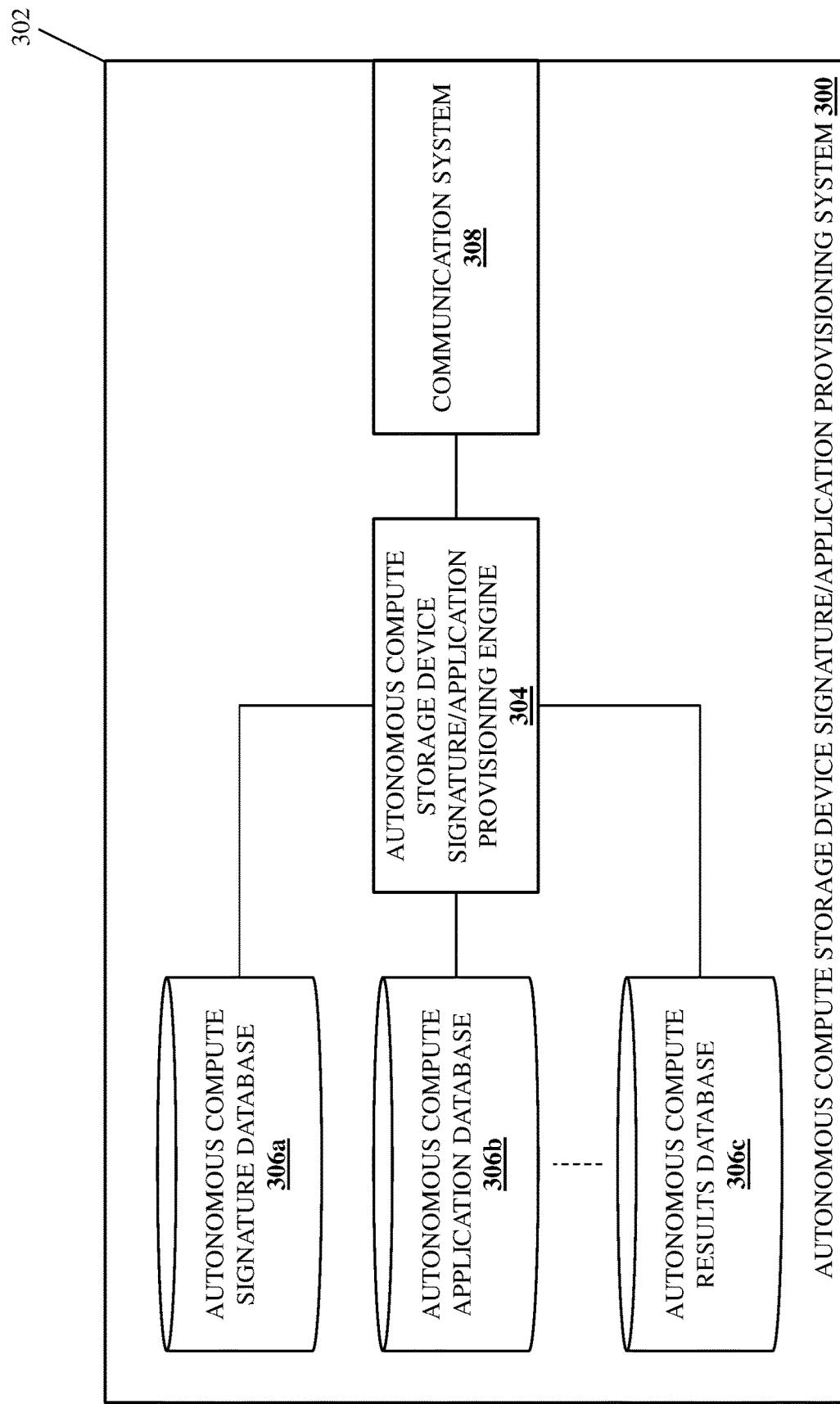
FIG. 3 is a schematic view illustrating an embodiment of an autonomous compute storage device signature/application provisioning system that may be included in the networked system of FIG. 2.

Referring now to FIG. 3, an embodiment of an autonomous compute storage device signature/application provisioning system 300 is illustrated that may provide the autonomous compute storage device signature/application provisioning system 206 discussed above with reference to FIG. 2. As such, the autonomous compute storage device signature/application provisioning system 300 may be provided by the IHS 100 discussed above with reference to FIG. 1 and/or may include some or all of the components of the IHS 100, and in specific examples may be provided by one or more server devices. However, while illustrated and discussed as being provided by server device(s), one of skill in the art in possession of the present disclosure will recognize that the functionality of the autonomous compute storage device signature/application provisioning system 300 discussed below may be provided by other devices that are configured to operate similarly as the autonomous compute storage device signature/application provisioning system 300 discussed below.

In the illustrated embodiment, the autonomous compute storage device signature/application provisioning system 300 includes a chassis 302 that houses the components of the autonomous compute storage device signature/application provisioning system 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an autonomous compute storage device signature/application provisioning engine 304 that is configured to perform the functionality of the autonomous compute storage device signature/application provisioning engines and/or autonomous compute storage device signature/application provisioning systems discussed below.

The chassis 302 may also house a storage system (not illustrated, but which may include the storage 108 discussed above with reference to FIG. 1) that is coupled to the autonomous compute storage device signature/application provisioning engine 304 (e.g., via a coupling between the storage system and the processing system) and that may include a plurality of databases that are configured to store any of the information utilized by the autonomous compute storage device signature/application provisioning engine 304 discussed below. For example, an autonomous compute signature database 306a may be configured to store the autonomous compute signatures discussed below as being provided to autonomous compute storage devices by the autonomous compute storage device signature/application provisioning engine 304, an autonomous compute application database 306b may be configured to store the autonomous compute applications discussed below as being provided to autonomous compute storage devices by the autonomous compute storage device signature/application provisioning engine 304, and up to an autonomous compute results database 306c may be configured to store the autonomous compute results discussed below as being received by the autonomous compute storage device signature/application provisioning engine 304 from autonomous compute storage devices. However, while a plurality of databases are illustrated and described, one of skill in the art in possession of the present disclosure will appreciate how any of those databases may be combined while remaining within the scope of the present disclosure. Furthermore, while particular databases storing particular data are illustrated and described, one of skill in the art in possession of the present disclosure will appreciate how other databases may store other data utilized by the autonomous compute storage device signature/application provisioning engine 304 while remaining within the scope of the present disclosure as well.

The chassis 302 may also house a communication system 308 that is coupled to the autonomous compute storage device signature/application provisioning engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific autonomous compute storage device signature/application provisioning system 300 has been illustrated and described, one of skill in the art in possession of the present disclosure will recognize that autonomous compute storage device signature/application provisioning systems (or other systems operating according to the teachings of the present disclosure in a manner similar to that described below for the autonomous compute storage device signature/application provisioning system 300) may include a variety of components and/or component configurations for providing conventional functionality, as well as the functionality discussed below, while remaining within the scope of the present disclosure as well.

Figure 4:
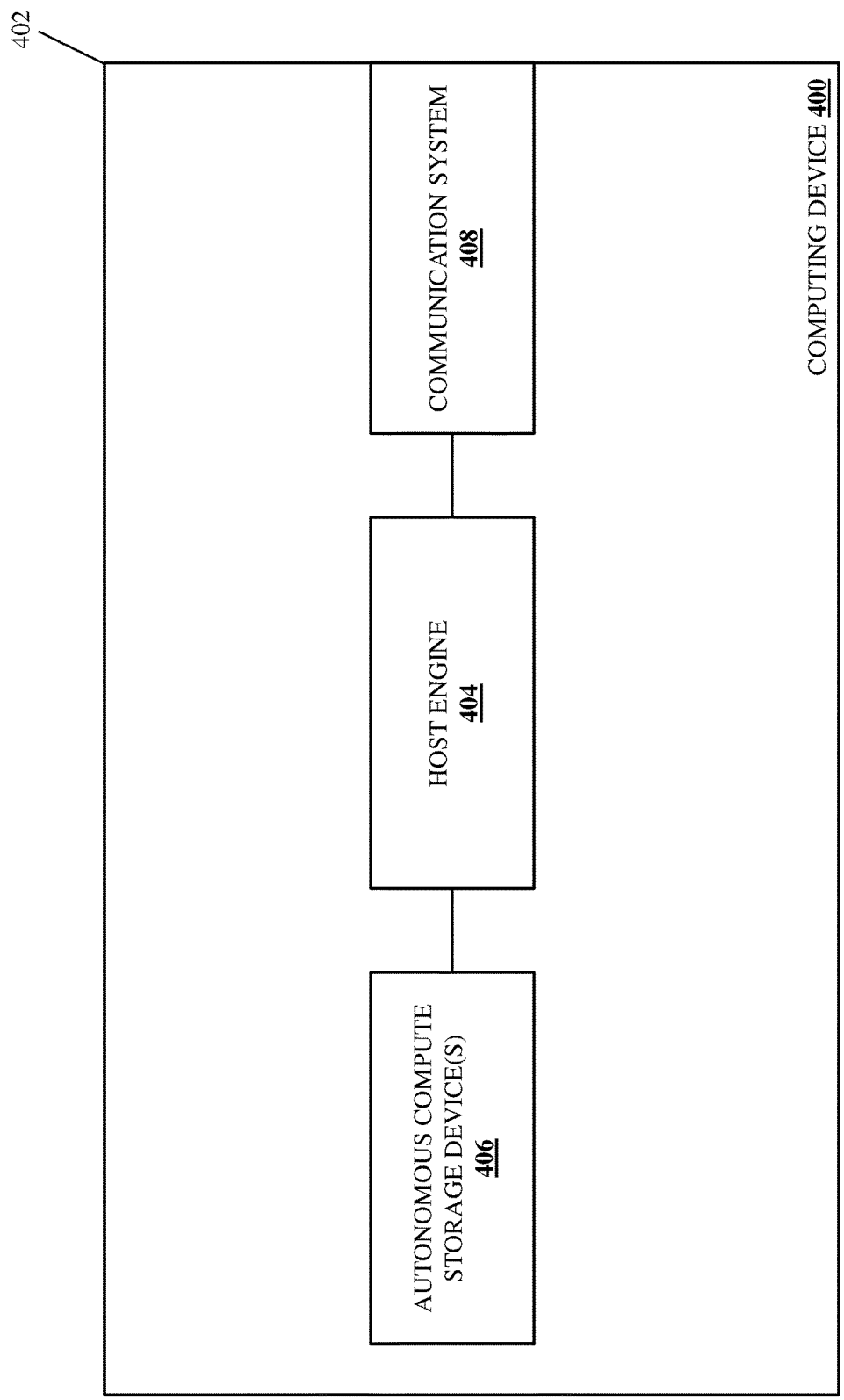
FIG. 4 is a schematic view illustrating an embodiment of a computing device that may be included in the networked system of FIG. 2.

Referring now to FIG. 4, an embodiment of a computing device 400 is illustrated that may provide any of the computing device(s) 202 discussed above with reference to FIG. 2. As such, the computing device 400 may be provided by the IHS 100 discussed above with reference to FIG. 1 and/or may include some or all of the components of the IHS 100, and in specific examples may be provided by a server device, desktop computing device, laptop/notebook computing device, tablet computing device, mobile phone, and/or other computing devices that would be apparent to one of skill in the art in possession of the present disclosure. However, while illustrated and discussed as being provided by particular computing devices, one of skill in the art in possession of the present disclosure will recognize that the functionality of the computing device 400 discussed below may be provided by other devices that are configured to operate similarly as the computing device 400 discussed below.

In the illustrated embodiment, the computing device 400 includes a chassis 402 that houses the components of the computing device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a host engine that is configured to perform the functionality of the host engines and/or computing devices discussed below. For example, as would be appreciated by one of skill in the art in possession of the present disclosure, the host engine 404 may be enabled by a Central Processing Unit (CPU) and is described below as providing read instructions and/or write instructions, but one of skill in the art in possession of the present disclosure will recognize that the host engine 404 may perform a variety of other host functionality while remaining within the scope of the present disclosure as well.

In the illustrated embodiment, the chassis 402 also houses one or more autonomous compute storage devices 406 (e.g., that may provide the storage 108 discussed above with reference to FIG. 1) that are coupled to the host engine 404 (e.g., via a coupling between the autonomous compute storage device(s) 406 and the processing system) and that may be provided according to the teachings of the present disclosure. The chassis 402 may also house a communication system 408 that is coupled to the host engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 400 has been illustrated and described, one of skill in the art in possession of the present disclosure will recognize that the autonomous compute storage devices of the present disclosure may be included in other devices or systems that include a variety of components and/or component configurations for providing conventional functionality, as well as the functionality discussed below, while remaining within the scope of the present disclosure as well.

Figure 5:
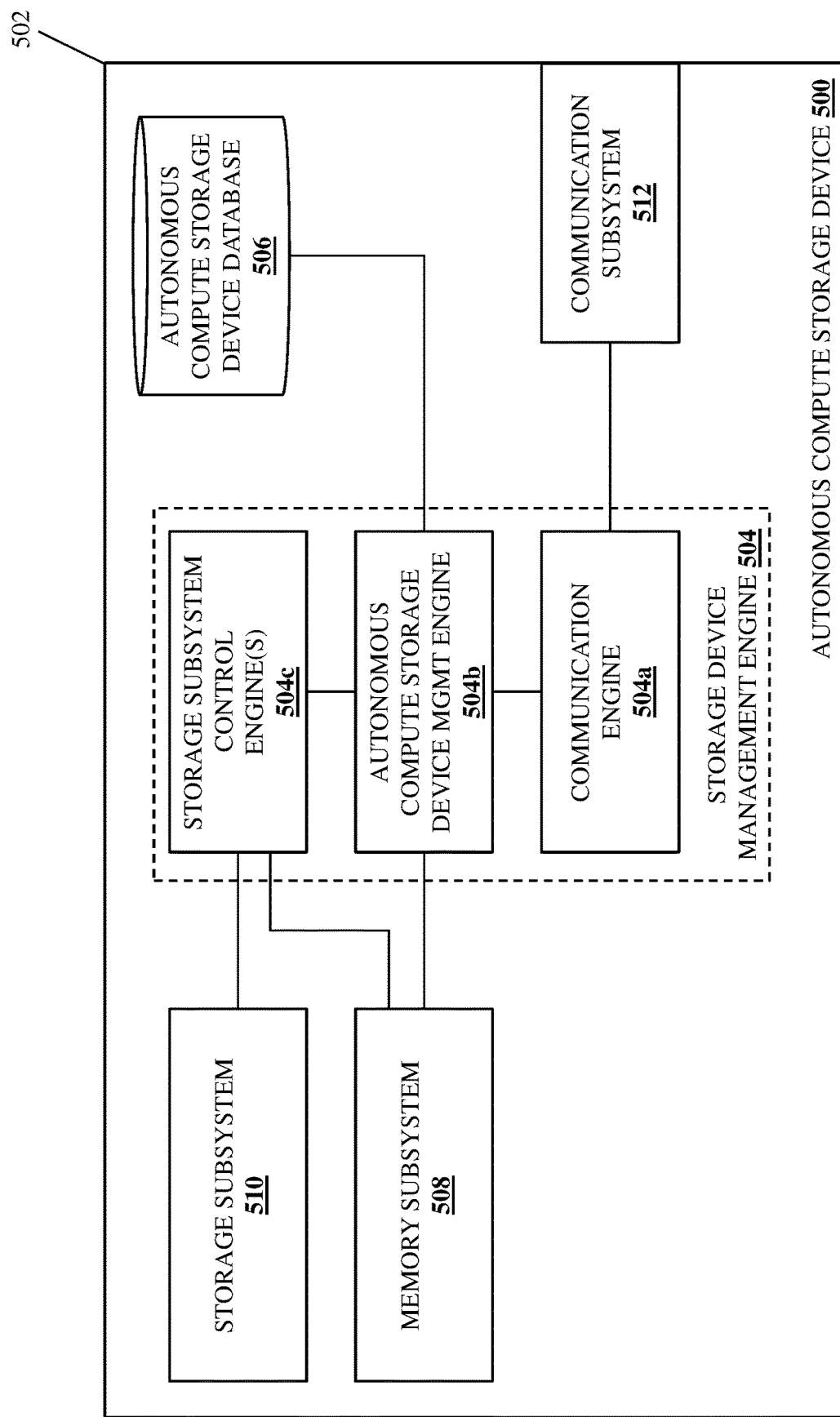
FIG. 5 is a schematic view illustrating an embodiment of an autonomous compute storage device that may be included in the computing device of FIG. 4.

Referring now to FIG. 5, an embodiment of an autonomous compute storage device 500 is illustrated that may provide the autonomous compute storage device(s) 406 discussed above with reference to FIG. 4. As such, the autonomous compute storage device 500 may be provided in the IHS 100 discussed above with reference to FIG. 1 (e.g., as the storage device 108), and in specific examples may be provided by a Solid State Drive (SSD) storage device such as a Non-Volatile Memory express (NVMe) SSD storage device. However, while illustrated and discussed as being provided by particular storage devices, one of skill in the art in possession of the present disclosure will recognize that the functionality of the autonomous compute storage device 500 discussed below may be provided by other storage devices utilizing other storage technologies while remaining within the scope of the present disclosure as well.

In the illustrated embodiment, the autonomous compute storage device 500 includes a chassis 502 that houses the components of the autonomous compute storage device 500, only some of which are illustrated and discussed below. For example, the chassis 502 may house a storage device processing system (not illustrated, but which may include the processor 102 discussed above with reference to FIG. 1) and a storage device memory system (not illustrated, but which may include the memory 114 discussed above with reference to FIG. 1) that is coupled to the storage device processing system and that includes instructions that, when executed by the storage device processing system, cause the storage device processing system to provide a storage device management engine 504 that is configured to perform the functionality of the storage device engines and/or autonomous compute storage devices discussed below. In a specific example, the storage device management engine 504 may be provided by an Application Specific Integrated Circuit (ASIC), firmware, an SSD controller, and/or other storage device processing/memory components that would be apparent to one of skill in the art in possession of the present disclosure.

In the illustrated embodiment, the memory system housed in the chassis 502 includes instructions that, when executed by the processing system, cause the processing system to provide a communication engine 504a that is part of the storage device management engine 504 and that is configured to perform communication functionality for the autonomous compute storage device 500 including, for example, utilizing a communication protocol (e.g., an NVMe communication protocol) to enable communications between the storage device management engine 504 and the host engine 404 in the computing device 400 discussed above with reference to FIG. 4. In the illustrated embodiment, the memory system housed in the chassis 502 also includes instructions that, when executed by the processing system, cause the processing system to provide an autonomous compute storage device management engine 504b that is part of the storage device management engine 504 and that is configured to perform the autonomous compute functionality for the autonomous compute storage device 500 discussed below. In a specific example, the autonomous compute storage device management engine 504b may be provided by a Flash Translation Layer (FTL) subsystem, although one of skill in the art in possession of the present disclosure will appreciate how other storage device subsystems may provide the autonomous compute storage device management engine 504b while remaining within the scope of the present disclosure as well.

In the illustrated embodiment, the memory system housed in the chassis 502 also includes instructions that, when executed by the processing system, cause the processing system to provide one or more storage subsystem control engines 504c that are part of the storage device management engine 504 and that are configured to perform the storage subsystem control functionality for the autonomous compute storage device 500 discussed below. In a specific example, the storage subsystem control engine(s) 504c may be provided by NAND/flash protocol sequencing engines that are configured to translate NAND/flash device commands to NAND/flash device specific protocol sequences, although one of skill in the art in possession of the present disclosure will appreciate how other storage subsystems may require the use of other storage subsystem control engine(s) while remaining within the scope of the present disclosure as well. In the illustrated embodiment, the chassis 502 may also house a storage system that is coupled to the autonomous compute storage device management engine 504b in the storage device management engine 504 (e.g., via a coupling between the storage system and the processing system) and that includes an autonomous compute storage device database 506 that is configured to store any of the information utilized by the autonomous compute storage device management engine 504b discussed below.

The chassis 502 may also house a memory subsystem 508 that is coupled to the autonomous compute storage device management engine 504b and the storage subsystem control engine(s) 504c in the storage device management engine 504 (e.g., via a coupling between the memory subsystem 508 and the processing system). In a specific example, the memory subsystem 508 illustrated in FIG. 5 may represent multiple different memory subsystems that are accessible to the autonomous compute storage device management engine 504b such as, for example, an internal memory subsystem that may be provided by an "on-chip" memory subsystem that is included in the processing system that provides the storage device management engine 504 and that may be used for the read operations discussed below that are relatively faster, more prevalent, and require relatively less power, as well as a Dynamic Random Access Memory (DRAM) memory subsystem that may be used for write operations and background operations (or other combined read/write operations) that are relatively slower, less prevalent, and require relatively more power.

However, while the memory subsystem 508 is illustrated and described as being included in the chassis 502, one of skill in the art in possession of the present disclosure will appreciate how the memory subsystem 508 may be included outside the chassis 502 as well. For example, embodiments of the memory subsystem 508 that include the DRAM memory subsystem discussed above may provide that DRAM memory subsystem inside the chassis 502 (e.g., as an internal DRAM memory subsystem in the autonomous compute storage device 500) or outside the chassis 502 (e.g., as an external DRAM memory subsystem provided in the chassis 402 of the computing device 400 discussed above with reference to FIG. 4 and coupled to the autonomous computer storage device 500) while remaining accessible to the autonomous compute storage device management engine 504b as described below. Furthermore, other embodiments of the memory subsystem 508 may include temporary First In First Out (FIFO) memory, temperature holding buffer memory, and/or other memory subsystems that, as discussed in some of the specific examples below, may be utilized to hold data streamed from the storage subsystem 310 to another storage subsystem as part of, for example, Direct Memory Access (DMA) operations.

The chassis 502 may also house a storage subsystem 510 that is coupled to the storage subsystem control engine(s) 504c in the storage device management engine 504 (e.g., via a coupling between the storage subsystem 510 and the processing system). In a specific example, the storage subsystem 510 may be provided by NAND/flash devices, although one of skill in the art in possession of the present disclosure in the art in possession of the present disclosure will appreciate how other storage devices using other storage technologies will benefit from the teachings of the present disclosure and thus will fall within it scope as well. The chassis 502 may also house a communication system 512 that is coupled to the communication engine 504a in the storage device management engine 504 (e.g., via a coupling between the communication system 512 and the processing system) and that may be provided by any of a variety of storage device communication components that would be apparent to one of skill in the art in possession of the present disclosure in the art in possession of the present disclosure. However, while a specific autonomous compute storage device 500 has been illustrated and described, one of skill in the art in possession of the present disclosure in the art in possession of the present disclosure will recognize that autonomous compute storage devices (or other devices operating according to the teachings of the present disclosure in a manner similar to that described below for the autonomous compute storage device 500) may include a variety of components and/or component configurations for providing conventional storage device functionality, as well as the functionality discussed below, while remaining within the scope of the present disclosure as well.

Figure 6:
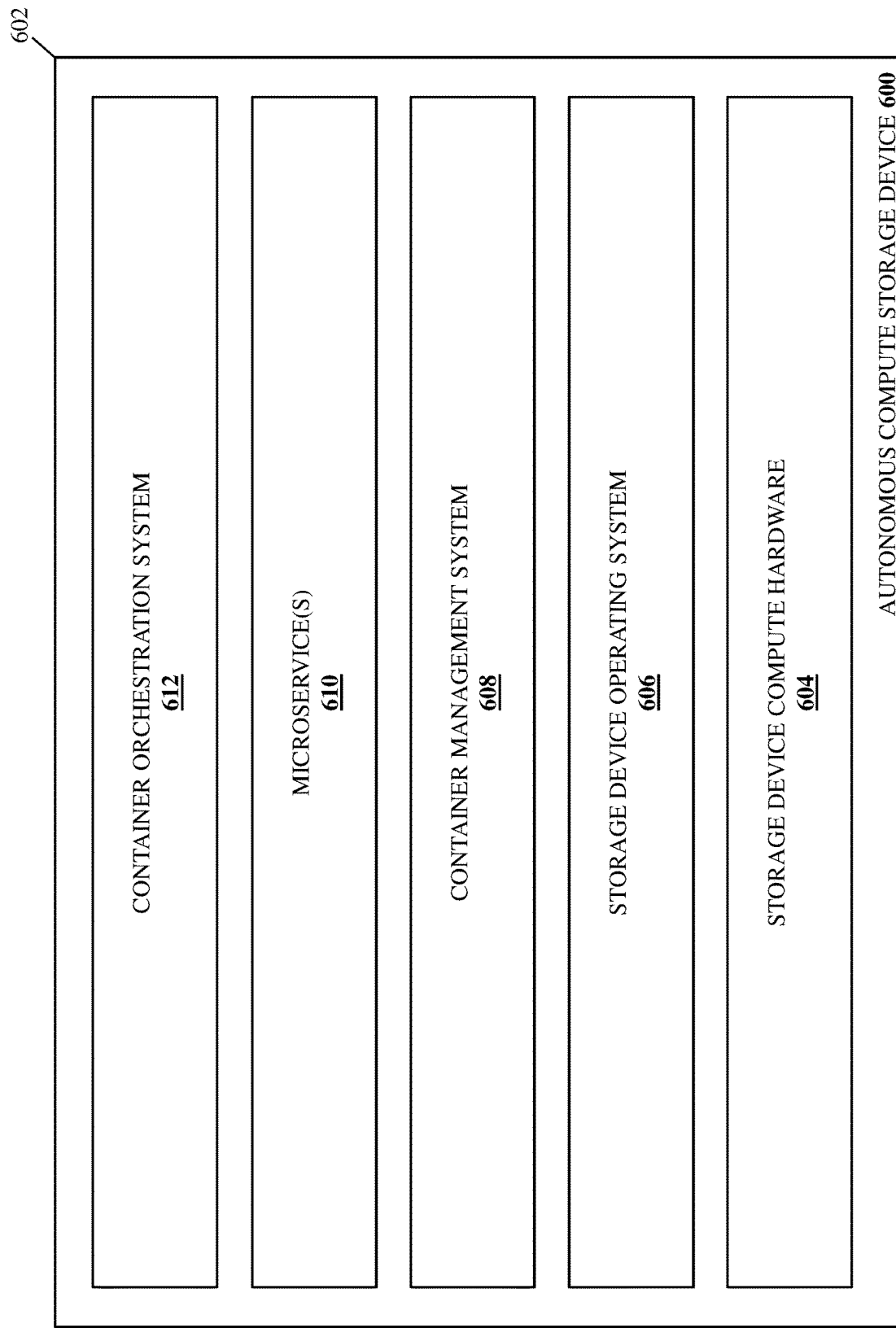
FIG. 6 is a schematic view illustrating an embodiment of an autonomous compute storage device that may provide the autonomous compute storage device of FIG. 5.

With reference to FIG. 6, a specific example of an autonomous compute storage device 600 is illustrated that may provide the autonomous compute storage devices 406 and/or 500 discussed above. As such, the autonomous compute storage device 600 may be provided in the IHS 100 discussed above with reference to FIG. 1 (e.g., as the storage device 108), and in specific examples may be provided by an SSD storage device such as an NVMe SSD storage device. However, while illustrated and discussed as being provided by particular storage devices, one of skill in the art in possession of the present disclosure in the art in possession of the present disclosure will recognize that the functionality of the autonomous compute storage device 600 discussed below may be provided by other storage devices utilizing other storage technologies while remaining within the scope of the present disclosure as well.

The inventors of the present disclosure have developed a microservice storage device that may be utilized to provide the autonomous compute storage device of the present disclosure, and that microservice storage device is described in U.S. patent application Ser. No. 17/969,874, filed on Oct. 20, 2022; U.S. patent application Ser. No. 17/969,818, filed on Oct. 20, 2022; and U.S. patent application Ser. No. 17/969,917, filed on Oct. 20, 2022; the disclosures of which are incorporated by reference herein in their entirety. As discussed in those patent documents, a microservice storage device may be configured to utilize its storage device compute hardware to provide a storage device operating system, and that storage device operating system may then be utilized to provide a container including a storage device management engine, while also providing one or more containers including microservices in some embodiments. As discussed below, the autonomous compute signatures and/or autonomous compute applications may be provided using the microservices described above, although one of skill in the art in possession of the present disclosure in the art in possession of the present disclosure will appreciate how the provisioning of the autonomous compute signatures and/or autonomous compute applications using other techniques will fall within the scope of the present disclosure as well.

In the illustrated embodiment, the autonomous compute storage device 600 includes a chassis 602 that houses the components of the autonomous compute storage device 600, only some of which are illustrated and discussed below. Similarly as discussed above, the chassis 602 of the autonomous compute storage device 600 may house storage device compute hardware 604 that may be provided by the storage device processing system, the storage device memory system, and/or other Central Processing Unit (CPU), Application-Specific Integrated Circuit (ASIC), SSD controller, and/or compute hardware discussed above, storage device peripherals/hardware that allows the compute hardware to communicate with the storage subsystem 510 (e.g., NAND devices), accelerator devices, encryption/decryption devices, and/or other elements of the microservice storage device 600, as well as any other storage device compute hardware that would be apparent to one of skill in the art in possession of the present disclosure in the art in possession of the present disclosure. The specific example of the autonomous compute storage device 600 of FIG. 6 illustrates how the storage device compute hardware 604 may be utilized to provide a storage device operating system 606 such as, for example, a LINUX® operating system and/or other operating systems that one of skill in the art in possession of the present disclosure in the art in possession of the present disclosure would appreciate may be run on the storage device compute hardware described herein.

The specific example of the microservice storage device 600 of FIG. 6 also illustrates how a container management system 608 may be provided using the storage device operating system 606. For example, the container management system 608 may be provided by DOCKER® container management open-source software that includes a set of Platform as a Service (PaaS) products that, as discussed below, may utilize the storage device operating system 606 to perform operating-system-level virtualization operations to provide microservices in packages called "containers", as well as any other container management software that would be apparent to one of skill in the art in possession of the present disclosure in the art in possession of the present disclosure. As illustrated in FIG. 6, the autonomous compute storage device 600 may include one or more microservices 610 that may be provided in the containers managed by the container management system 608. As discussed above and in further detail below, the microservice(s) 610 may be utilized to provide the autonomous compute signatures and/or autonomous compute applications described herein. Furthermore, in some embodiments, the autonomous compute storage device 600 may include a container orchestration system 612. For example, the container orchestration system 612 may be provided by a KUBERNETES® container orchestration open-source software that is configured to automate the microservice/container deployment, scaling, and management that one of skill in the art in possession of the present disclosure in the art in possession of the present disclosure would recognize as allowing for the functionality discussed below, as well as any other container orchestration software that would be apparent to one of skill in the art in possession of the present disclosure in the art in possession of the present disclosure.

As such, in a specific example, the autonomous compute storage device 600 may be an SSD storage device with storage device compute hardware 604 that provides an SSD controller that is configured to run a LINUX® storage device operating system 606, a DOCKER® container management system 608, the microservice(s) 610 in container(s), and a KUBERNETES® container orchestration system 612 described above. However, one of skill in the art in possession of the present disclosure in the art in possession of the present disclosure will appreciate how the autonomous compute storage device may utilize other storage device compute hardware to run other storage device operating systems, other container management systems, microservice(s) in container(s), and/or other container orchestration systems, while remaining within the scope of the present disclosure as well.

Figure 7:
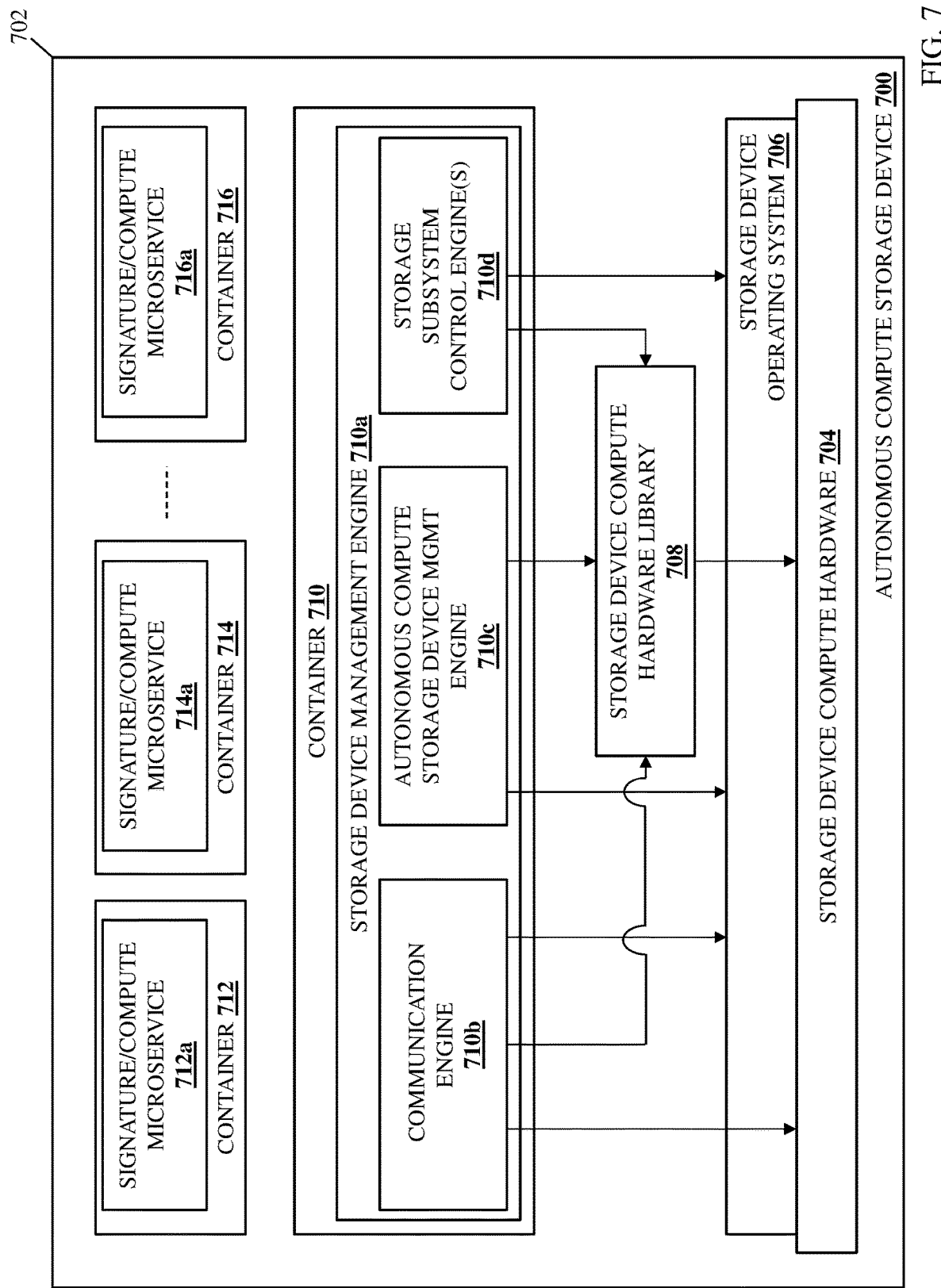
FIG. 7 is a schematic view illustrating an embodiment of an autonomous compute storage device that may provide the autonomous compute storage device of FIG. 5.

With reference to FIG. 7, a specific example of an autonomous compute storage device 700 is illustrated that may provide the autonomous compute storage devices 406, 500, and/or 600 discussed above. As such, the autonomous compute storage device 700 may be provided in the IHS 100 discussed above with reference to FIG. 1 (e.g., as the storage device 108), and in specific examples may be provided by an SSD storage device such as an NVMe SSD storage device. However, while illustrated and discussed as being provided by particular storage devices, one of skill in the art in possession of the present disclosure in the art in possession of the present disclosure will recognize that the functionality of the autonomous compute storage device 700 discussed below may be provided by other storage devices utilizing other storage technologies while remaining within the scope of the present disclosure as well.

As discussed above, the inventors of the present disclosure have developed a microservice storage device that may be utilized to provide the autonomous compute storage device of the present disclosure, and that microservice storage device is described in U.S. patent application Ser. No. 17/969,874, filed on Oct. 20, 2022; U.S. patent application Ser. No. 17/969,818, filed on Oct. 20, 2022; and U.S. patent application Ser. No. 17/969,917, filed on Oct. 20, 2022; the disclosures of which are incorporated by reference herein in their entirety. In the illustrated embodiment, the autonomous compute storage device 700 includes a chassis 702 that houses the components of the autonomous compute storage device 700, only some of which are illustrated and discussed below. As described in the patent documents discussed above, the chassis 702 of the autonomous compute storage device 700 may house storage device compute hardware 704 that may include, for example, the storage device compute hardware 604 in the microservice storage device 600 and/or the storage device processing system and the storage device memory system that are described above as providing the storage device management engine 504 in the microservice storage device 500. As such, the storage device compute hardware 704 and storage device management engine code, instructions, or other data may be utilized to provide a storage device operating system 706, which as discussed above for the storage device operating system 606 in the microservice storage device 600, may include a LINUX® operating system and/or other operating systems that one of skill in the art in possession of the present disclosure in the art in possession of the present disclosure would appreciate may be run on the storage device compute hardware described herein.

Furthermore, a container management system (e.g., similar to the container management system 608 discussed above with reference to FIG. 6) may be provided in the microservice storage device 700 and may utilize the storage device operating system 706 to perform operating-system-level virtualization operations to generate, create, and/or otherwise provide a container 710, and then provide a storage device management engine 710a in that container 710 that may include a communication engine 710b, an autonomous compute storage device management engine 710c, and storage subsystem control engine(s) 710d as illustrated in FIG. 7 (which may be similar to the storage device management engine 504 including the communication engine 504a, the autonomous compute storage device management engine 504b, and storage subsystem control engine(s) 504c illustrated in FIG. 5). As will be appreciated by one of skill in the art in possession of the present disclosure in the art in possession of the present disclosure, the container 710 may be provided by a virtual container that packages the storage device management engine code, instructions, and/or other data, along with all of its dependencies, in order to allow the storage device management engine 710a to run quickly and reliably from one computing environment to another. As such, the container 710 may be provided by a lightweight, standalone, executable package of software that includes everything needed to run the storage device management engine 710 including code information, runtime information, system tools, system libraries, settings, and/or other data that would be apparent to one of skill in the art in possession of the present disclosure in the art in possession of the present disclosure. Furthermore, while not described herein in detail, a container orchestration system (e.g., similar to the container orchestration system 612 discussed above with reference to FIG. 6) may be provided in the microservice storage device 700 in order to automate the storage device management engine 710a/container 710 deployment, scaling, and management that one of skill in the art in possession of the present disclosure in the art in possession of the present disclosure would recognize as allowing for the functionality described below.

As will be appreciated by one of skill in the art in possession of the present disclosure in the art in possession of the present disclosure, FIG. 7 illustrates how the container 710/storage device management engine 710a allows the components of the storage device management engine 710a to communicate with the storage device operating system 706, and with storage device compute hardware 704 via a storage device compute hardware library 708 (e.g., via the respective arrows between the storage device operating system 706 and each of the communication engine 710b, the autonomous compute storage device management engine 710c, and the storage subsystem control engine(s) 710d; as well as via the respective arrows between the storage device compute hardware library 708 and each of the communication engine 710b, the microservice provisioning engine 710c, and the storage subsystem control engine(s) 710d, and the arrow between the storage device compute hardware library 708 and the storage device compute hardware 704).

As will be appreciated by one of skill in the art in possession of the present disclosure in the art in possession of the present disclosure, the storage device compute hardware library 708 may include device-specific code that is configured to abstract the "uniqueness" of the autonomous compute storage device 700 from the containers/microservices provided therein so that those containers/microservices may operate agnostically with regard to the storage device compute hardware 704, allowing any communications between the storage device compute hardware 704 and any of the storage device management engine 710a, the communication engine 710b, the microservice provisioning engine 710c, and/or the storage subsystem control engine(s) 710d that are required to allow for the functionality described herein. For example, the storage device compute hardware library 708 may be configured to allow containers/microservices provided in the autonomous compute storage device 700 to identify a number of NAND die, a number of blocks per NAND die, and/or other autonomous compute storage device inventory information that may be relatively unique to the autonomous compute storage device 700 without a need to code a plurality of different containers/microservices for relatively similar autonomous compute storage devices.

As such, the storage device management engine 710a and microservices 712a, 714a, and up to 716a may operate without hardware dependencies. As discussed herein, the storage device management engine 710a may be considered a storage device management microservice, and may utilize an abstraction layer provided by the storage device compute hardware library to operate on different types of storage device compute hardware (e.g., like the storage device compute hardware 704 illustrated in FIG. 7) via the "library view" of that storage device compute hardware described above. As such, storage device compute hardware libraries in different autonomous compute storage devices may provide the same API to the storage device management engine 710a regardless of the particular implementation of their storage device compute hardware. However, while a particular functionality for the storage device compute hardware library 708 has been described, one of skill in the art in possession of the present disclosure in the art in possession of the present disclosure will appreciate how other functionality and/or uses of the storage device compute library (e.g., by providing direct access to processing hardware in order to enable faster performance) will fall within the scope of the present disclosure as well.

Furthermore, the provisioning of microservices on the autonomous compute storage device 700 may be performed substantially as described above for the storage device management engine 710a. As such, with reference to FIG. 7, the storage device operating system 706 provided using the storage device compute hardware 704 may utilize microservice code, instructions, or other data to provide signature/compute microservices 712a, 714a, and up to 716 (discussed in further detail below) in the microservice storage device 700. For example, similarly as described for the storage device management engine 710a, a container management system (e.g., similar to the container management system 608 discussed above with reference to FIG. 6) may be provided in the microservice storage device 700 and may utilize the storage device operating system 706 to perform operating-system-level virtualization operations to generate, create, and/or otherwise provide containers 712, 714, and up to 716 using the storage device operating system 706, and then provide the signature/compute microservices 712a, 714a, and 716a in those containers 712, 714, and up to 716, respectively.

Similarly as described above, the containers 712, 714, and up to 716 may be provided by respective virtual containers that package the microservice code, instructions, and/or other data, along with all of its dependencies, in order to allow the signature/compute microservices 712a, 714a, and up to 716a, respectively, to run quickly and reliably from one computing environment to another. As such, the containers 712, 714, and up to 716 may each be provided by a respective lightweight, standalone, executable package of software that includes everything needed to run its microservice including code information, runtime information, system tools, system libraries, settings, and/or other data that would be apparent to one of skill in the art in possession of the present disclosure in the art in possession of the present disclosure. Furthermore, while not described herein in detail, the container orchestration system (e.g., similar to the container orchestration system 612 discussed above with reference to FIG. 6) that may be provided in the microservice storage device 700 as discussed above may operate to automate the microservice/container deployment, scaling, and management that one of skill in the art in possession of the present disclosure in the art in possession of the present disclosure would recognize as allowing for the functionality discussed below.

As will be appreciated by one of skill in the art in possession of the present disclosure in the art in possession of the present disclosure, from the point of view of the storage device operating system 706, the storage device management engine 710a provided in the container 710 and the signature/compute microservices 712a, 714a, and up to 716a provided in the containers 712, 714, and up to 716, respectively, may all be viewed as respective microservices (i.e., the storage device management engine 710a may simply be viewed as a microservice that performs "storage device management" compute functions). As such, while described as a "storage device management engine" and "signature/compute microservices", one of skill in the art in possession of the present disclosure in the art in possession of the present disclosure will appreciate that the storage device operating system 706 in the microservice storage device 700 illustrated in FIG. 7C may "see" a plurality of containers 710, 712, 714, and up to 716 that each include a respective microservice. Furthermore, as described in further detail below, any microservices provided in the autonomous compute storage device 700 may communicate with each other in order to perform desired functionality.

Figure 8:
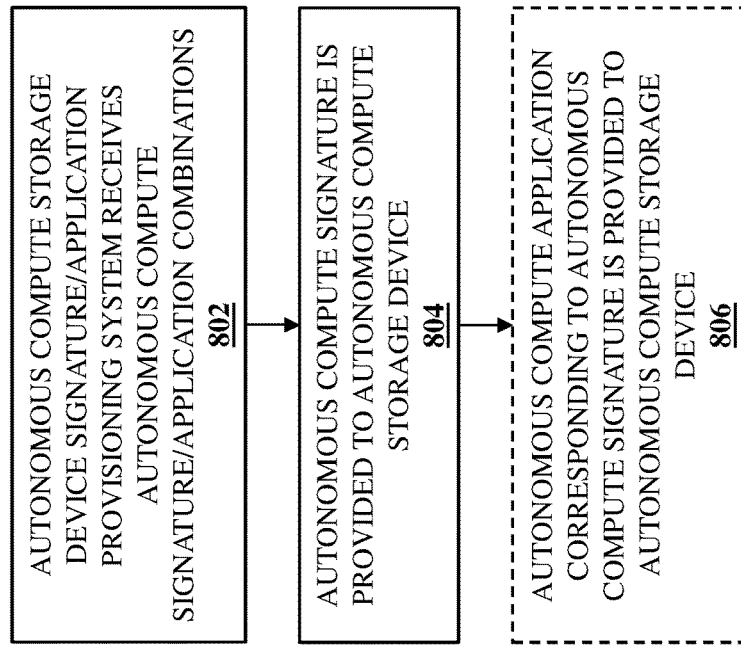
FIG. 8 is a flow chart illustrating an embodiment of a method for configuring autonomous compute storage devices.

Referring now to FIG. 8, an embodiment of a method 800 for configuring autonomous compute storage devices is illustrated. As discussed below, the systems and methods of the present disclosure provide an autonomous compute storage device signature application provisioning system (also referred to as an "autonomous compute storage device app store") that is accessible by the autonomous compute storage devices of the present disclosure to retrieve the autonomous compute signatures/applications that enable the autonomous compute operations discussed below. For example, the autonomous compute storage device app store of the present disclosure may receive and store autonomous compute signatures/applications from autonomous compute storage device signature application developers, with the autonomous compute storage devices retrieving autonomous compute signatures from the autonomous compute storage device app store for use in identifying data that is currently subject to storage operations (e.g., read or write operations, background operations, etc.), as well as retrieving the corresponding autonomous compute application from the autonomous compute storage device app store and executing that autonomous compute application in order to perform compute operations on that data. As such, an autonomous compute storage device ecosystem may be provided that enables any of a variety of desired autonomous compute functionality from storage devices.

As discussed above, while the autonomous compute storage device signature/application provisioning system 206 (or autonomous compute storage device "app store") is illustrated and described as being accessed by the autonomous compute storage devices via the network 204 in the examples below, in other non-illustrated embodiments the autonomous compute storage device signature/application provisioning system 206 may be hosted locally on a network (e.g., a Local Area Network (LAN) controlled by a single company or other entity), with the autonomous compute storage device signatures/applications developed and validated locally. Furthermore, in yet other embodiments, the autonomous compute storage device signature/application provisioning system 206 of the present disclosure may be provided per-computing-device (e.g., hosted in a server device by the host engine 404), per-computing-device-rack (e.g., hosted by a rack controller or other subsystem in a rack that houses a plurality of computer devices), and/or in other manners that would be apparent to one of skill in the art in possession of the present disclosure in the art in possession of the present disclosure.

Figure 9A:
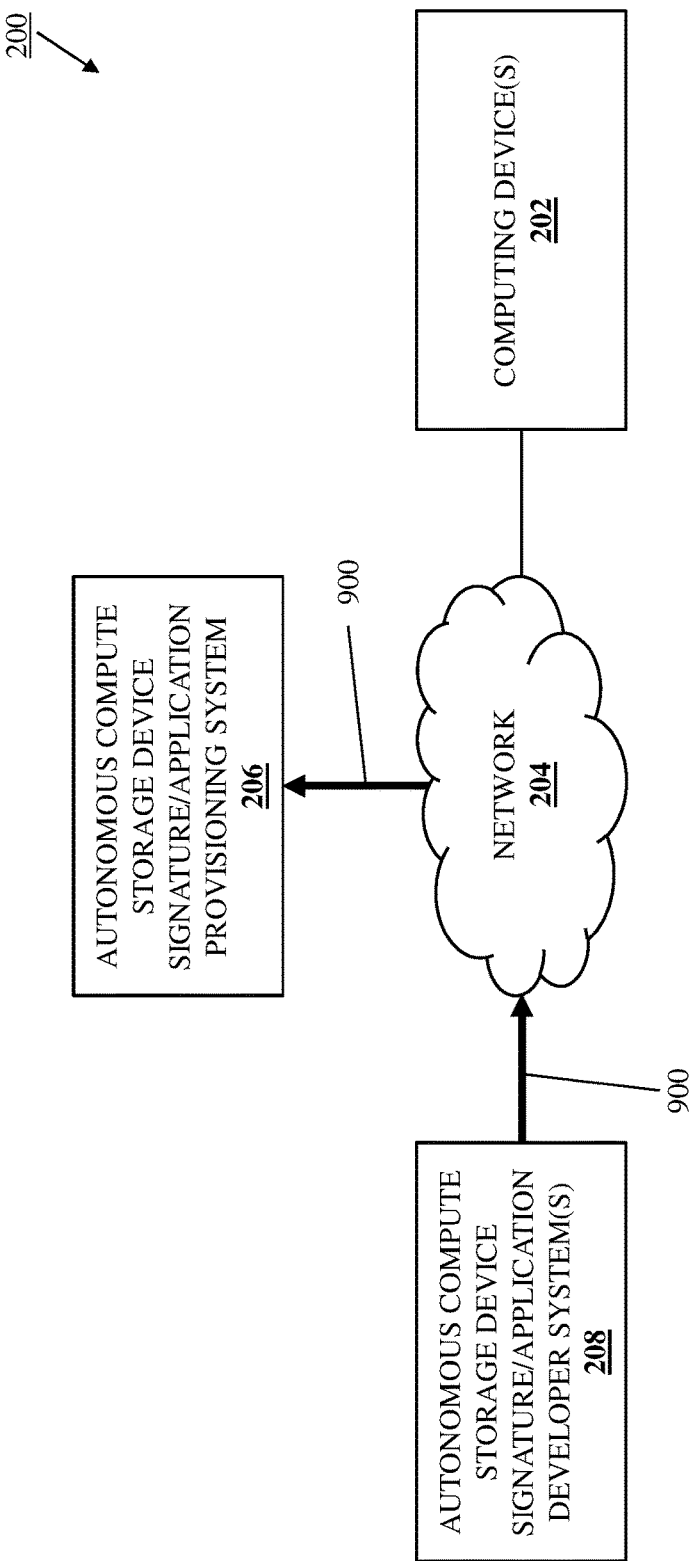
FIG. 9A is a schematic view illustrating an embodiment of the networked system of FIG. 2 operating during the method of FIG. 8.
Figure 9B:
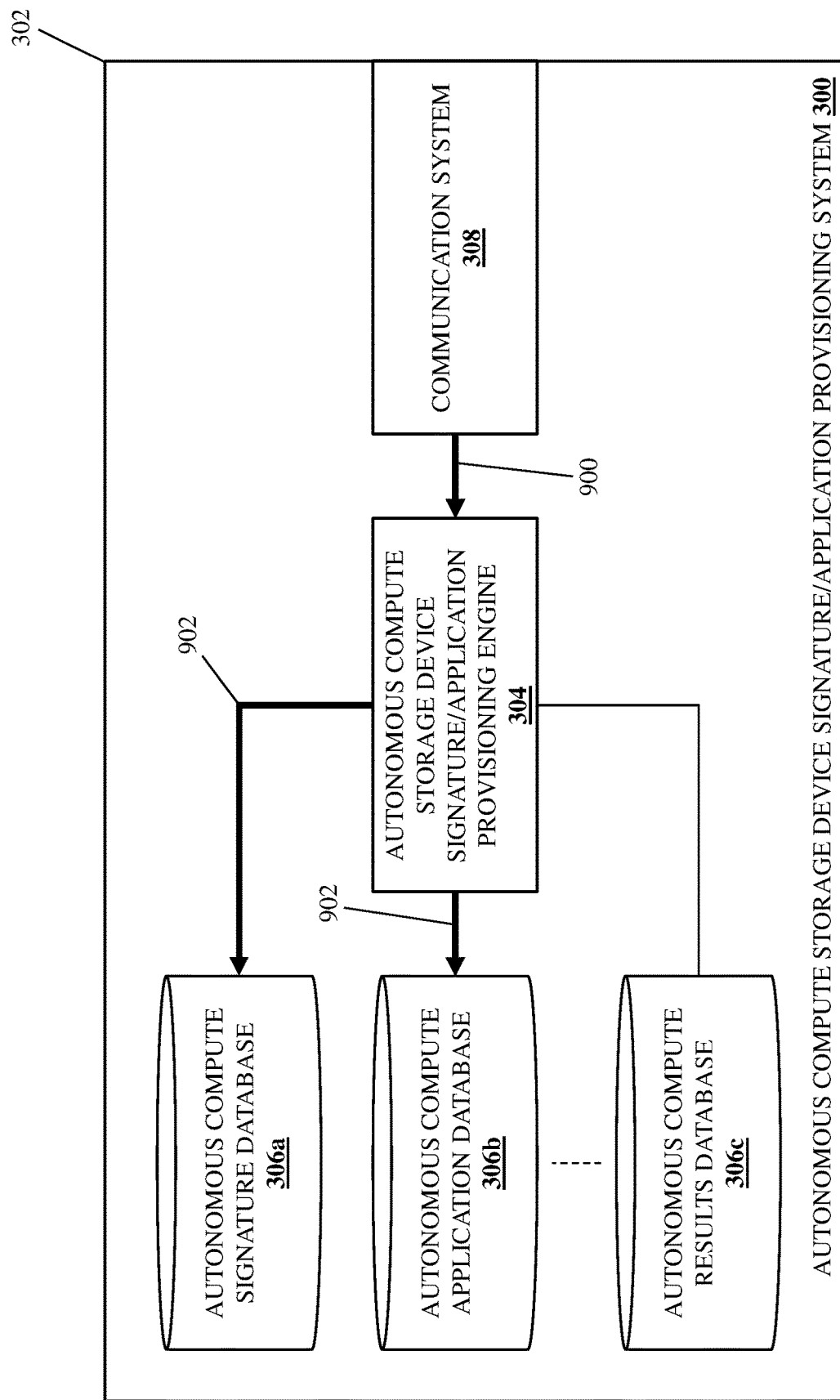
FIG. 9B is a schematic view illustrating an embodiment of the autonomous compute storage device signature/application provisioning system of FIG. 3 operating during the method of FIG. 8.

The method 800 begins at block 802 where an autonomous compute storage device signature/application provisioning system receives autonomous compute signature/application combinations. With reference to FIGS. 9A and 9B, in an embodiment of block 802, the autonomous compute storage device signature/application provisioning engine 304 in the autonomous compute storage device signature/application provisioning system 206/300 may perform autonomous compute signature/application receiving operations 900 that include receiving, via the network 204, autonomous compute signature/application combinations from the autonomous compute storage device signature/application developer system(s) 208 via its communication system 308. Furthermore, in response to receiving the autonomous compute signature/application combinations, the autonomous compute storage device signature/application provisioning engine 304 may perform autonomous compute signature/application storage operations 902 that, in the illustrated embodiment, includes storing the autonomous compute signature(s) in the autonomous compute signature database 306a, and storing the autonomous compute application(s) in the autonomous compute application database 306b.

As discussed in further detail below, the autonomous compute signatures/applications of the present disclosure may be configured to operate on data streams that may be provided by data flowing between the host engine 404 and the storage subsystem 510 in the autonomous compute storage device 406/500 during host read or write operations, or that may be provided by data flowing in and out of the storage subsystem 510 in the autonomous compute storage device 406/500 during background operations. However, while described as operating on data streams flowing between particular locations, one of skill in the art in possession of the present disclosure in the art in possession of the present disclosure will appreciate how the autonomous compute signatures/applications may operate on data transmitted in other manners while remaining within the scope of the present disclosure as well.

In some embodiments, the autonomous compute signatures/applications of the present disclosure may be developed by the autonomous compute storage device signature/application developer system(s) 208 using an autonomous compute signature/application interpreted programming language that allows the autonomous compute signatures/applications to be configured for use with different storage device configurations (e.g., different storage device Central Processing Unit (CPU) architectures). For example, the autonomous compute signature/application interpreted programming language used to develop the autonomous compute signatures/applications may minimize implementation dependencies by, for example, providing a mechanism for allocating memory (e.g., allocating either "normal speed" subset of memory or "fast" subset of memory from the memory subsystem 508 in the autonomous compute storage device 500) that allows the autonomous compute signatures/applications to request memory without a need to know details about that memory, and then receive back virtual memory addresses for memory allocated to it.

As will be appreciated by one of skill in the art in possession of the present disclosure in the art in possession of the present disclosure, different storage device configurations may perform memory allocation in different manners, and the autonomous compute signature/application interpreted programming language may provide a common memory allocation interface for autonomous compute signatures/applications while allowing the different memory allocation operations required by the different storage device configurations discussed above. Furthermore, while a specific example has been provided, one of skill in the art in possession of the present disclosure in the art in possession of the present disclosure will appreciate how dependencies other than the memory allocation dependencies discussed above may be resolved by the autonomous compute storage device manufacturer/vendor via, for example, the storage device operating system that is integrated with the storage device compute hardware included in the autonomous compute storage device.

In a specific example, the autonomous compute storage device signature/application developer system(s) 208 may utilize the autonomous compute signature/application interpreted programming language to develop autonomous compute signatures/applications that may operate in a "sandbox" in the autonomous compute storage device, and may validate developed autonomous compute signatures/applications by compiling the autonomous compute signatures/applications to produce bytecode, and then providing that bytecode to an interpreter that is executed in a hardware-independent simulator. As will be appreciated by one of skill in the art in possession of the present disclosure in the art in possession of the present disclosure, the autonomous compute signature/application interpreted programming language may allow developers of the autonomous compute storage device signature/application developer system(s) 208 to "write once, run anywhere", or otherwise develop autonomous compute signature/application code that is configured to run on a variety of different autonomous compute storage devices having different storage device configurations.

Furthermore, operating systems provided on autonomous compute storage devices may include interpreters as well, with those interpreters converting bytecode (produced via the compiling of the autonomous compute signature/application) to assembly code (or other locally executable machine code) that may be provided to a CPU in the autonomous compute storage device that is configured to execute that assembly code. For example, such bytecode-to-assembly-code conversions may be performed "on-the-fly" (e.g., using a Just In Time (JIT) scheme) as the autonomous compute signature/application is executed, or using an Ahead Of Time (AOT) scheme that provides the assembly code available for local execution to eliminate the use of the interpreter during execution of the autonomous compute signature/application. As such, each autonomous compute storage device manufacturer/vendor may configure the interpreter in their autonomous compute storage devices to operate based on the storage device hardware, configuration, and/or other characteristics of those autonomous compute storage devices, with those interpreters implemented in software, hardware, or combinations thereof, and in some examples omitted if the hardware is configured to directly execute the bytecode (or portions thereof).

In a specific embodiment, the autonomous compute signatures discussed above may include an autonomous compute signature algorithm that may be configured to be executed on data, and an autonomous compute signature definition that defines the "signature" of data that triggers the execution of the autonomous compute applications discussed in further detail below. For example, the autonomous compute signature algorithm may be provided by a hash algorithm, a Cyclic Redundancy Check (CRC) algorithm, a decryption algorithm, and/or other data transformation algorithms known in the art that are configured to transform data to produce a data signature, and the autonomous compute signature definition may be compared to the data signature to determine whether there is a match (with the corresponding autonomous compute application executed in response to a match as discussed in further detail below). However, one of skill in the art in possession of the present disclosure in the art in possession of the present disclosure will appreciate how simplified scenarios may exist where the autonomous compute signature definition is compared directly to a data signature of the data at issue (rather than a transformation of that data), and thus embodiments of the autonomous compute signature algorithm may include a "identity function" that does not modify or transform the data. However, while autonomous compute signatures having autonomous compute signature algorithms and autonomous compute signature definitions have been described, one of skill in the art in possession of the present disclosure will appreciate how the autonomous compute signature algorithms may be omitted in some scenarios (e.g., in the embodiments in which transformation of the data at issue is not required) while remaining within the scope of the present disclosure as well.

Figure 10A:
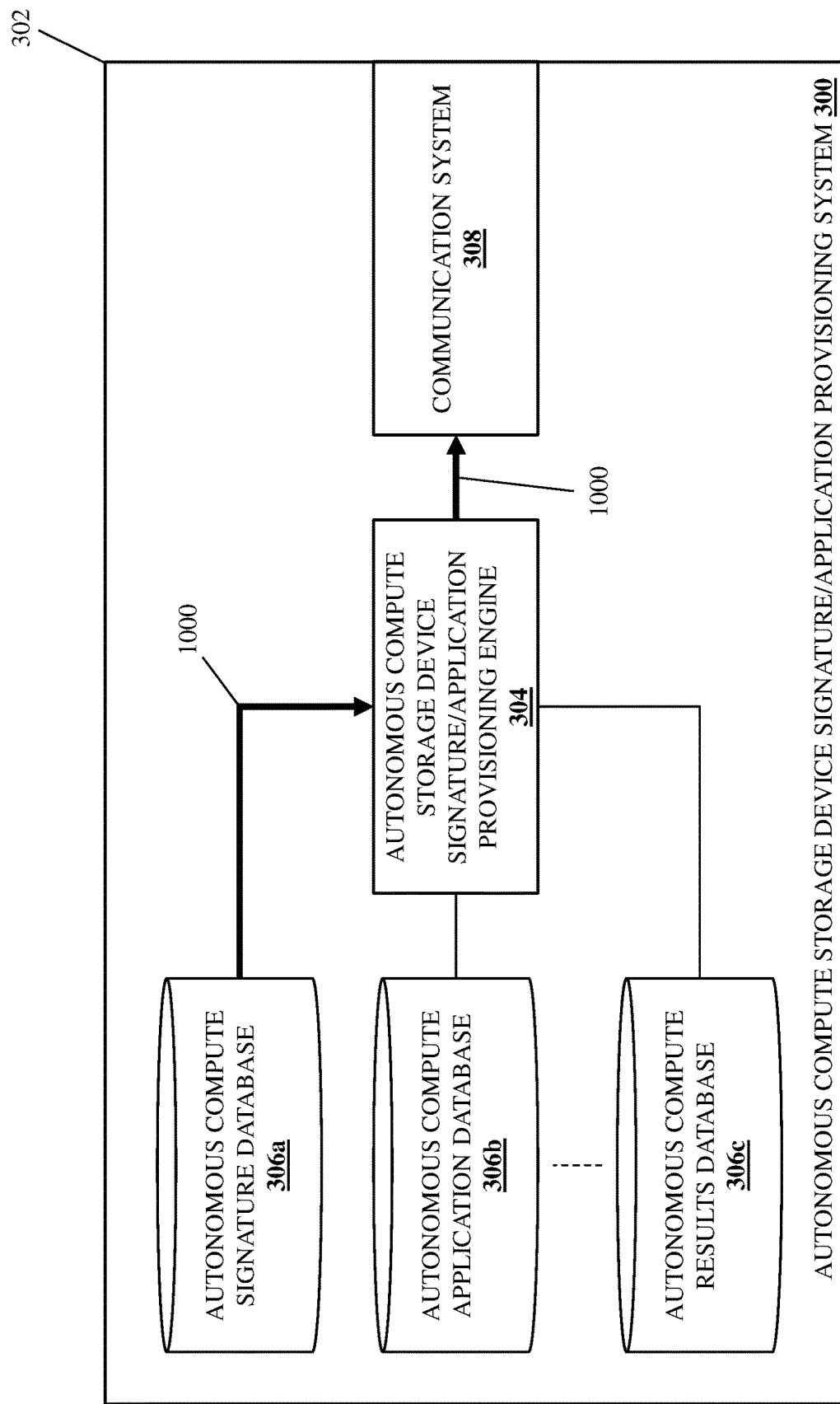
FIG. 10A is a schematic view illustrating an embodiment of the autonomous compute storage device signature/application provisioning system of FIG. 3 operating during the method of FIG. 8.
Figure 10B:
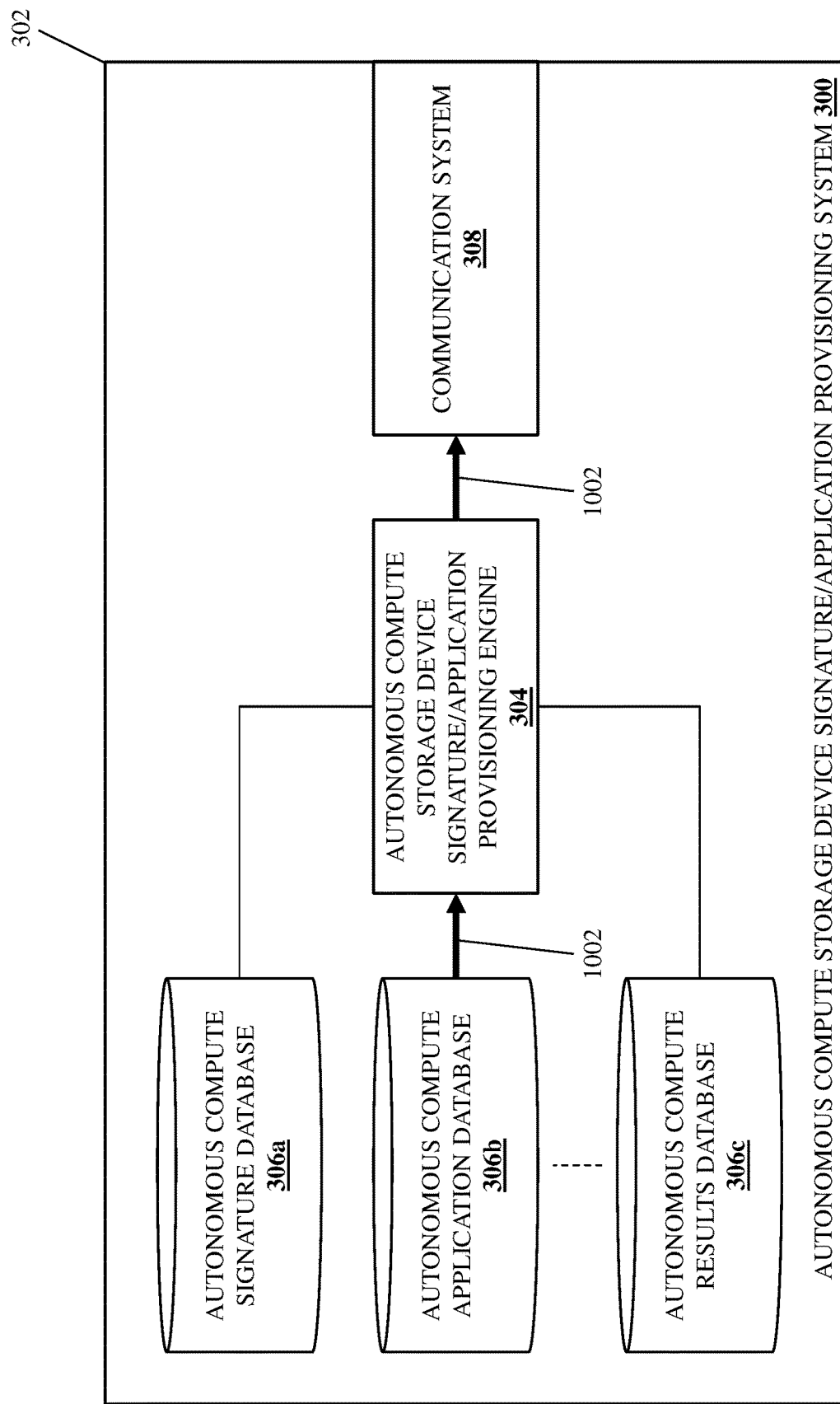
FIG. 10B is a schematic view illustrating an embodiment of the autonomous compute storage device signature/application provisioning system of FIG. 3 operating during the method of FIG. 8.

The method 800 then proceeds to block 804 where an autonomous compute signature is provided to an autonomous compute storage device, and in some embodiments to optional block 806 as well where an autonomous compute application corresponding to the autonomous compute signature may be provided to the autonomous compute storage device. With reference to FIG. 10A, in an embodiment of block 804, the autonomous compute storage device signature/application provisioning engine 304 in the autonomous compute storage device signature/application provisioning system 300 may perform autonomous compute signature provisioning operations 1000 that may include retrieving an autonomous compute signature from the autonomous compute signature database 306a and transmitting that autonomous compute signature via its communication system 308. With reference to FIG. 10B, in an embodiment of optional block 806, the autonomous compute storage device signature/application provisioning engine 304 in the autonomous compute storage device signature/application provisioning system 300 may perform autonomous compute application provisioning operations 1002 that may include retrieving an autonomous compute application from the autonomous compute application database 306b that corresponds to the autonomous compute signature retrieved at block 804 from the autonomous compute signature database 306a, and then transmitting that autonomous compute application via its communication system 308.

Figure 10C:
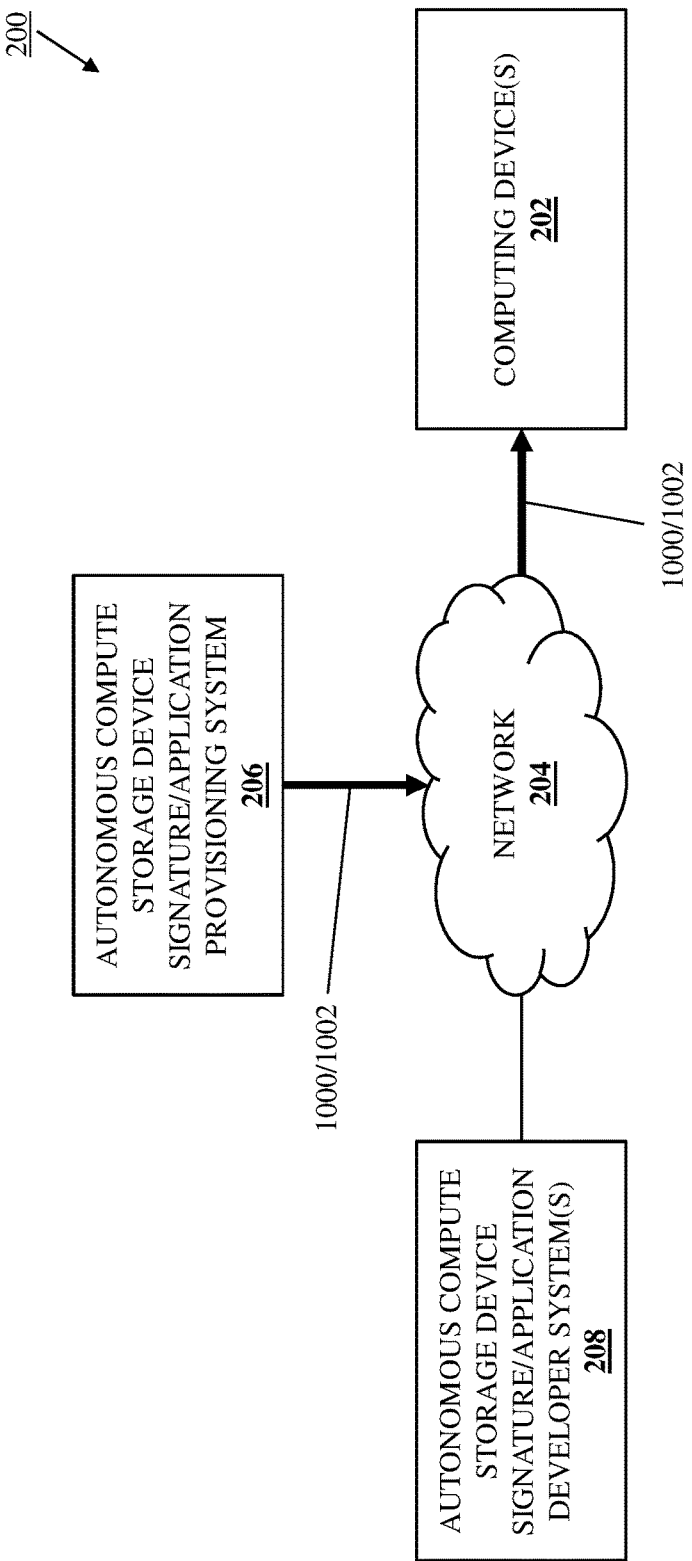
FIG. 10C is a schematic view illustrating an embodiment of the networked system of FIG. 2 operating during the method of FIG. 8.
Figure 10E:
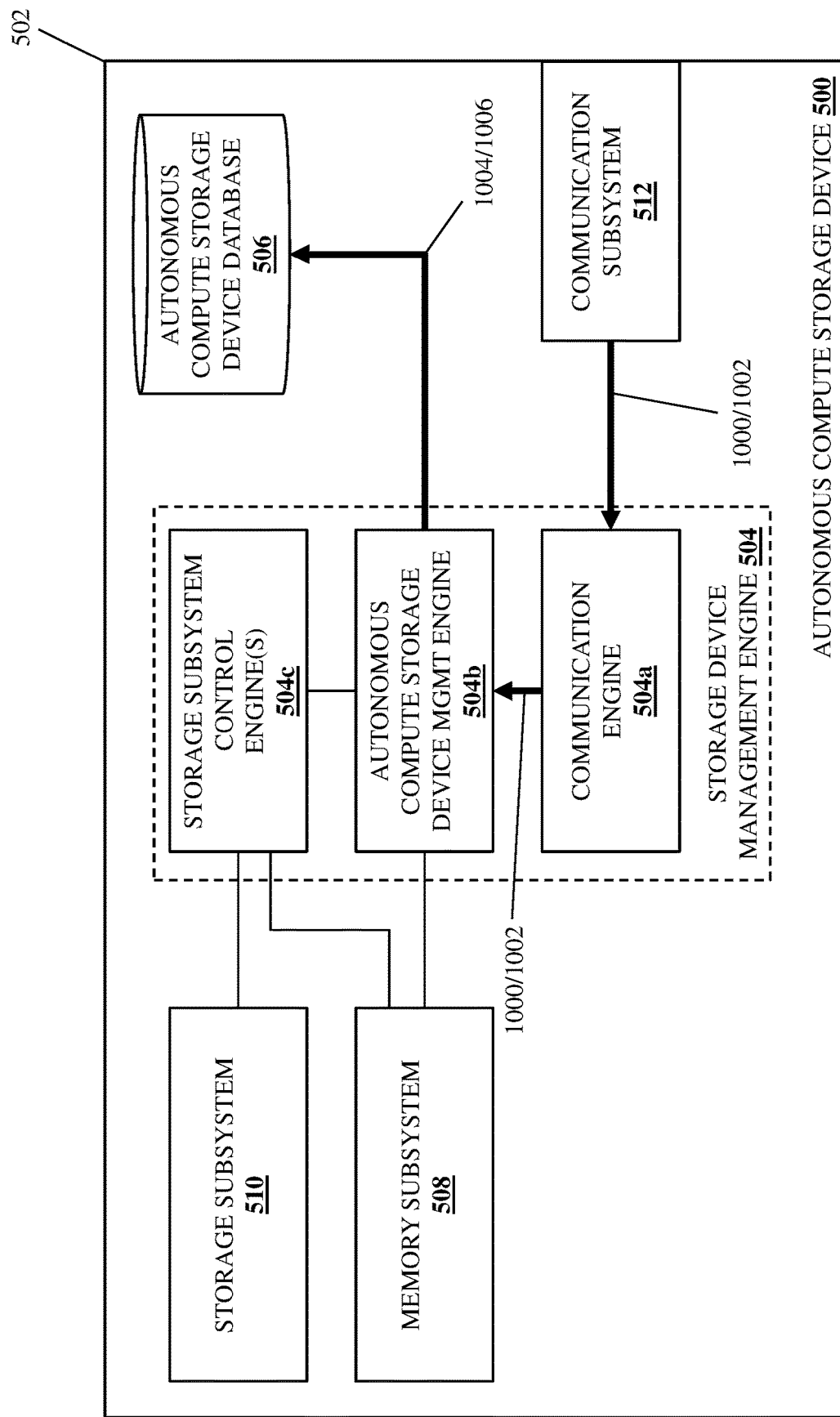
FIG. 10E is a schematic view illustrating an embodiment of the autonomous compute storage device of FIG. 5 operating during the method of FIG. 8.

With reference to FIGS. 10C, 10D, and 10E, the autonomous compute signature provisioning operations 1000 performed at block 804 may include transmitting the autonomous compute signature via the network 204 and to the computing device 202/400 such that it is received by the host engine 404 via its communication system 408, and provided by the host engine 404 to the autonomous compute storage device 406/500 such that it is received by the communication engine 504a via the communication subsystem 512 and provided by the communication engine 504a to the autonomous compute storage device management engine 504b. As such, at block 804 and in response to receiving the autonomous compute signature, the autonomous compute storage device management engine 504b may perform autonomous compute signature storage operations 1004 that include storing the autonomous compute signature in the autonomous compute storage device database 506.

Similarly, in embodiments in which optional block 806 is performed, the autonomous compute application provisioning operations 1000 may include transmitting the autonomous compute application via the network 204 and to the computing device 202/400 such that it is received by the host engine 404 via its communication system 408, and provided by the host engine 404 to the autonomous compute storage device 406/500 such that it is received by the communication engine 504a via the communication subsystem 512 and provided by the communication engine 504a to the autonomous compute storage device management engine 504b. As such, in embodiments in which optional block 806 is performed and in response to receiving the autonomous compute application, the autonomous compute storage device management engine 504b may perform autonomous compute application storage operations 1006 that include storing the autonomous compute application in the autonomous compute storage device database 506.

As will be appreciated by one of skill in the art in possession of the present disclosure in the art in possession of the present disclosure, the provisioning of the autonomous compute signature (and in some cases the corresponding autonomous compute application) as part of the method 800 may be initiated based on a variety of criteria. For example, a user of the computing device 400 may use the host engine 404 to configure the autonomous compute storage device 406/500 with any particular autonomous compute functionality, and that configuration may include "downloading" or otherwise retrieving the autonomous compute signature (and in some cases the autonomous compute application) from the autonomous compute storage device signature/application provisioning system 206/300. Furthermore, subsequent to that configuration, the autonomous compute storage device signature/application provisioning system 206/300 may periodically update the autonomous compute storage device signature/application provisioning system 206/300 with updated versions of the autonomous compute signature (and in some cases, updated versions of the autonomous compute application).

In specific examples, the autonomous compute storage device 406/500 may "register" with the autonomous compute storage device signature/application provisioning system 206/300 (e.g., an autonomous compute storage device app store) and select one or more autonomous compute signatures (and in some cases, corresponding autonomous compute application(s)) in order to have them provided on the autonomous compute storage device 406/500 in the manner described above. As such, one of skill in the art in possession of the present disclosure in the art in possession of the present disclosure will appreciate how the autonomous compute signatures (and in some cases the autonomous compute applications) may be provided on the autonomous compute storage device 406/500 via "push" operations (e.g., push operations performed by the autonomous compute storage device signature/application provisioning system 206/300), "pull" operations (e.g., pull operations performed by the autonomous compute storage device 406/500), combinations thereof, and/or in other manners that would be apparent to one of skill in the art in possession of the present disclosure in the art in possession of the present disclosure.

As described herein, in some embodiments, the method 800 include the performance of block 804 to provide an autonomous compute signature on the autonomous compute storage device 406/500 without the performance of optional block 806 to provide the corresponding autonomous compute application on that autonomous compute storage device 406/500, and as discussed in further detail below, that autonomous compute signature may then be used to identify data upon which compute operations should be performed, followed by the retrieval of the corresponding autonomous compute application and execution of that corresponding autonomous compute application in order to perform those compute operations. As will be appreciated by one of skill in the art in possession of the present disclosure in the art in possession of the present disclosure, such embodiments operate to conserve storage space on the autonomous compute storage device 406/500 and only utilize that storage space for any autonomous compute application in the event it is needed (i.e., in the event data is identified via its corresponding autonomous compute signature).

However, in other embodiments, the method 800 include the performance of block 804 to provide an autonomous compute signature on the autonomous compute storage device 406/500 along with the performance of optional block 806 to provide the corresponding autonomous compute application on that autonomous compute storage device 406/500. As will be appreciated by one of skill in the art in possession of the present disclosure in the art in possession of the present disclosure, such embodiments may allow for relatively quicker execution of the autonomous compute application to perform the compute operations, but at the expense of storage space in the autonomous compute storage device 406/500. As such, the autonomous compute storage device management engine 504b may be configured store a relatively limited number of autonomous compute applications in the autonomous compute storage device database 506, and may implement policies to track, monitor, and/or analyze the use of autonomous compute applications in order to identify which autonomous compute applications should be stored "locally" on the autonomous compute storage device 406/500.

Figure 11:
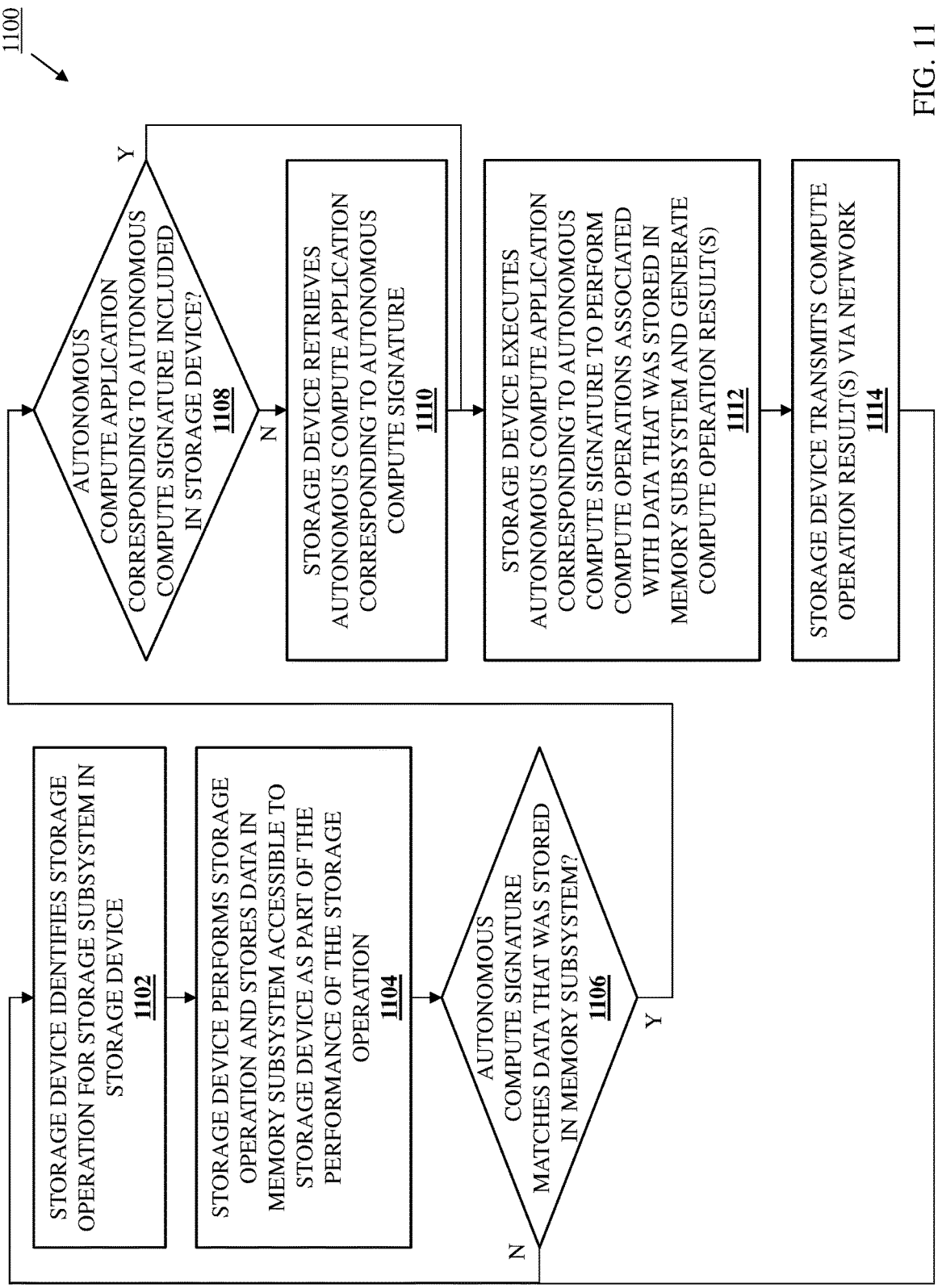
FIG. 11 is a flow chart illustrating an embodiment of a method for autonomously performing compute operations using a storage device.

Referring now to FIG. 11, an embodiment of a method 1100 for autonomously performing compute operations using a storage device is illustrated. As discussed below, the systems and methods of the present disclosure provide storage devices that perform compute operations autonomously from the host processing system in the computing device in which they are included and on data that is subject to storage operations being performed on that data. For example, the autonomous compute storage device system of the present disclosure may include a computing device and a storage device that is coupled to the computing device. The storage device identifies a storage operation for a storage subsystem that is included in the storage device and, in response, performs the storage operation and stores data in a memory subsystem that is accessible to the storage device as part of the performance of the storage operation. If the storage device determines that an autonomous compute signature matches the data that was stored in the memory subsystem, it executes an autonomous compute application to perform compute operations that are associated with the data that was stored in the memory subsystem and generate at least one compute operation result. As such, storage device autonomous computing is enabled that addresses many of the issues present in conventional computational storage systems discussed above.

The method 1100 begins at block 1102 where a storage device identifies a storage operation for a storage subsystem in the storage device. As discussed in further detail below, storage operations that are identified at block 1102 for a storage subsystem in a storage device may include any of a variety of storage operations that may be initiated by entities other than the storage device (e.g., by a host), initiated by the storage device and/or subsystems internal to the storage device, and/or in any other manner that would be apparent to one of skill in the art in possession of the present disclosure in the art in possession of the present disclosure. As such, while the specific examples below describe read operations, write operations, and background operations, one of skill in the art in possession of the present disclosure in the art in possession of the present disclosure will appreciate how any other storage operations on data stored in the storage subsystem of a storage device will fall within the scope of the present disclosure as well.

Figure 12A:
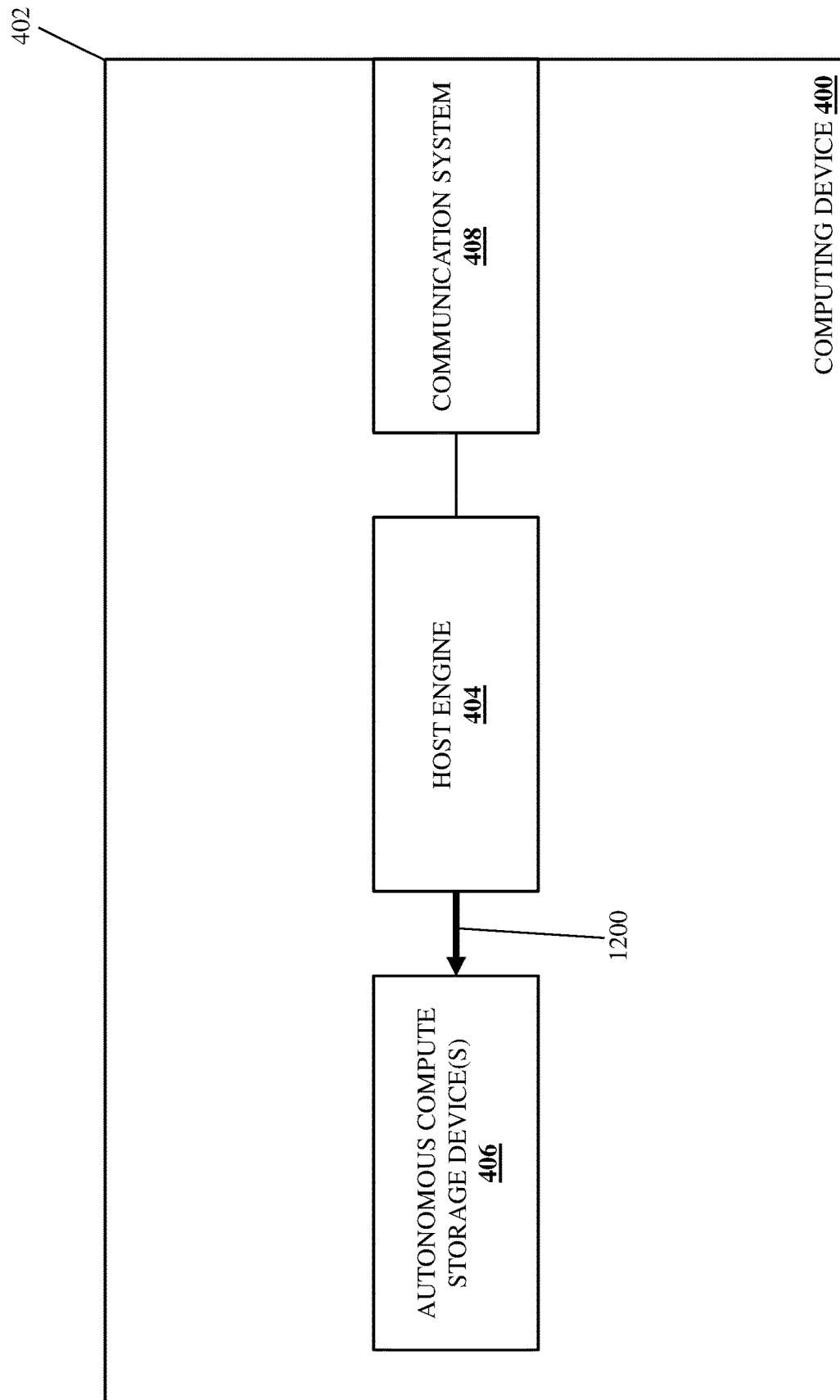
FIG. 12A is a schematic view illustrating an embodiment of the computing device of FIG. 4 operating during the method of FIG. 11.
Figure 12B:
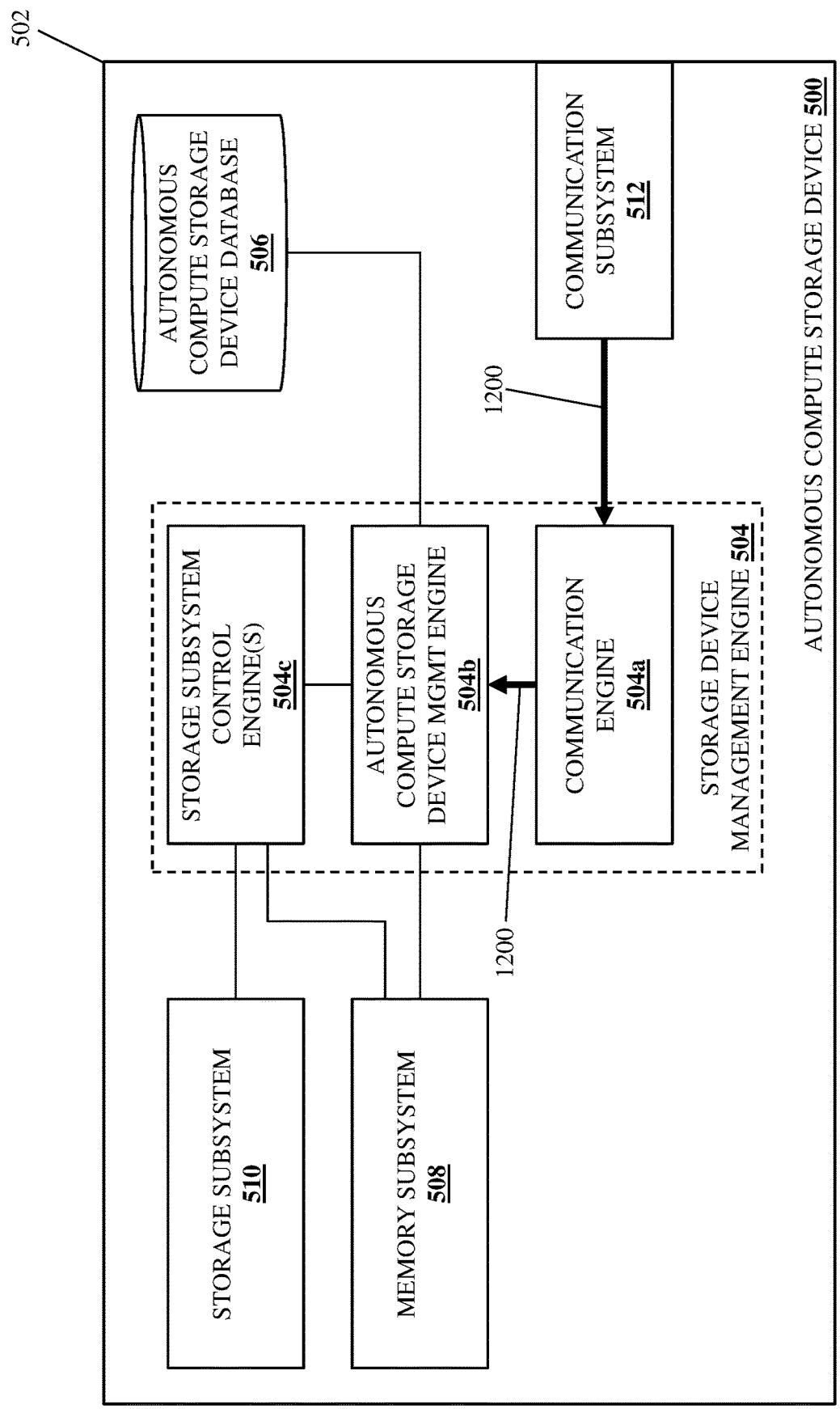
FIG. 12B is a schematic view illustrating an embodiment of the autonomous compute storage device of FIG. 5 operating during the method of FIG. 11.

With reference to FIGS. 12A and 12B, an example of a host-initiated storage operation is illustrated. In an embodiment, at block 1102, the host engine 404 in the computing device 400 may perform storage operation instruction provisioning operations 1200 that include transmitting a storage operation instruction to an autonomous compute storage device 406/500, with the communication engine 504a in the storage device management engine 504 of that autonomous compute storage device 406/500 receiving that storage operation instruction via the communication subsystem 512, and providing that storage operation instruction to the autonomous compute storage device management engine 504b. As discussed in the specific examples provided below, in some embodiments the storage operation instruction is a read instruction that identifies data in the storage subsystem 510 of the autonomous compute storage device 500, while in other embodiments the storage operation instruction is a write instruction that includes data for storage in the storage subsystem 510 of the autonomous compute storage device 500, and in yet other embodiments the storage operation instruction is a background operation instruction that instructs a background operation on data stored in the storage subsystem 510 of the autonomous compute storage device 500. As such, at block 1102, the autonomous compute storage device management engine 504b in the autonomous compute storage device 500 may identify a storage operation for the storage subsystem 510 that was initiated by the host engine 404 by identifying a read operation instructed via a read instruction received from the host engine 404, identifying a write operation instructed via a write instruction received from the host engine 404, or identifying a "self-generated" background operation that may be instructed via a background operation instruction received from the autonomous compute storage device management engine 504b, the storage subsystem control engine(s) 504c, etc.

As will be appreciated by one of skill in the art in possession of the present disclosure in the art in possession of the present disclosure, background operations performed on a storage device may include media scan background operations, garbage collection background operations, error recovery background operations (e.g., a Redundant Array of Independent Disk (RAID) rebuild operation), wear-leveling operations, heat map generation operations (e.g., to generate a "heat" map or other usage map of the storage subsystem 510), and/or other background operations known in the art. Furthermore, while some "system level" background operations may be initiated by the host engine 404 (e.g., media scan background operations may be performed by an operating system provided by the host engine 404) via read instructions and/or write instructions similar to those discussed above, at block 1102 the autonomous compute storage device management engine 504b in the autonomous compute storage device 500 may identify a storage operation for the storage subsystem 510 that was initiated internally to that autonomous compute storage device 500 by identifying a background operation initiated by the storage device and/or subsystems internal to the storage device using a variety of techniques that would be apparent to one of skill in the art in possession of the present disclosure in the art in possession of the present disclosure.

Figure 13A:
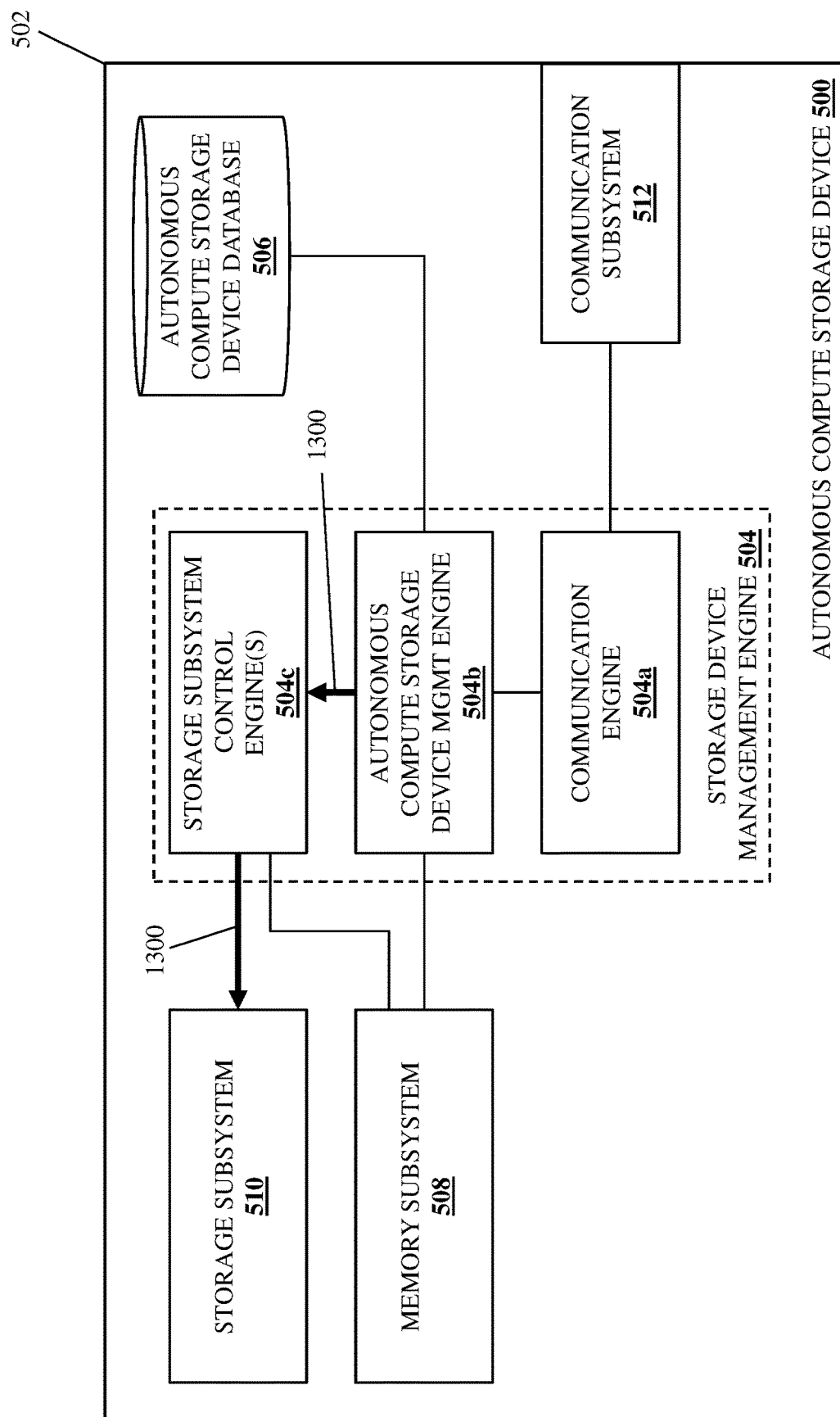
FIG. 13A is a schematic view illustrating an embodiment of the autonomous compute storage device of FIG. 5 operating during the method of FIG. 11.

The method 1100 then proceeds to block 1104 where the storage device performs the storage operation and stores data in a memory subsystem that is accessible to the storage device as part of the performance of the storage operation. With reference to FIG. 13A, in an embodiment block 1104 in which the storage operation is a read operation instructed via a read instruction that identified data in the storage subsystem 510, the autonomous compute storage device management engine 504b in the autonomous compute storage device 500 may perform the read operation by performing storage subsystem data retrieval operations 1300 that may include transmitting a storage subsystem data retrieval instruction that identifies that data to the storage subsystem control engine(s) 504c and that causes the storage subsystem control engine(s) 504c to convert that storage subsystem data retrieval instruction into one or more storage subsystem data retrieval commands and provide those storage subsystem data retrieval command(s) to the storage subsystem 510.

To provide a specific example, at block 1104 the autonomous compute storage device management engine 504b may use an Application Programming Interface (API) to generate a plurality of storage subsystem data retrieval instructions based on the read instruction received from the host engine 404 (e.g., in response to a read instruction from the host engine 404 to read 128 KB of data starting at a particular address in the storage subsystem 510, the autonomous compute storage device management engine 504b may generate a plurality of storage subsystem data retrieval API instructions that identify NAND/flash devices, block, and address combinations that store 4 KB portions of that data), and transmit those storage subsystem data retrieval instructions to the storage subsystem control engine(s) 504c. The storage subsystem control engine(s) 504c may then convert those storage subsystem data retrieval instructions to corresponding storage subsystem retrieval commands (e.g., by converting the storage subsystem data retrieval API instructions to corresponding NAND/flash device commands), and then provide those storage subsystem retrieval commands to the storage subsystem 510.

Figure 13B:
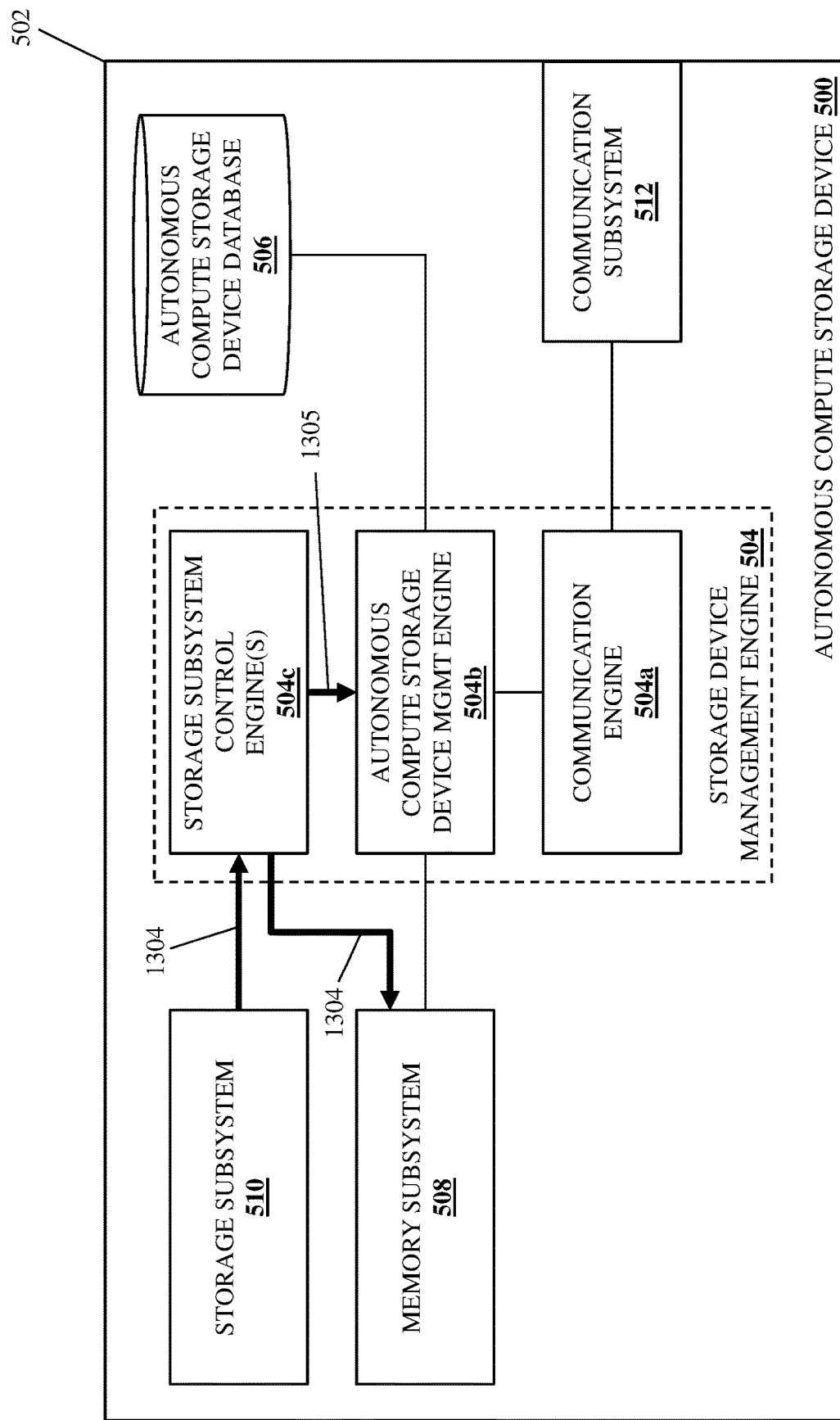
FIG. 13B is a schematic view illustrating an embodiment of the autonomous compute storage device of FIG. 5 operating during the method of FIG. 11.

With reference to FIG. 13B, in response to receiving the storage subsystem data retrieval command(s), the storage subsystem 510 may perform memory system data storage preparation operations to prepare the data identified in the storage subsystem retrieval commands for storage in the memory subsystem 508, and the storage subsystem control engine(s) 504c may then perform memory system data storage operations 1304 that may include retrieving the data from the storage subsystem 510 and storing that data in the memory subsystem 508. As will be appreciated by one of skill in the art in possession of the present disclosure in the art in possession of the present disclosure, the storage subsystem control engine(s) 504c may perform a variety of operations on the data prior to storing it in the memory system 508 such as, for example, descrambling operations, Error Correction Code (ECC) operations, and/or other operations that would be apparent to one of skill in the art in possession of the present disclosure in the art in possession of the present disclosure. In response to storing the data in the memory subsystem 508, the storage subsystem control engine(s) 504c may perform memory subsystem data storage confirmation operations 1305 that may include transmitting a memory subsystem data storage confirmation to the autonomous compute storage device management engine 504b in the storage device management engine 504.

Figure 13C:
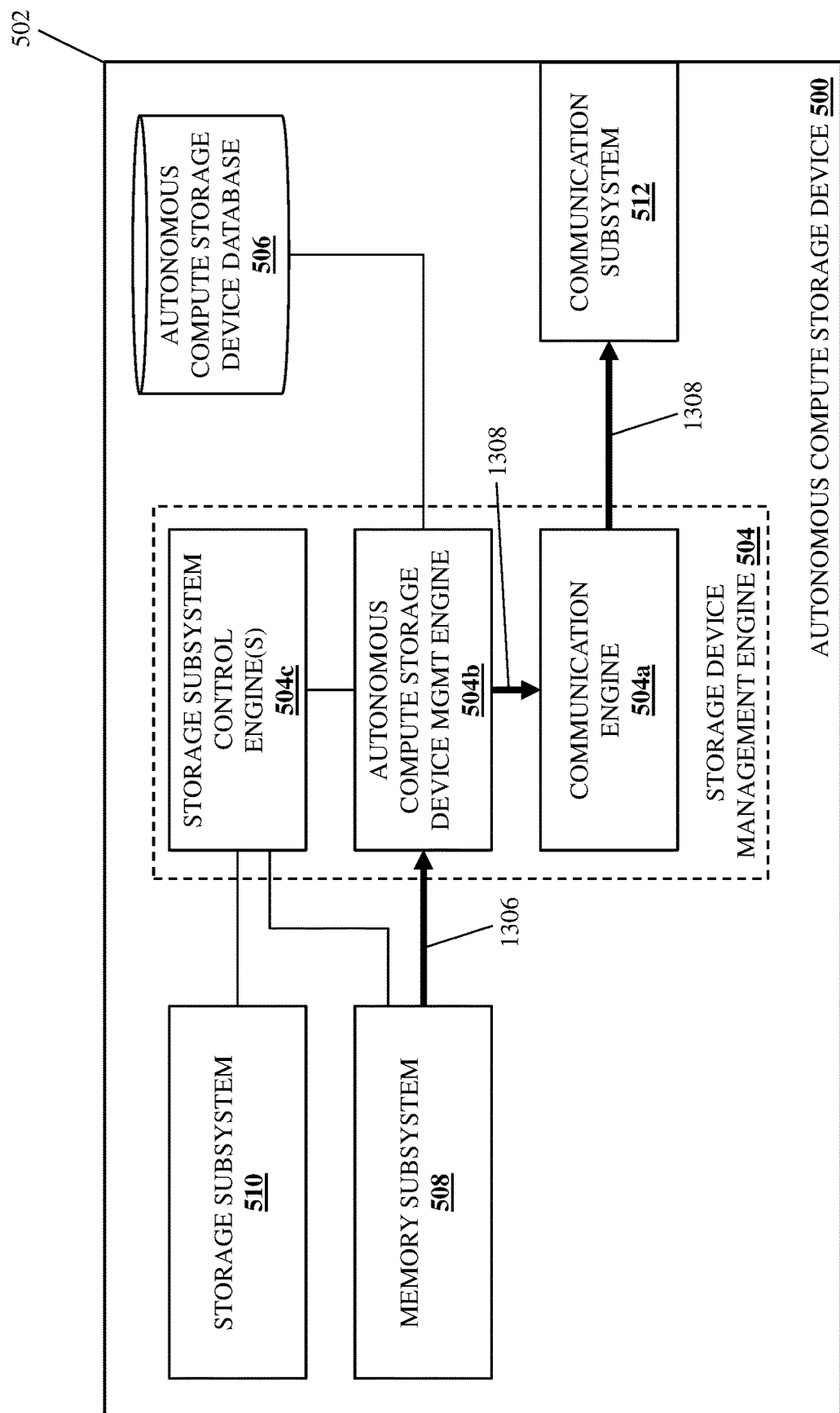
FIG. 13C is a schematic view illustrating an embodiment of the autonomous compute storage device of FIG. 5 operating during the method of FIG. 11.
Figure 13D:
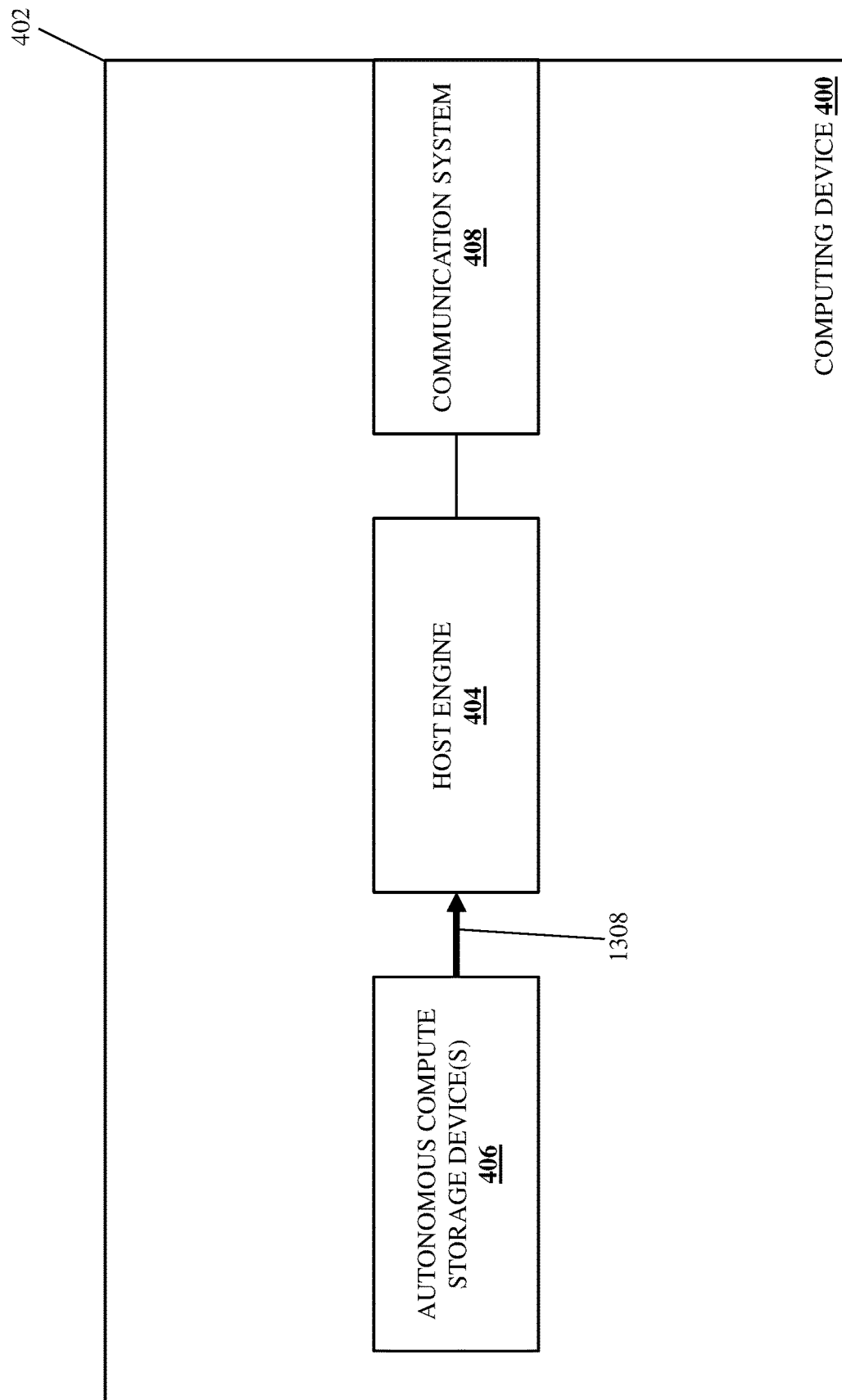
FIG. 13D is a schematic view illustrating an embodiment of the computing device of FIG. 4 operating during the method of FIG. 11.

With reference to FIGS. 13C and 13D, in response to receiving the memory subsystem data storage confirmation, the autonomous compute storage device management engine 504b in the storage device management engine 504 may perform memory subsystem data retrieval operations 1306 that may include retrieving the data from the memory subsystem 508 (i.e., the data that was stored in the memory subsystem 508 by the storage subsystem 510 as part of the read operations performed by the autonomous compute storage device management engine 504b). The autonomous compute storage device management engine 504b may then perform data transmission operations 1308 that may include providing that data to the communication engine 504a in the storage device management engine 504 in order to cause the communication engine 504a to transmit that data via the communication system 512 and to the host engine 404 in order to complete the read operation instructed by the host engine 404. As such, the read operation performed at block 1104 includes storing data that is the subject of the read operation in the memory subsystem 508, and while the read operation is described herein as being completed during block 1104, one of skill in the art in possession of the present disclosure in the art in possession of the present disclosure will appreciate how any or all of the subsequent blocks of the method 1104 may be performed and/or completed prior to the completion of the read operation while remaining within the scope of the present disclosure.

Figure 14A:
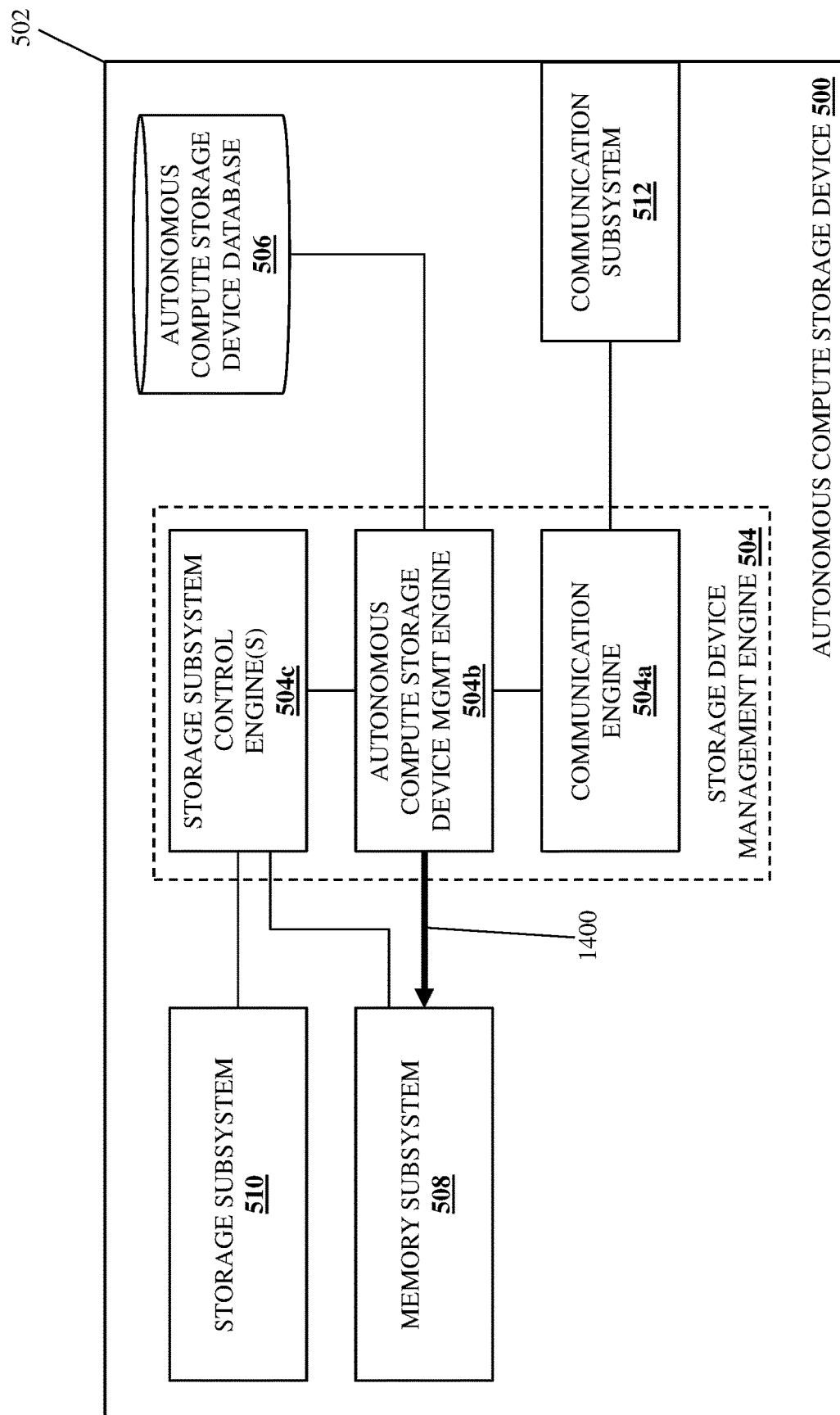
FIG. 14A is a schematic view illustrating an embodiment of the autonomous compute storage device of FIG. 5 operating during the method of FIG. 11.
Figure 14B:
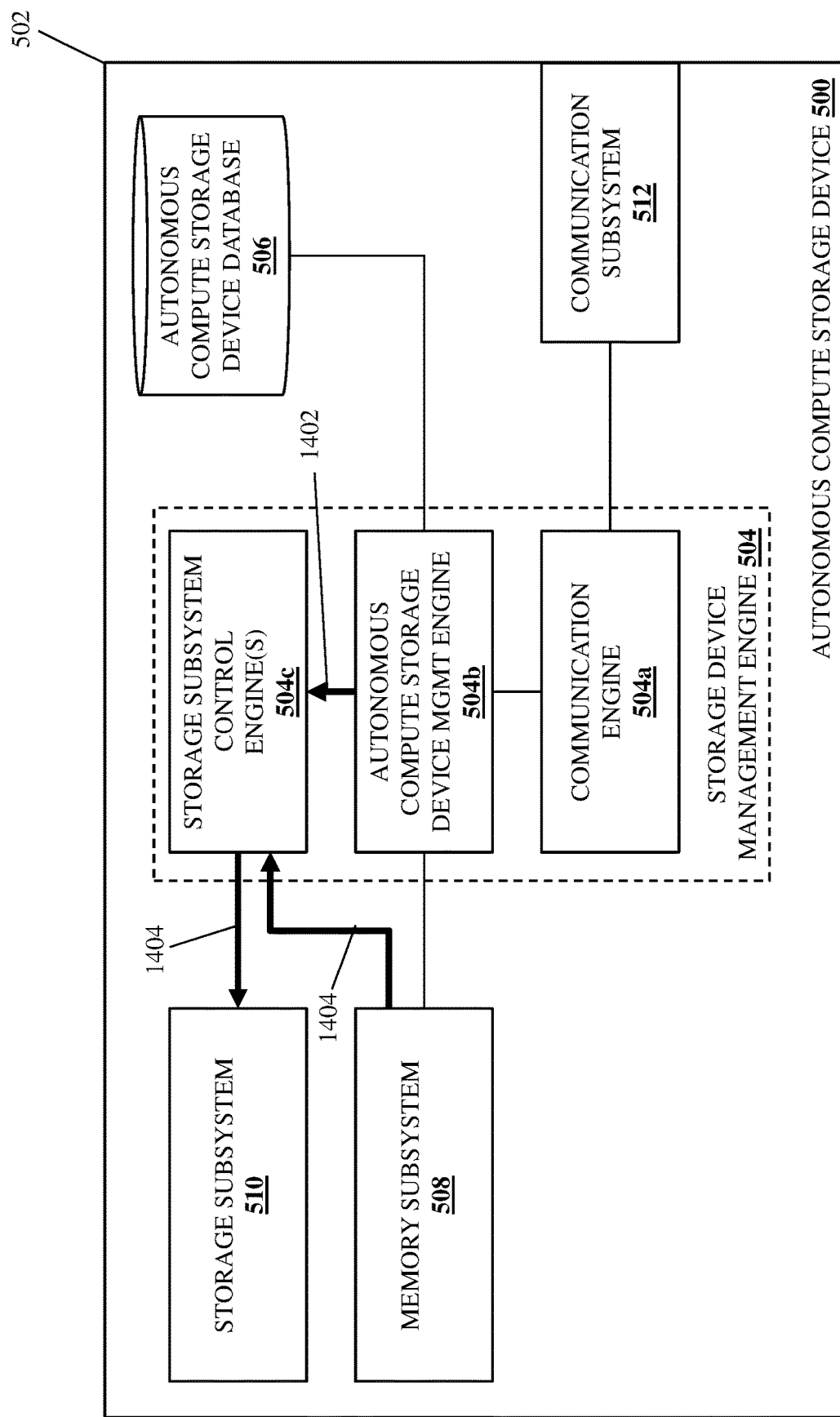
FIG. 14B is a schematic view illustrating an embodiment of the autonomous compute storage device of FIG. 5 operating during the method of FIG. 11.

With reference to FIGS. 14A and 14B, in an embodiment block 1104 in which the storage operation is a write operation instructed via a write instruction that included data for storage in the storage subsystem 510, the autonomous compute storage device management engine 504b in the autonomous compute storage device 500 may perform the write operation by performing memory subsystem data storage operations 1400 that may include storing that data in the memory subsystem 508, as well as by performing storage subsystem data storage instruction provisioning operations 1402 that may include transmitting a storage subsystem data storage instruction that identifies that data in the memory subsystem 508 to the storage subsystem control engine(s) 504c. In response to receiving the storage subsystem data storage instruction, the storage subsystem control engine(s) 504c may perform storage subsystem data storage operations 1404 that may include retrieving the data identified in the storage subsystem data storage instruction from the memory subsystem 508, and storing that data in the storage subsystem 510.

To provide a specific example, at block 1104 the autonomous compute storage device management engine 504b may use an Application Programming Interface (API) to generate a plurality of storage subsystem data storage instructions based on the write instruction received from the host engine 404 (e.g., in response to a write instruction from the host engine 404 to write 128 KB of data in the storage subsystem 510, the autonomous compute storage device management engine 504b may generate a plurality of storage subsystem data storage API instructions that identify NAND/flash devices, block, and address combinations that store 4 KB portions of that data), and transmit those storage subsystem data storage instructions to the storage subsystem control engine(s) 504c. The storage subsystem control engine(s) 504c may then convert those storage subsystem data storage instructions to corresponding storage subsystem storage commands (e.g., by converting the storage subsystem data storage API instructions to corresponding NAND/flash device commands), and then provide those storage subsystem storage commands to the storage subsystem 510.

Figure 14C:
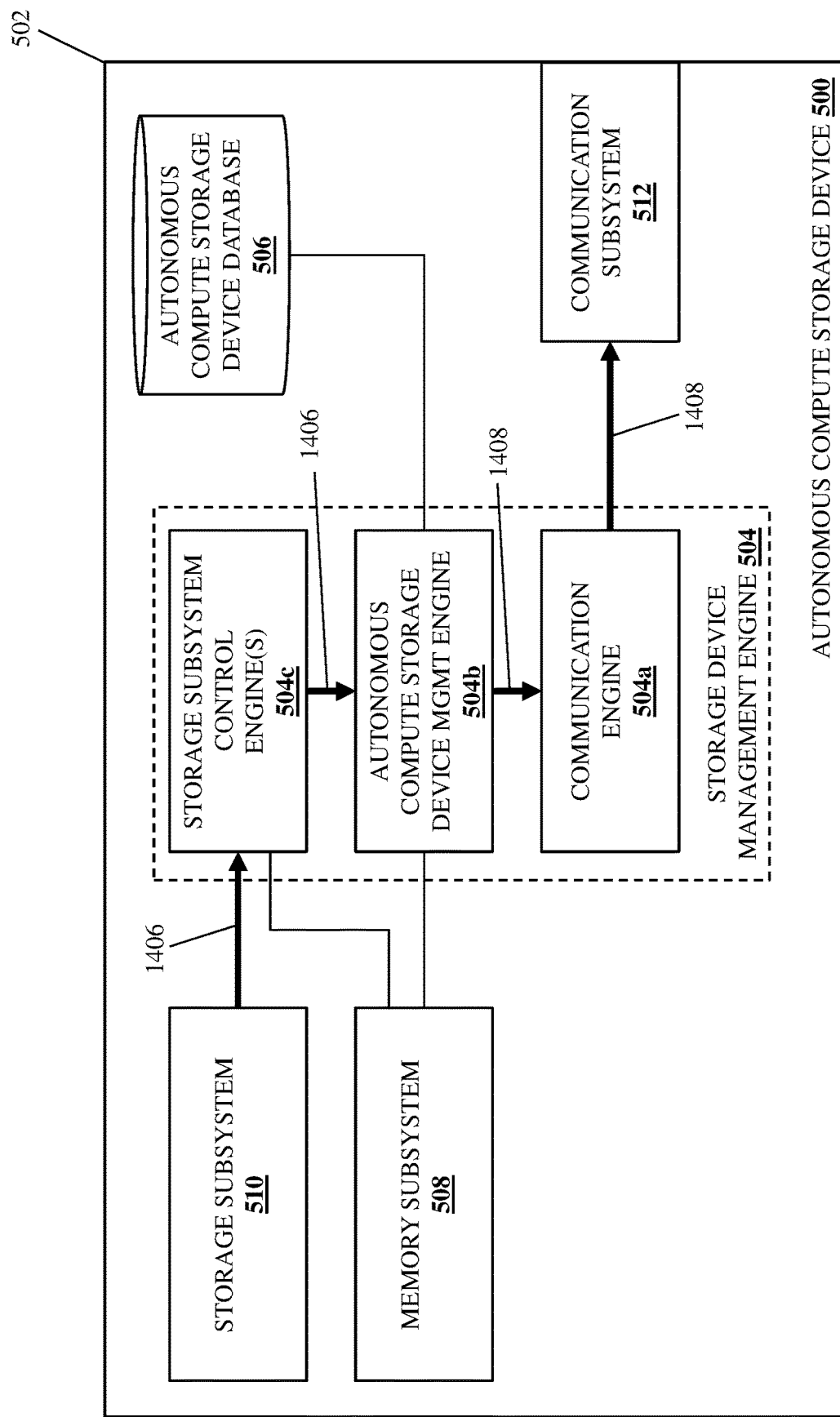
FIG. 14C is a schematic view illustrating an embodiment of the autonomous compute storage device of FIG. 5 operating during the method of FIG. 11.

With continued reference to FIG. 14B, the storage subsystem control engine(s) 504c may perform memory subsystem data retrieval operations 1404 that may include retrieving the data identified in the storage subsystem data storage command(s) from the memory subsystem 508 and providing that data to the storage subsystem 510 for storage according to the storage subsystem storage commands. As will be appreciated by one of skill in the art in possession of the present disclosure in the art in possession of the present disclosure, the storage subsystem control engine(s) 504c may perform a variety of operations on the data prior to storing it in the storage subsystem 510 such as, for example, scrambling operations, Error Correction Code (ECC) operations, and/or other operations that would be apparent to one of skill in the art in possession of the present disclosure in the art in possession of the present disclosure. With reference to FIG. 14C, in response to storing the data in the storage subsystem 510, the storage subsystem 510 may perform storage subsystem data storage confirmation operations 1406 that may include transmitting a storage subsystem data storage confirmation to the storage subsystem control engine(s) 504c in the storage device management engine 504, which causes the storage subsystem control engine(s) 504c to provide a storage subsystem data storage confirmation to the autonomous compute storage device management engine 504b in the storage device management engine 504.

Figure 14D:
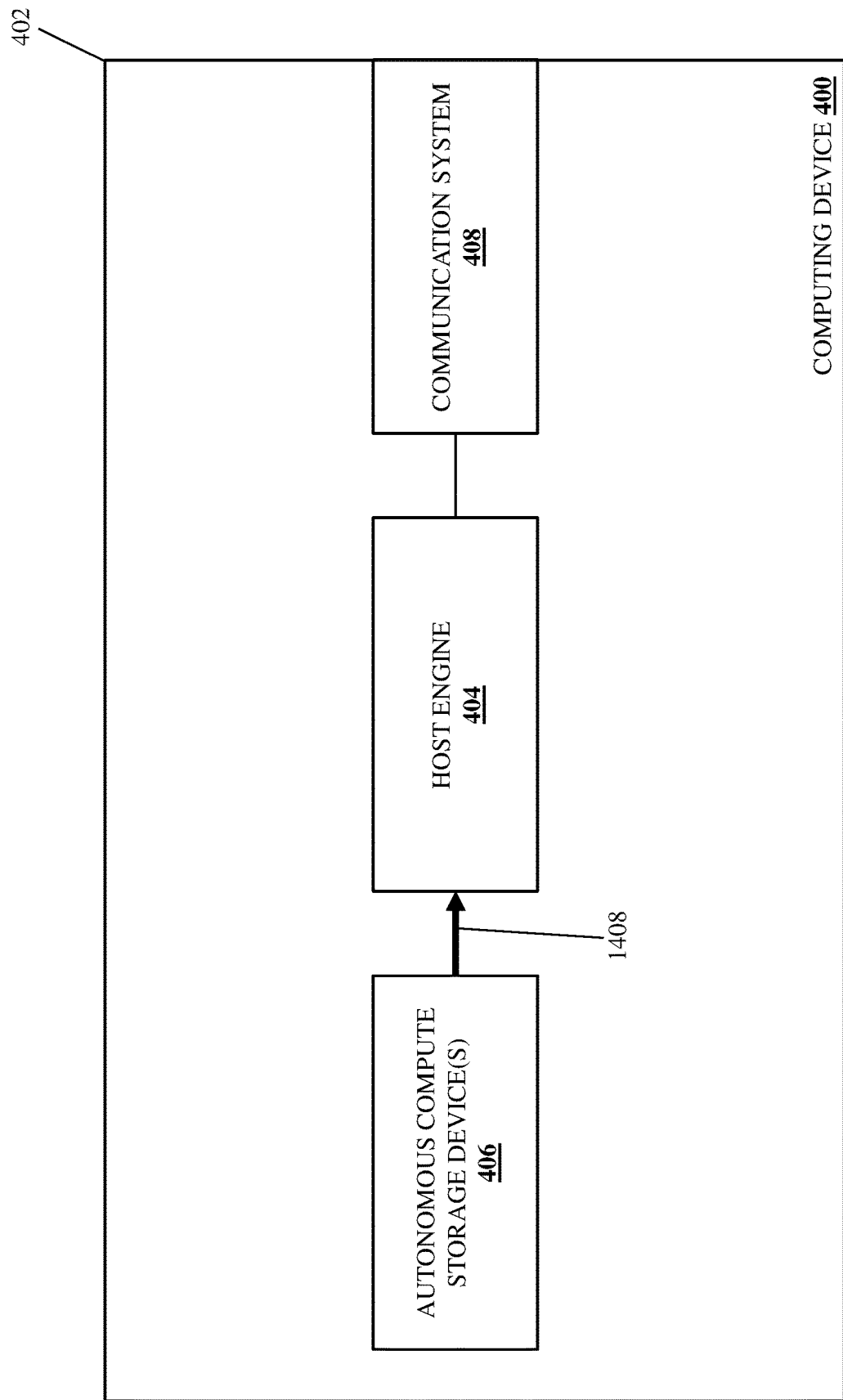
FIG. 14D is a schematic view illustrating an embodiment of the computing device of FIG. 4 operating during the method of FIG. 11.

With reference to FIGS. 14C and 14D, in response to receiving the storage subsystem data storage confirmation, the autonomous compute storage device management engine 504b in the storage device management engine 504 may perform write operation confirmation operations 1408 that may include transmitting a write operation confirmation to the communication engine 504a in the storage device management engine 504 in order to cause the communication engine 504a to transmit that write operation confirmation via the communication system 512 and to the host engine 404 in order to complete the write operation instructed by the host engine 404. As such, the write operation performed at block 1104 includes storing data that is the subject of the write operation in the memory subsystem 508, and while the write operation is described herein as being completed during block 1104, one of skill in the art in possession of the present disclosure in the art in possession of the present disclosure will appreciate how any or all of the subsequent blocks of the method 1104 may be performed and/or completed prior to the completion of the write operation while remaining within the scope of the present disclosure.

Figure 15A:
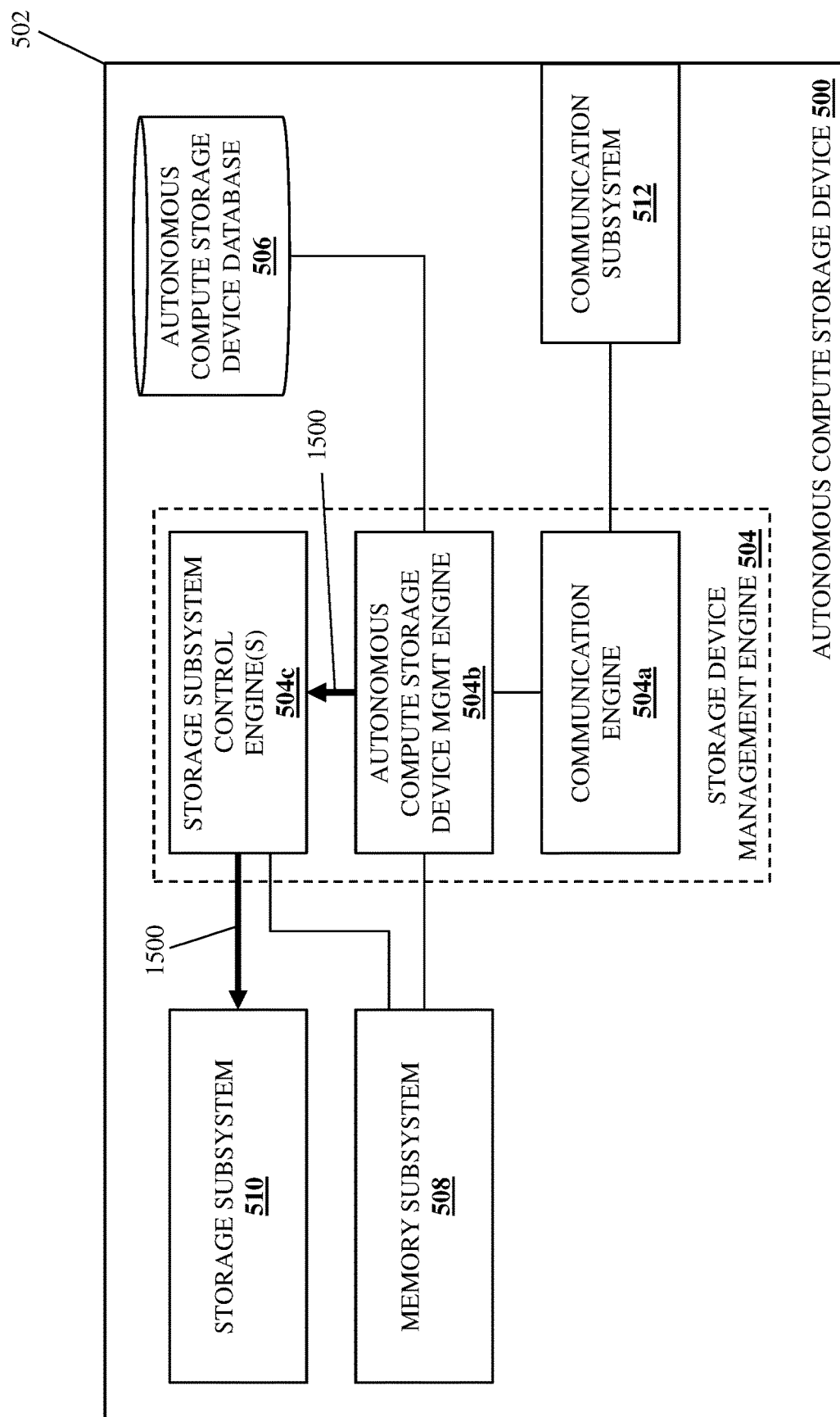
FIG. 15A is a schematic view illustrating an embodiment of the autonomous compute storage device of FIG. 5 operating during the method of FIG. 11.

With reference to FIG. 15A, in an embodiment block 1104 in which the storage operation is a background operation, the autonomous compute storage device management engine 504b in the autonomous compute storage device 500 may perform the background operation by performing storage subsystem data retrieval operations 1500 that may include transmitting a storage subsystem data retrieval instruction that identifies data subject to the background operation to the storage subsystem control engine(s) 504c and that causes the storage subsystem control engine(s) 504c to convert that storage subsystem data retrieval instruction into one or more storage subsystem data retrieval commands and provide those storage subsystem data retrieval command(s) to the storage subsystem 510.

Figure 15B:
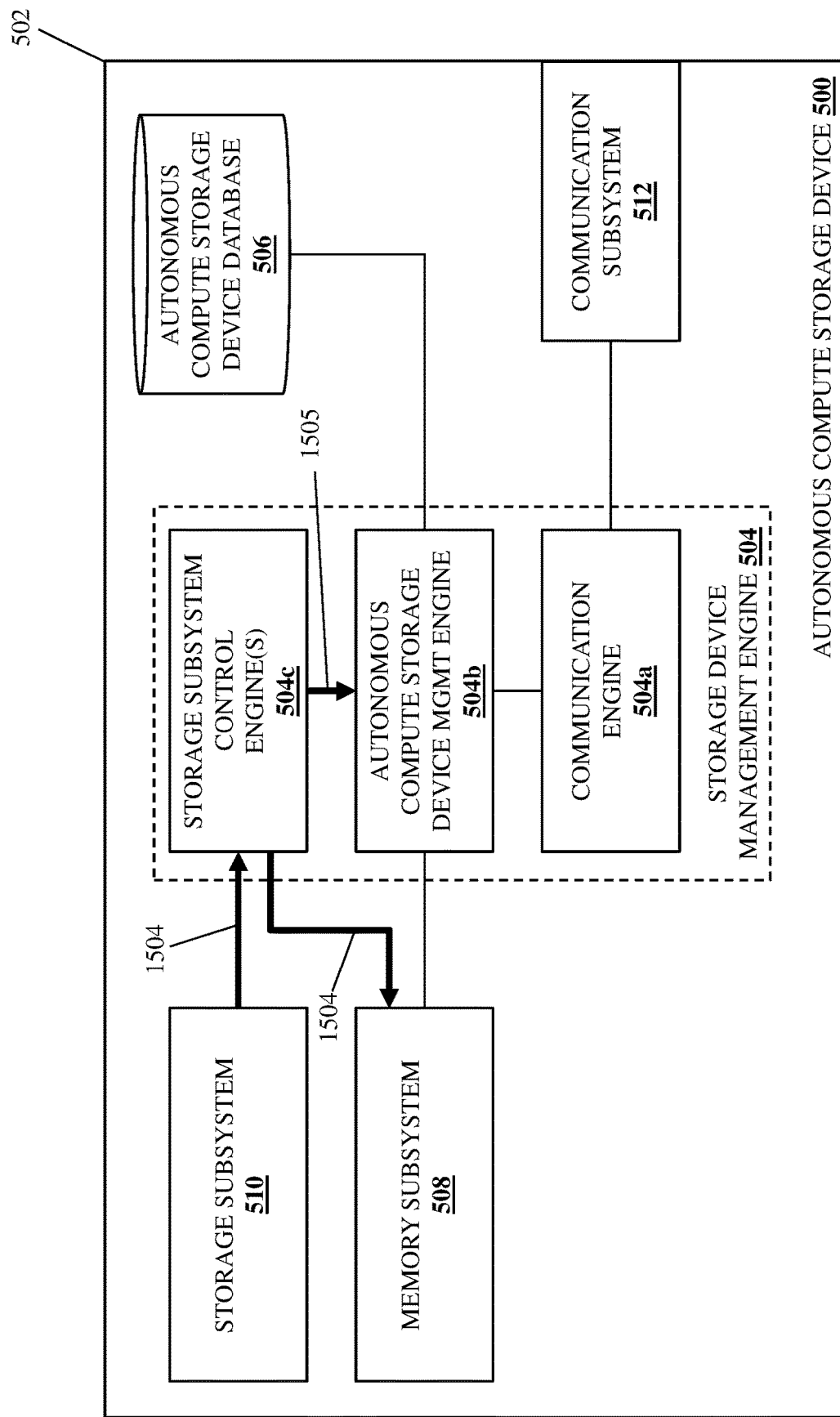
FIG. 15B is a schematic view illustrating an embodiment of the autonomous compute storage device of FIG. 5 operating during the method of FIG. 11.

With reference to FIG. 15B, in response to receiving the storage subsystem data retrieval command(s), the storage subsystem 510 may perform memory subsystem data storage preparation operations to prepare the data identified in the storage subsystem retrieval commands for storage in the memory subsystem 508, and the storage subsystem control engine(s) 504c may then perform memory system data storage operations 1504 that may include retrieving the data from the storage subsystem 510 and storing that data in the memory subsystem 508. Furthermore, in response to storing the data in the memory subsystem 508, the storage subsystem control engine(s) 504c may perform memory subsystem data storage confirmation operations 1505 that may include transmitting a memory subsystem data storage confirmation to the autonomous compute storage device management engine 504b in the storage device management engine 504.

Figure 15C:
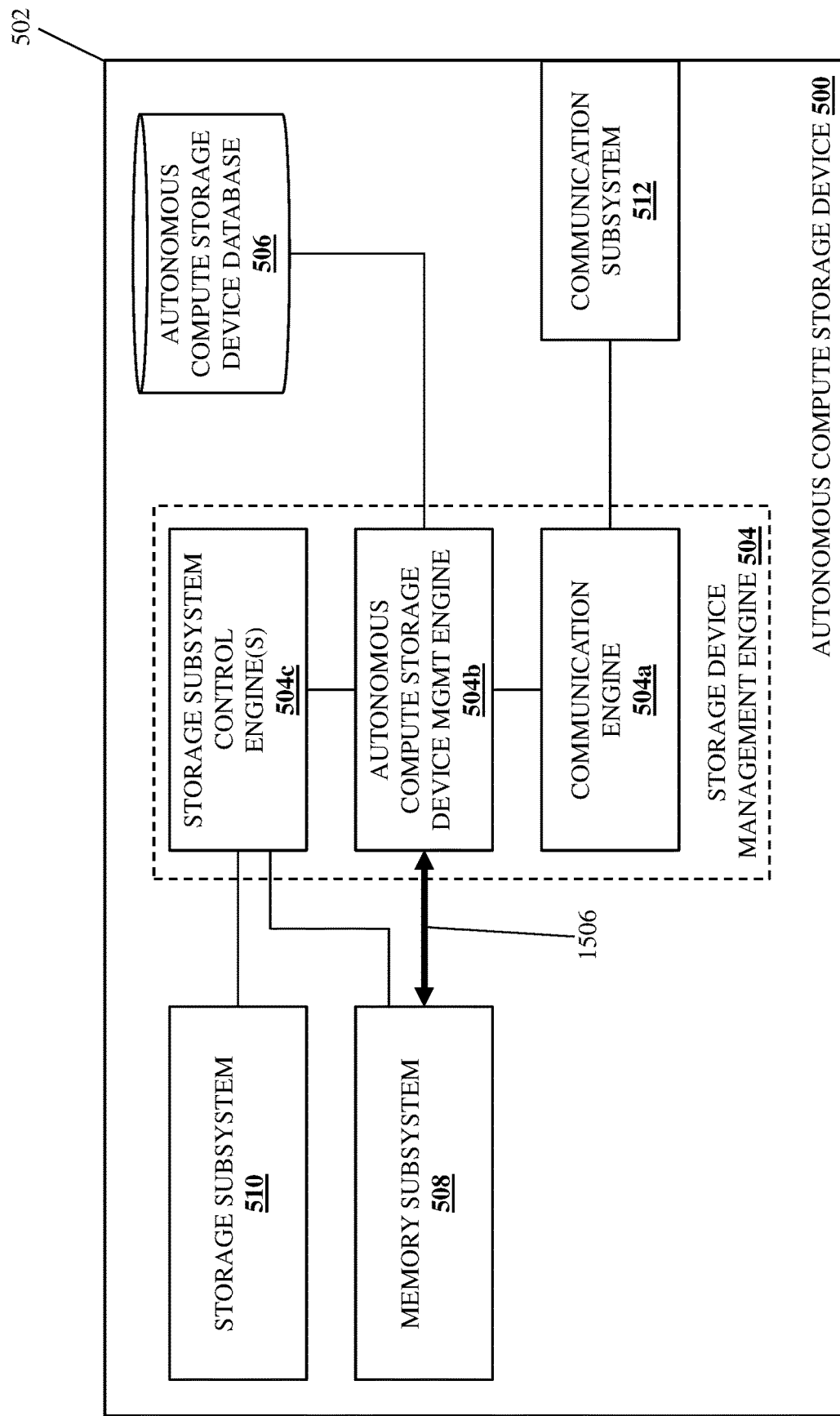
FIG. 15C is a schematic view illustrating an embodiment of the autonomous compute storage device of FIG. 5 operating during the method of FIG. 11.

In response to receiving the memory subsystem data storage confirmation, the autonomous compute storage device management engine 504b in the storage device management engine 504 may perform a variety of different operations in order to perform the background operation at block 1104. For example, with reference to FIG. 15C, the autonomous compute storage device management engine 504b may perform memory subsystem data processing operations 1506 that may include retrieving the data from the memory subsystem 508 (i.e., the data that was stored in the memory subsystem 508 by the storage subsystem 510 as part of the read operations performed by the autonomous compute storage device management engine 504b), performing any of a variety of background operation data processing operations on that data that would be apparent to one of skill in the art in possession of the present disclosure in the art in possession of the present disclosure to generate processed data, and then storing that processed data in the memory subsystem 508.

Figure 15D:
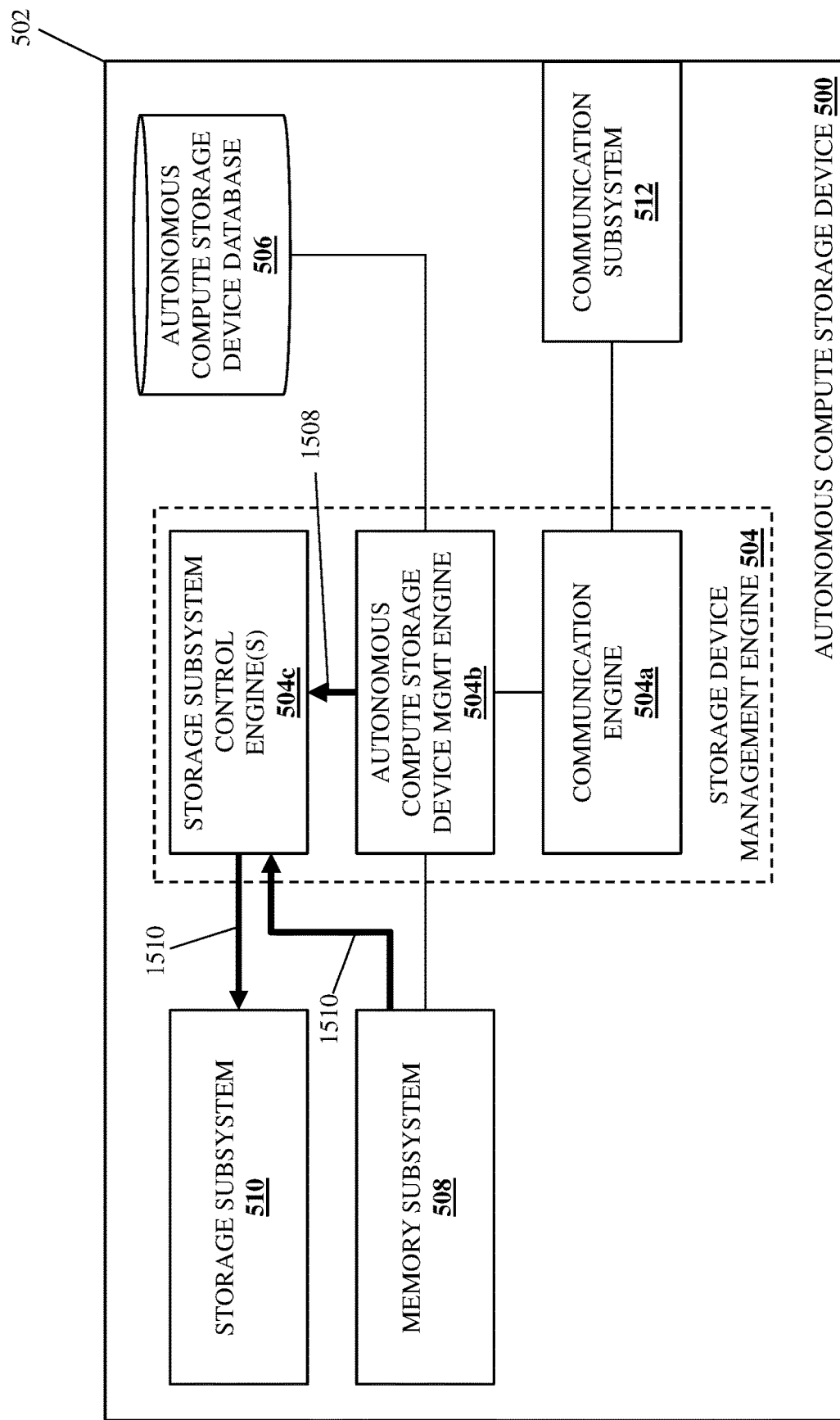
FIG. 15D is a schematic view illustrating an embodiment of the autonomous compute storage device of FIG. 5 operating during the method of FIG. 11.

In another example, with reference to FIG. 15D, the autonomous compute storage device management engine 504b may perform storage subsystem data storage instruction provisioning operations 1508 that may include transmitting a storage subsystem data storage instruction that identifies the processed data in the memory subsystem 508 to the storage subsystem control engine(s) 504c and that causes the storage subsystem control engine(s) 504c to convert that storage subsystem data storage instruction into one or more storage subsystem data storage commands and provide those storage subsystem data storage command(s) to the storage subsystem 510. Furthermore, the storage subsystem control engine(s) 504c may also perform memory subsystem data retrieval operations 1510 that may include retrieving the data identified in the storage subsystem data storage command(s) from the memory subsystem 508 and storing that data in the storage subsystem 510.

Figure 15E:
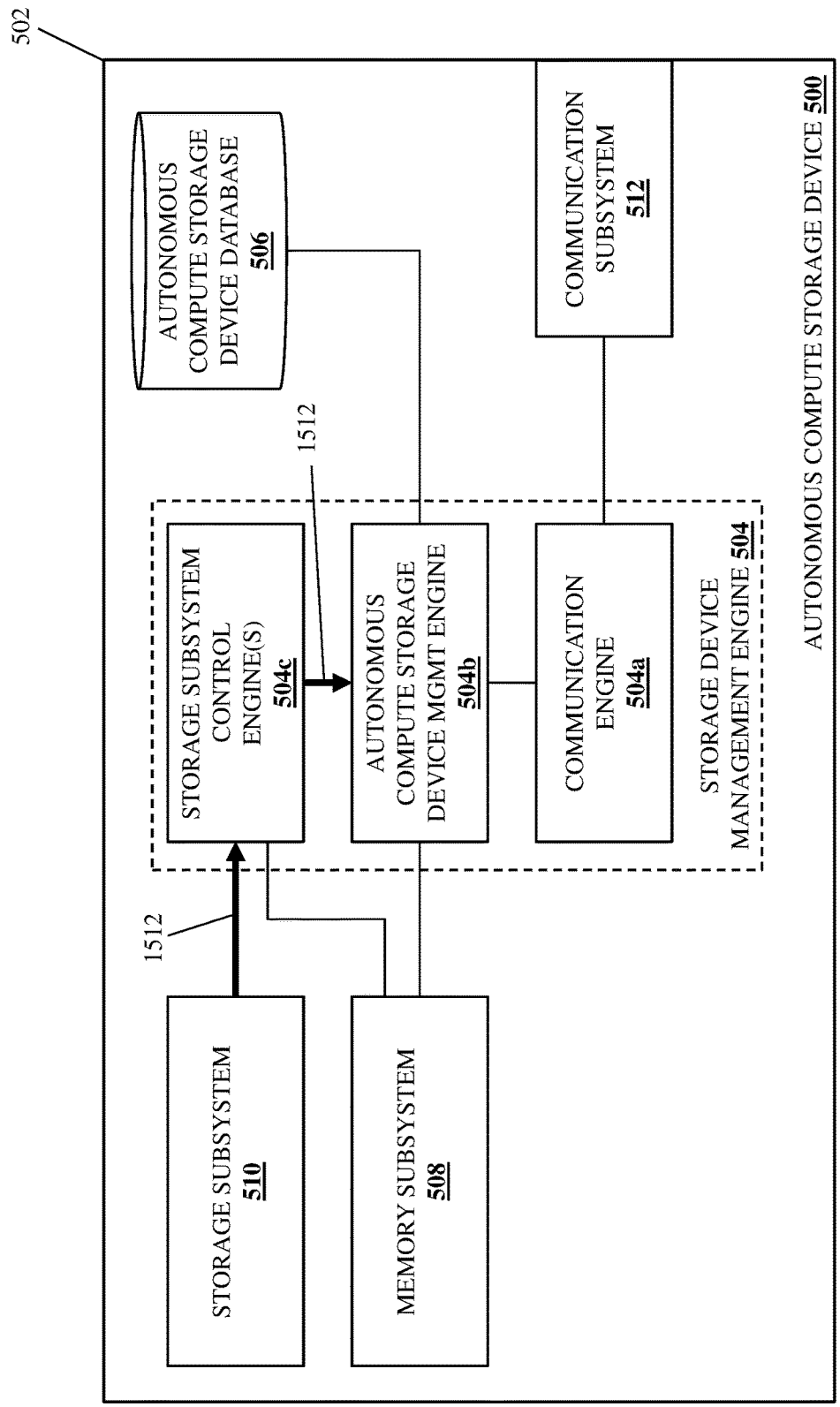
FIG. 15E is a schematic view illustrating an embodiment of the autonomous compute storage device of FIG. 5 operating during the method of FIG. 11.

In another example, with reference to FIG. 15E and in some cases in response to storing the data in the storage subsystem 510, the storage subsystem 510 may perform background operation result transmission operations 1512 that include transmitting result(s) and/or other data associated with the background operations to the storage subsystem control engine(s) 504c in the storage device management engine 504, which causes the storage subsystem control engine(s) 504c to provide the result(s) and/or other data associated with the background operations to the autonomous compute storage device management engine 504b in the storage device management engine 504.

As will be appreciated by one of skill in the art in possession of the present disclosure in the art in possession of the present disclosure, one or more of the background operation actions illustrated and described above with reference to FIGS. 15A-15F, as well as other background operation actions known in the art, may be performed in the autonomous compute storage device 406/500 in order to perform the background operations at block 1104. For example, as discussed above, the background operation performed at block 1104 may be a media scan background operation, a garbage collection background operation, an error recovery background operation such as a RAID rebuild operations, a wear-leveling operation, a heat map generation operation, and/or other background operations known in the art, and one of skill in the art in possession of the present disclosure in the art in possession of the present disclosure will appreciate how different combinations of reads of data from the storage subsystem 510, writes of data to the storage subsystem 510, processing of data to produce processed data, reporting of unprocessed data or processed data to the host engine 404 and/or via the network, and/or other background operation actions may be performed based on the specific goals of the background operation being performed. As such, the background operation performed at block 1104 includes storing data that is the subject of the background operation in the memory subsystem 508, and while the background operation is described herein as being completed during block 1104, one of skill in the art in possession of the present disclosure in the art in possession of the present disclosure will appreciate how any or all of the subsequent blocks of the method 1104 may be performed and/or completed prior to the completion of the read operation while remaining within the scope of the present disclosure.

While several specific examples of the storage of data in the memory subsystem as part of a storage operation have been described, one of skill in the art in possession of the present disclosure will appreciate that data may be stored in a variety of memory subsystems as part of a variety of storage operations, followed by the operations of the method 1100 discussed below being performed using that data while remaining within the scope of the present disclosure as well. For example, as part of the streaming of data from the storage subsystem 310 to another storage subsystem as part of DMA operations, that data may be placed in temporary FIFO memory, temporary holding buffer memory, and/or other DMA memory subsystems known in the art, and then the subsequent blocks of the method 1100 may be performed using that data while remaining within the scope of the present disclosure as well. As such, while the discussion below focuses on read operations, write operations, and background operations, other storage operations may result in data being stored in a memory subsystem and allow the autonomous compute operations described herein to be performed similarly as discussed below.

Figure 16:
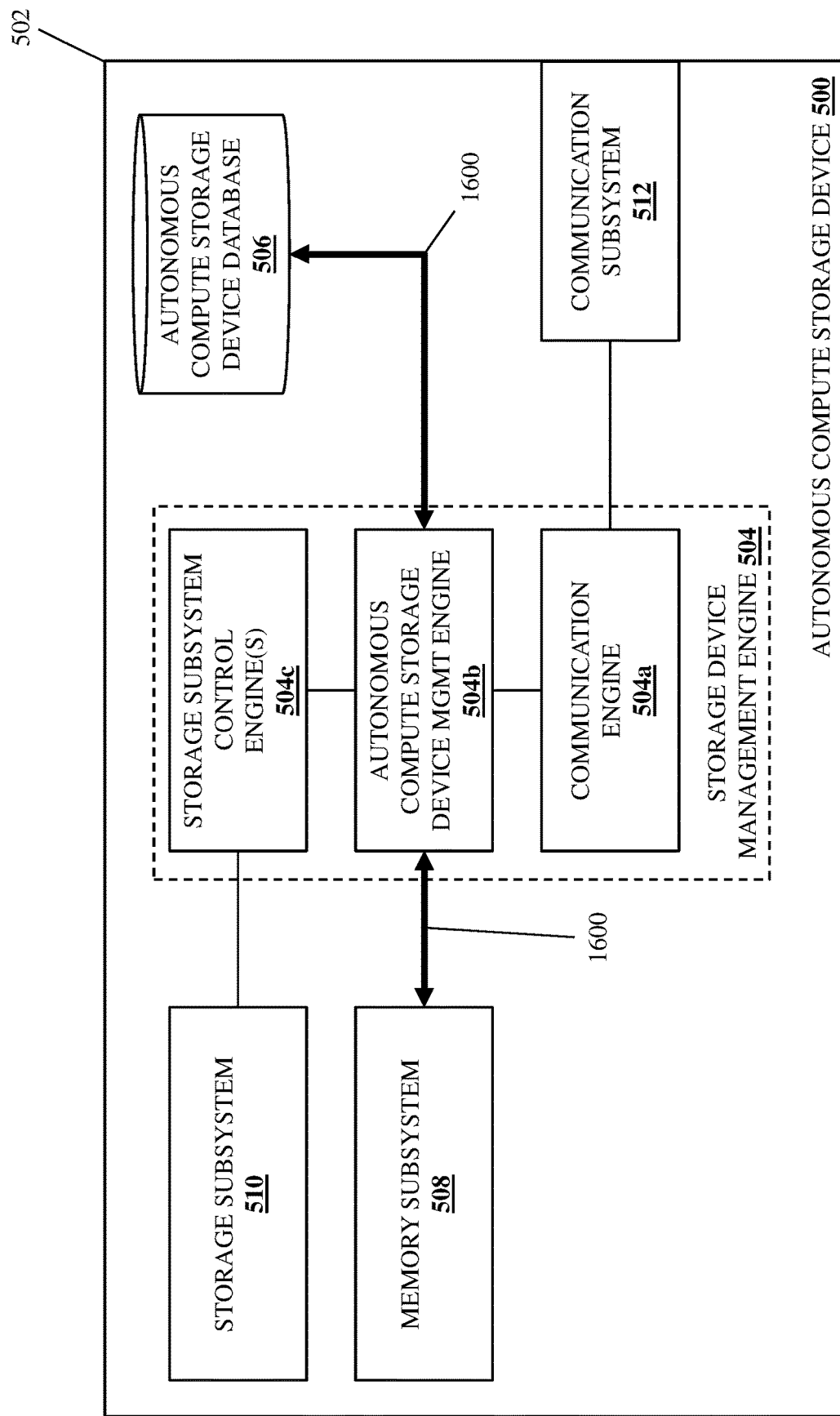
FIG. 16 is a schematic view illustrating an embodiment of the autonomous compute storage device of FIG. 5 operating during the method of FIG. 11.
Figure 17A:
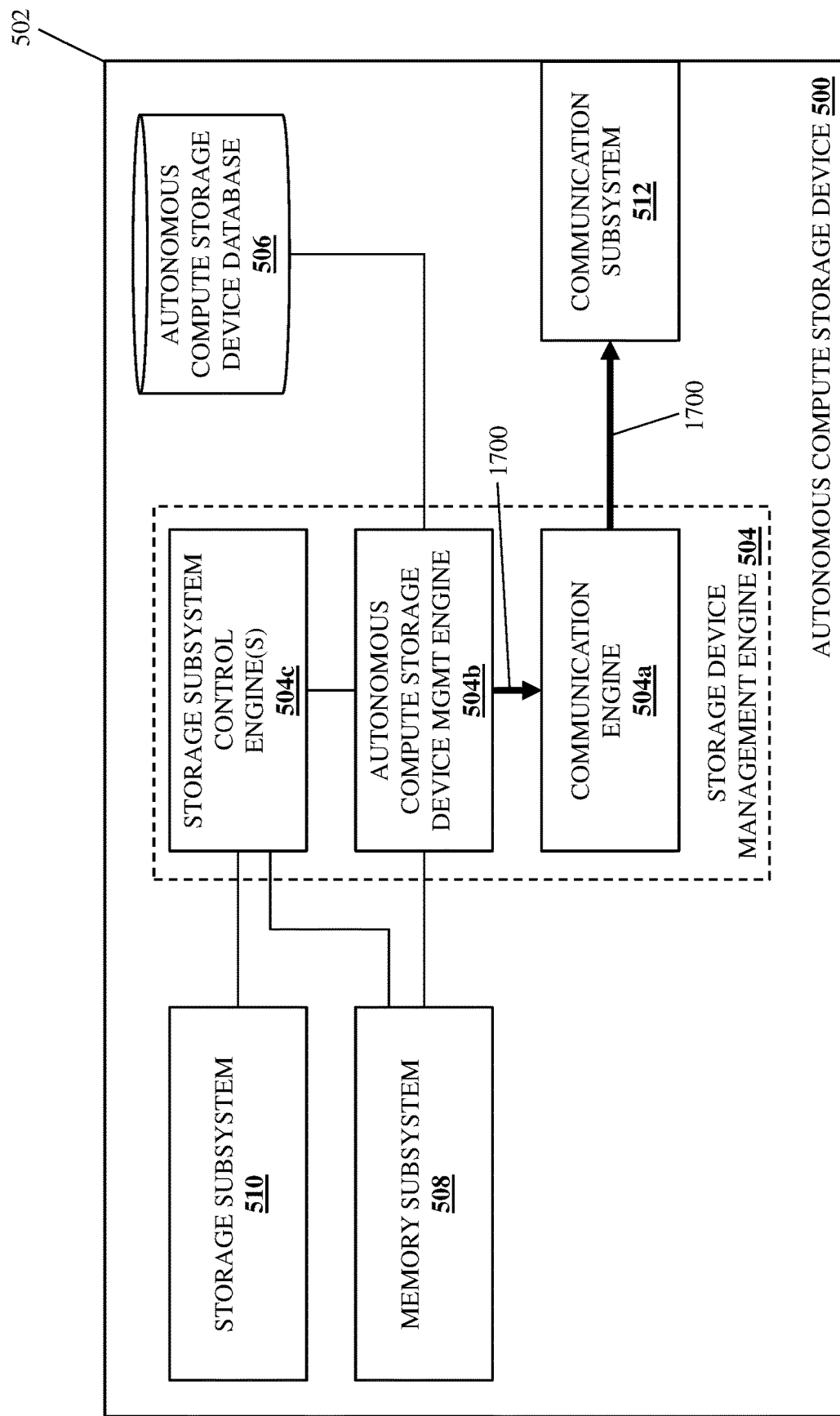
FIG. 17A is a schematic view illustrating an embodiment of the autonomous compute storage device of FIG. 5 operating during the method of FIG. 11.
Figure 17B:
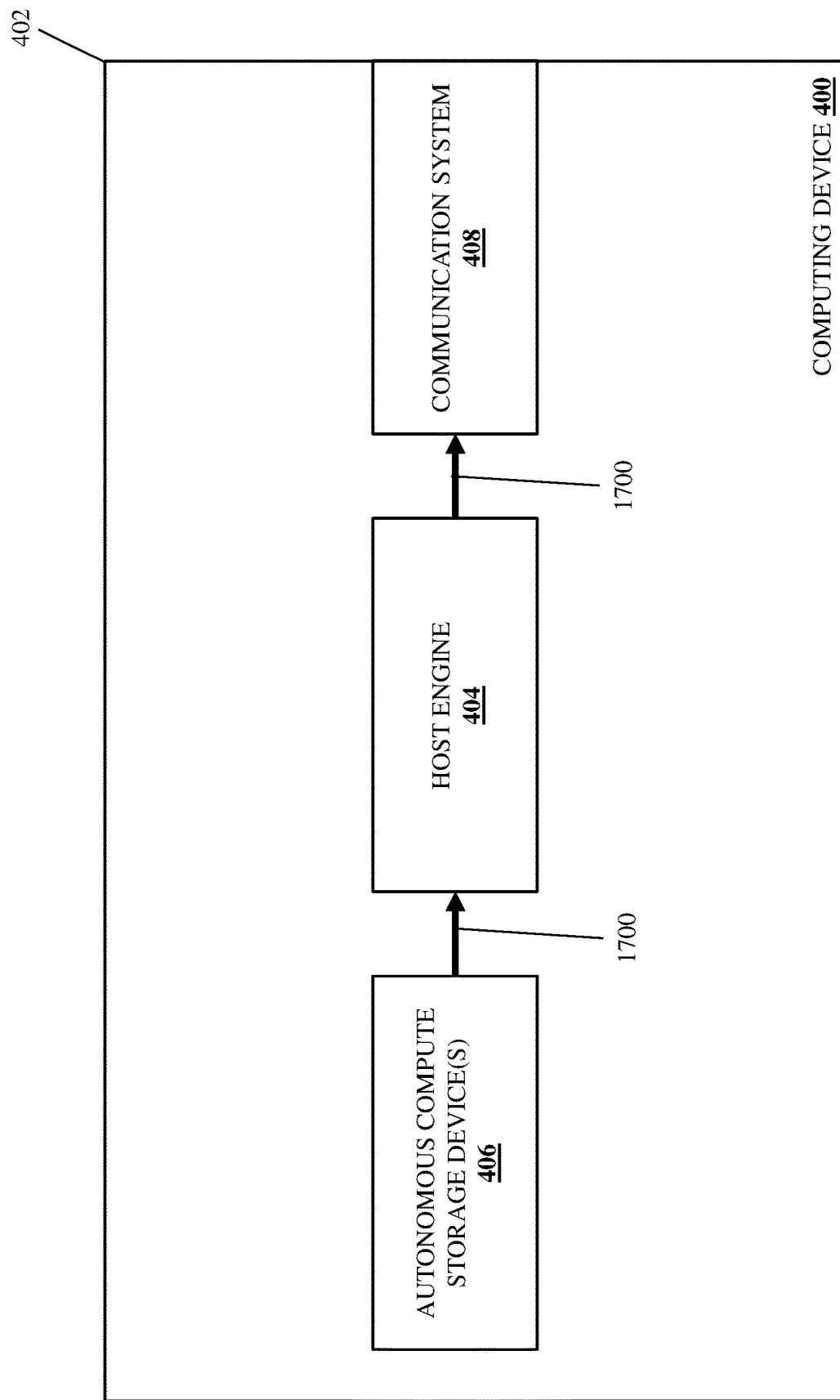
FIG. 17B is a schematic view illustrating an embodiment of the computing device of FIG. 4 operating during the method of FIG. 11.
Figure 17D:
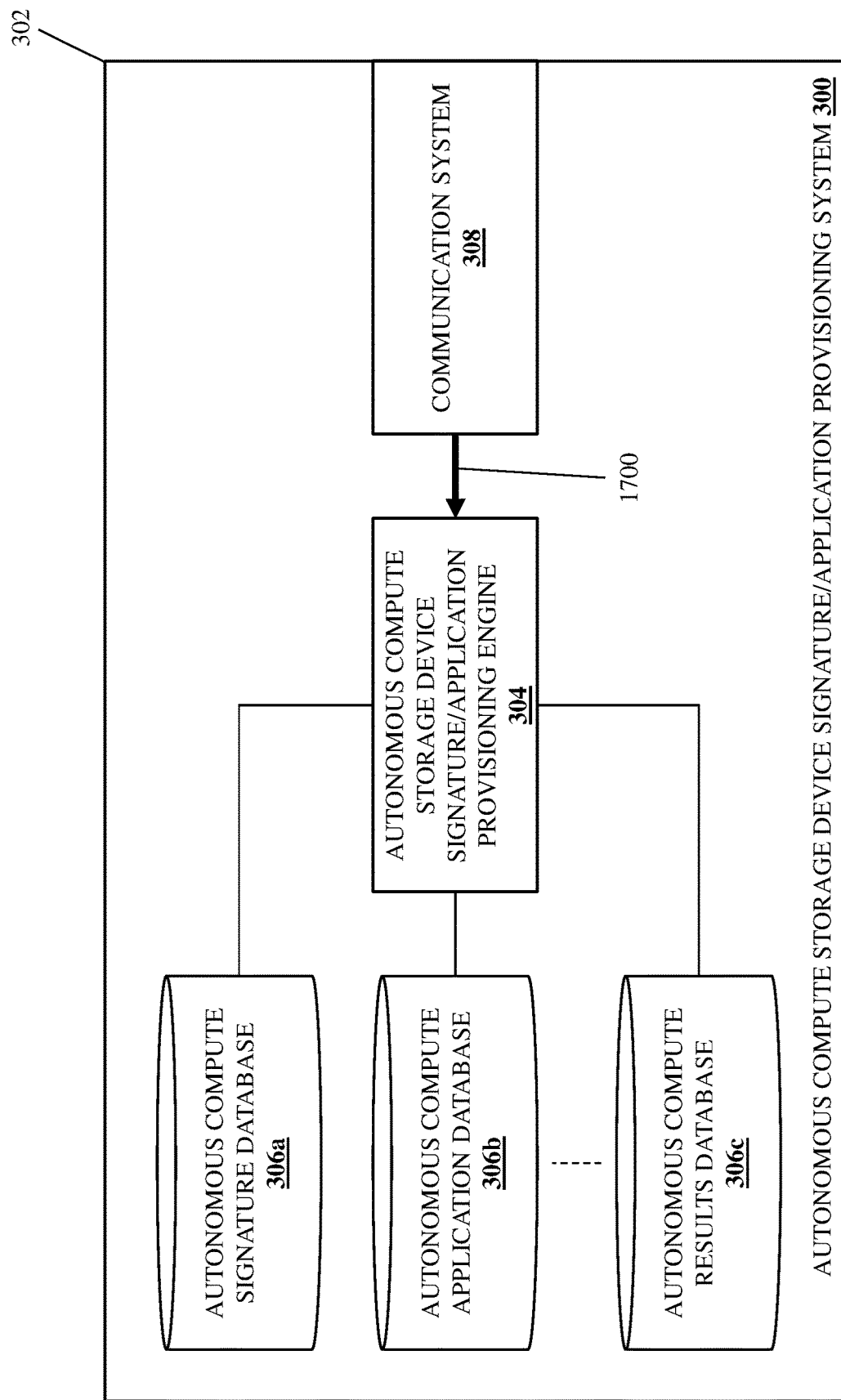
FIG. 17D is a schematic view illustrating an embodiment of the autonomous compute storage device signature/application provisioning system of FIG. 3 operating during the method of FIG. 11.

The method 1100 then proceeds to decision block 1106 where it is determined whether an autonomous compute signature matches the data that was stored in the memory subsystem. With reference to FIG. 16, in an embodiment of decision block 1106, the autonomous compute storage device management engine 504b may perform data/autonomous compute signature matching operations 1600 that may include accessing the data that was stored in the memory subsystem 508 as part of the storage operations 1104 discussed above and determining whether that data matches any autonomous compute signatures that were stored in the autonomous compute storage device database 506 (e.g., during the method 800 described above). As such, one of skill in the art in possession of the present disclosure will appreciate how multiple autonomous compute signatures may be compared to any particular data stored in the memory subsystem 508, and how any particular data may match more than one autonomous compute signature and, in turn, trigger the execution of more than one autonomous compute application, discussed below.

Continuing with the specific example provided above, the autonomous compute signatures stored in the autonomous compute storage device database 506 may include an autonomous compute signature algorithm that may be configured to be executed on the data that was stored in the memory subsystem 508 as part of the storage operations 1104, and an autonomous compute signature definition that defines the "signature" of data that triggers the execution of the corresponding autonomous compute application for that autonomous compute signature. As such, at decision block 1106, the autonomous compute signature algorithm (e.g., provided by a hash algorithm, a Cyclic Redundancy Check (CRC) algorithm, a decryption algorithm, and/or other data transformation algorithms known in the art) may be performed on the data that was stored in the memory subsystem 508 as part of the storage operations 1104 in order to transform that data to produce a data signature, and the autonomous compute signature definition may be compared to that data signature to determine whether there is a match.

However, one of skill in the art in possession of the present disclosure will appreciate how simplified scenarios may exist where the autonomous compute signature definition is compared directly to a data signature of the data at issue (rather than a transformation of that data), and thus embodiments of the autonomous compute signature algorithm may include a "identity function" that does not modify or transform the data. Thus, while autonomous compute signatures having autonomous compute signature algorithms and autonomous compute signature definitions have been described, one of skill in the art in possession of the present disclosure will appreciate how the autonomous compute signature algorithms may be omitted in some scenarios (e.g., in the embodiments in which transformation of the data at issue is not required) while remaining within the scope of the present disclosure as well. Furthermore, while the use of a particular autonomous compute signature has been described, one of skill in the art in possession of the present disclosure will appreciate how other autonomous compute signatures will fall within the scope of the present disclosure as well.

If, at decision block 1106, it is determined that an autonomous compute signature does not match the data that was stored in the memory subsystem, the method 1100 returns to block 1102. As such, the method 1100 may loop through blocks 1102 and 1104 such that the storage device identifies storage operations for its storage subsystem, performs those storage operations and stores data in its memory subsystem as part of those storage operations, and determines whether that data stored in its memory subsystem matches any autonomous compute signatures stored in its autonomous compute storage device database as long as no data is found to match any of those autonomous compute signatures. As will be appreciated by one of skill in the art in possession of the present disclosure, in some embodiments, following a determination that data stored in its memory subsystem 508 does not match any autonomous compute signatures stored in its autonomous compute storage device database 506, the autonomous compute storage device management engine 504b may erase that data from the memory subsystem 508 (e.g., in order to ensure sufficient storage space in the memory subsystem for subsequent storage operations), although embodiments in which data stored in the memory subsystem 508 remains in that memory subsystem 508 subsequent to determining that it does not match any autonomous compute signatures (at least for some period of time) will fall within the scope of the present disclosure as well.

If, at decision block 1106, it is determined that an autonomous compute signature matches the data that was stored in the memory subsystem, the method 1100 proceeds to decision block 1108 where it is determined whether an autonomous compute application corresponding to the autonomous compute signature is included in the storage device. In some embodiments, in response to determining that an autonomous compute signature matches the data that was stored in the memory subsystem 508, the autonomous compute storage device management engine 504b may be configured to generate an alert and transmit that alert to the host engine 404, to a device or system connected to the network 204, and/or to any other entity that would be apparent to one of skill in the art in possession of the present disclosure.

As discussed above, in some embodiments autonomous compute signatures included in autonomous compute signature/application combinations may be stored in the autonomous compute storage device database 506 without their corresponding autonomous compute application. As such, in those embodiments and in response to determining that the data that was stored in the memory subsystem 508 as part of the storage operations performed at block 1104 matches an autonomous compute signature, at decision block 1108 the autonomous compute storage device management engine 504b may determine whether the autonomous compute application corresponding to that autonomous compute signature is stored in the autonomous compute storage device database 506. However, one of skill in the art in possession of the present disclosure will appreciate how in embodiments in which autonomous compute signatures are stored with their corresponding autonomous compute applications (e.g., in the autonomous compute storage device database 506), decision block 1106 and subsequent block 1108 may be skipped.

If, at decision block 1108, it is determined that an autonomous compute application corresponding to the autonomous compute signature is not included in the storage device, the method 1100 proceeds to block 1110 where the storage device retrieves the autonomous compute application corresponding to the autonomous compute signature. With reference to FIGS. 17A, 17B, 17C, and 17D, in an embodiment and in response to determining that the autonomous compute application is not included in the storage device at decision block 1106, at block 1110 the autonomous compute storage device management engine 504b may perform autonomous compute application request operations 1700 that may include generating an autonomous compute application request that identifies the autonomous compute application corresponding to the autonomous compute signature that matched the data stored in the memory subsystem 508 at decision block 1106, transmitting the autonomous compute application request to the communication engine 504a in order to cause the communication engine 504a to transmit the autonomous compute application request via the communication subsystem 512. In the illustrated embodiment, that autonomous compute application request is received by the host engine 404 that forwards that autonomous compute application request via the communication system 408 and through a network 204 to the autonomous compute storage device signature/application provisioning system 206 such that the autonomous compute storage device signature/application provisioning engine 304 receives the autonomous compute application request via its communication system 308.

However, while the autonomous compute application request is illustrated and described as being transmitted to the autonomous compute storage device signature/application provisioning system 206 via the host engine 404, one of skill in the art in possession of the present disclosure will appreciate how the autonomous compute storage device 406/500 may be configured to transmit the autonomous compute application request directly to the autonomous compute storage device signature/application provisioning system 206 and without the use of the host engine 404 while remaining within the scope of the present disclosure as well.

Figure 18A:
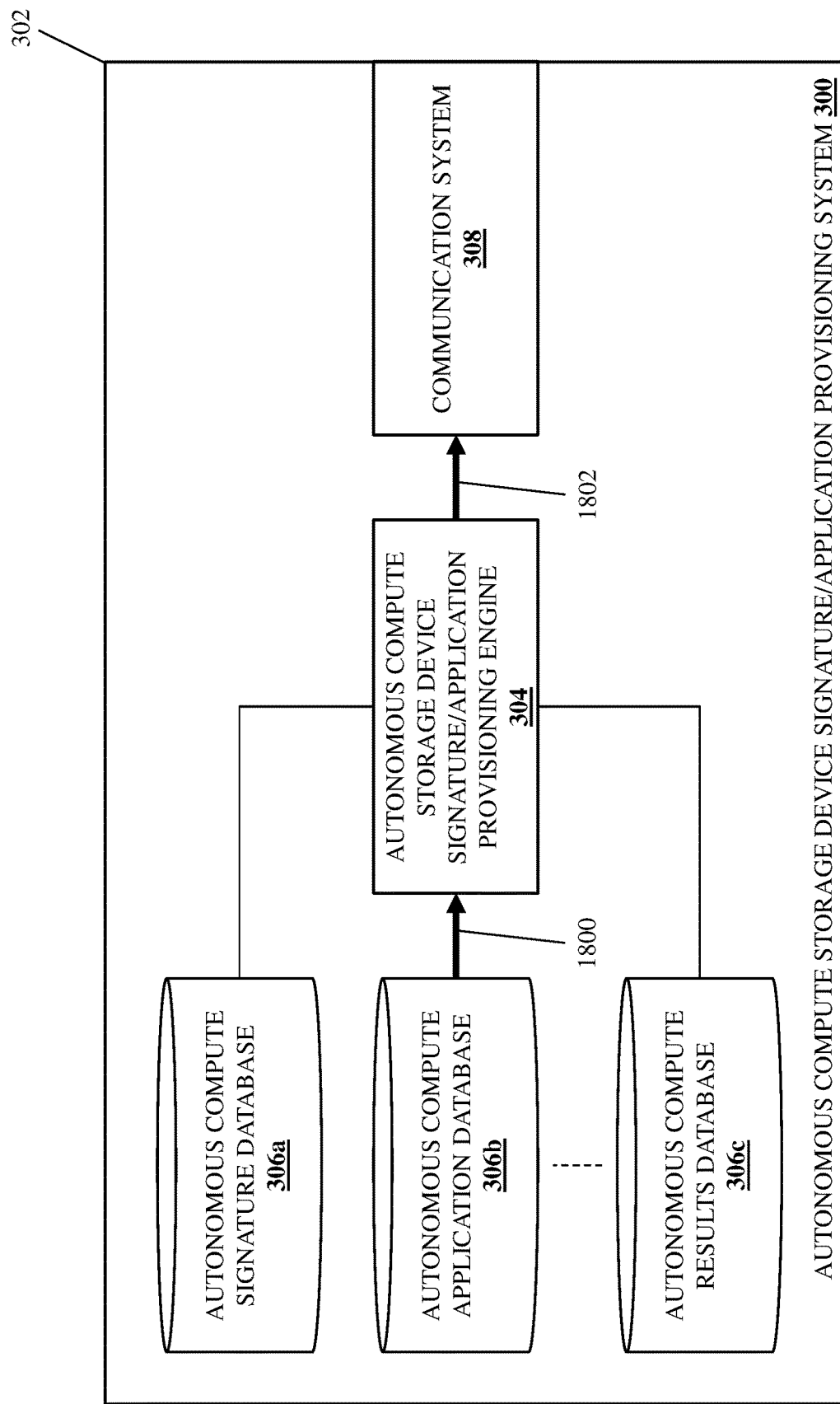
FIG. 18A is a schematic view illustrating an embodiment of the autonomous compute storage device signature/application provisioning system of FIG. 3 operating during the method of FIG. 11.
Figure 18D:
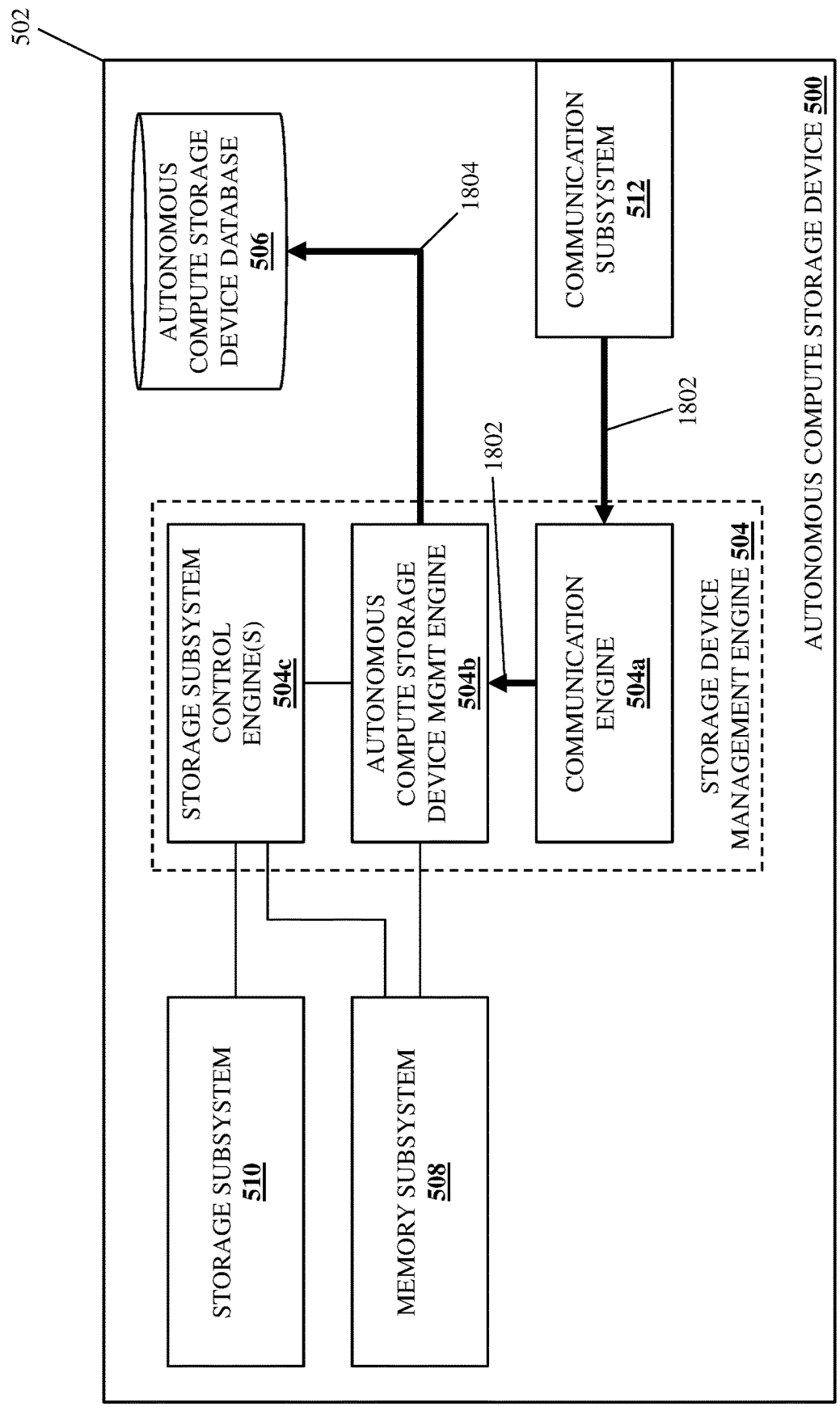
FIG. 18D is a schematic view illustrating an embodiment of the autonomous compute storage device of FIG. 5 operating during the method of FIG. 11.

With reference to FIG. 18A, in response to receiving the autonomous compute application request, the autonomous compute storage device signature/application provisioning engine 304 may perform autonomous compute application retrieval operations 1800 that may include retrieving the autonomous compute application identified in the autonomous compute application request from the autonomous compute application database 306b. As will be appreciated by one of skill in the art in possession of the present disclosure, the autonomous compute application retrieval operations 1800 may be configured to retrieve the latest version of the autonomous compute application identified in the autonomous compute application request (i.e., when autonomous compute applications are regularly updated by, for example, the autonomous compute storage device signature/application developer system(s) 208). Furthermore, with reference to FIGS. 18A, 18B, 18C, and 18D, in response to retrieving the autonomous compute application, the autonomous compute storage device signature/application provisioning engine 304 may perform autonomous compute application provisioning operations 1802 that include transmitting the autonomous compute application via its communication system 308 and through the network 204 to the computing device 202/400. In the illustrated embodiment, the host engine 404 receives the autonomous compute application via is communication system 408 and transmits that autonomous compute application to the autonomous compute storage device 406/500 such that the autonomous compute storage device management engine 504b receives that autonomous compute application via its communication system 512 and the communication engine 504a, and performs autonomous compute application storage operations 1804 that may include storing the autonomous compute application in the autonomous compute storage device database 506.

However, while the autonomous compute application is illustrated and described as being transmitted to the autonomous compute storage device 406/500 via the host engine 404, one of skill in the art in possession of the present disclosure will appreciate how the autonomous compute storage device signature/application provisioning system 206 may be configured to transmit the autonomous compute application request directly to the autonomous compute storage device 406/500 and without the use of the host engine 404 while remaining within the scope of the present disclosure as well. Furthermore, while the autonomous compute application is illustrated and described as being stored in the autonomous compute storage device database 506 after being retrieved from the autonomous compute storage device signature/application provisioning system 206, one of skill in the art in possession of the present disclosure will appreciate how the autonomous compute application may be utilized as discussed below following its retrieval from the autonomous compute storage device signature/application provisioning system 206 and without the need to store it in the autonomous compute storage device database 506 while remaining within the scope of the present disclosure as well.

Figure 19:
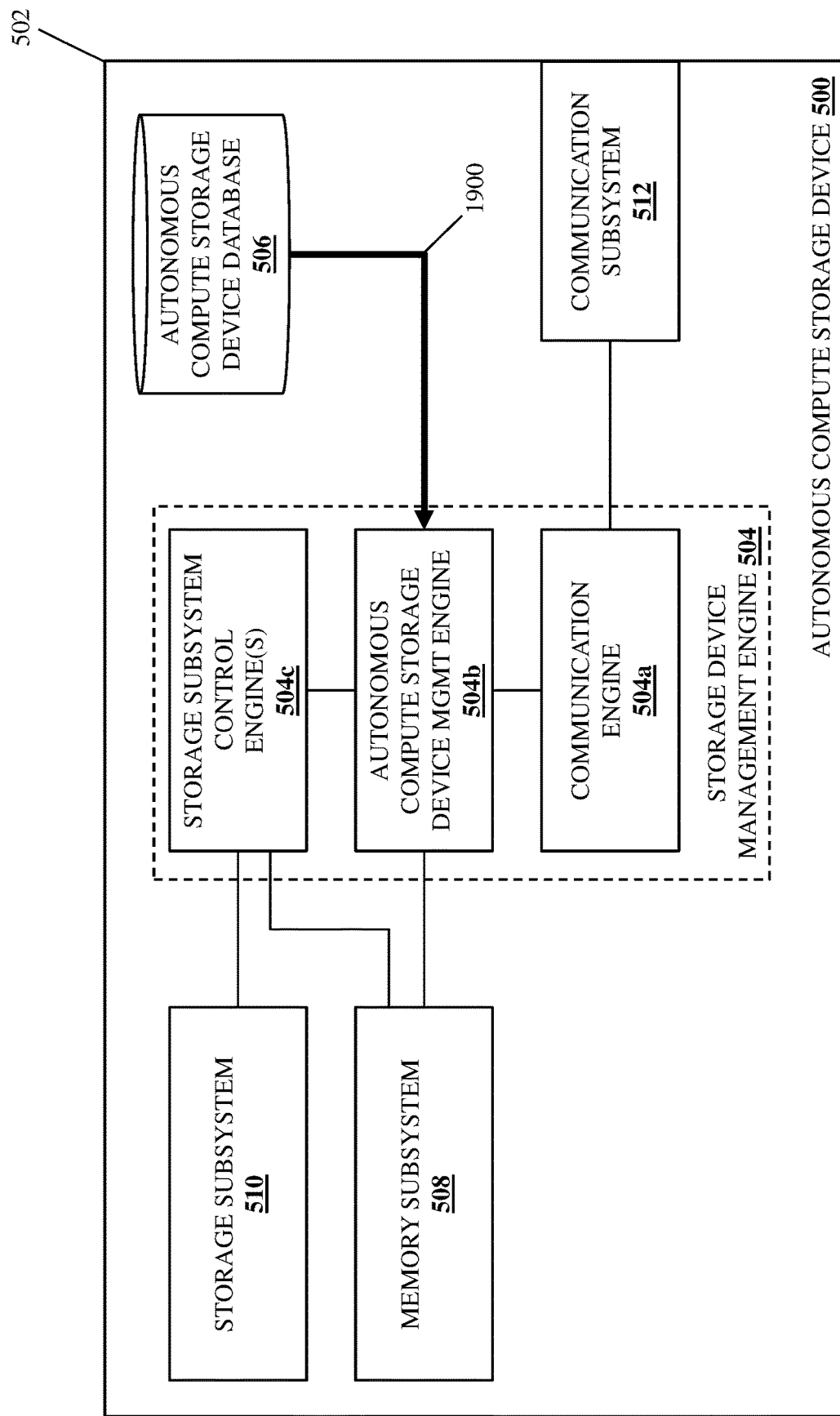
FIG. 19 is a schematic view illustrating an embodiment of the autonomous compute storage device of FIG. 5 operating during the method of FIG. 11.

Following block 1110, or if at decision block 1106 it is determined that an autonomous compute application corresponding to the autonomous compute signature is included in the storage device, the method 1100 proceeds to block 1112 where the storage device executes the autonomous compute application corresponding to the autonomous compute signature to perform compute operations associated with the data that was stored in the memory subsystem and generate one or more compute operation results. With reference to FIG. 19, in an embodiment of block 1112, the autonomous compute storage device management engine 504b may perform autonomous compute application retrieval operations 1900 that may include retrieving the autonomous compute application from the autonomous compute storage device database 506. As such, in some examples the autonomous compute application retrieved from the autonomous compute storage device database 506 at block 1112 may have been stored in the autonomous compute storage device database 506 along with the autonomous compute signature that matched the data in the memory subsystem 508 at decision block 1106. In other examples the autonomous compute application retrieved from the autonomous compute storage device database 506 at block 112 may have been stored in the autonomous compute storage device database 506 following its retrieval from the autonomous compute storage device signature/application provisioning system 206 at block 1110. Furthermore, in yet other examples and as discussed above, the autonomous compute application need not be retrieved from the autonomous compute storage device database 506, and rather may be utilized as retrieved from the autonomous compute storage device signature/application provisioning system 206 at block 1110.

Figure 20:
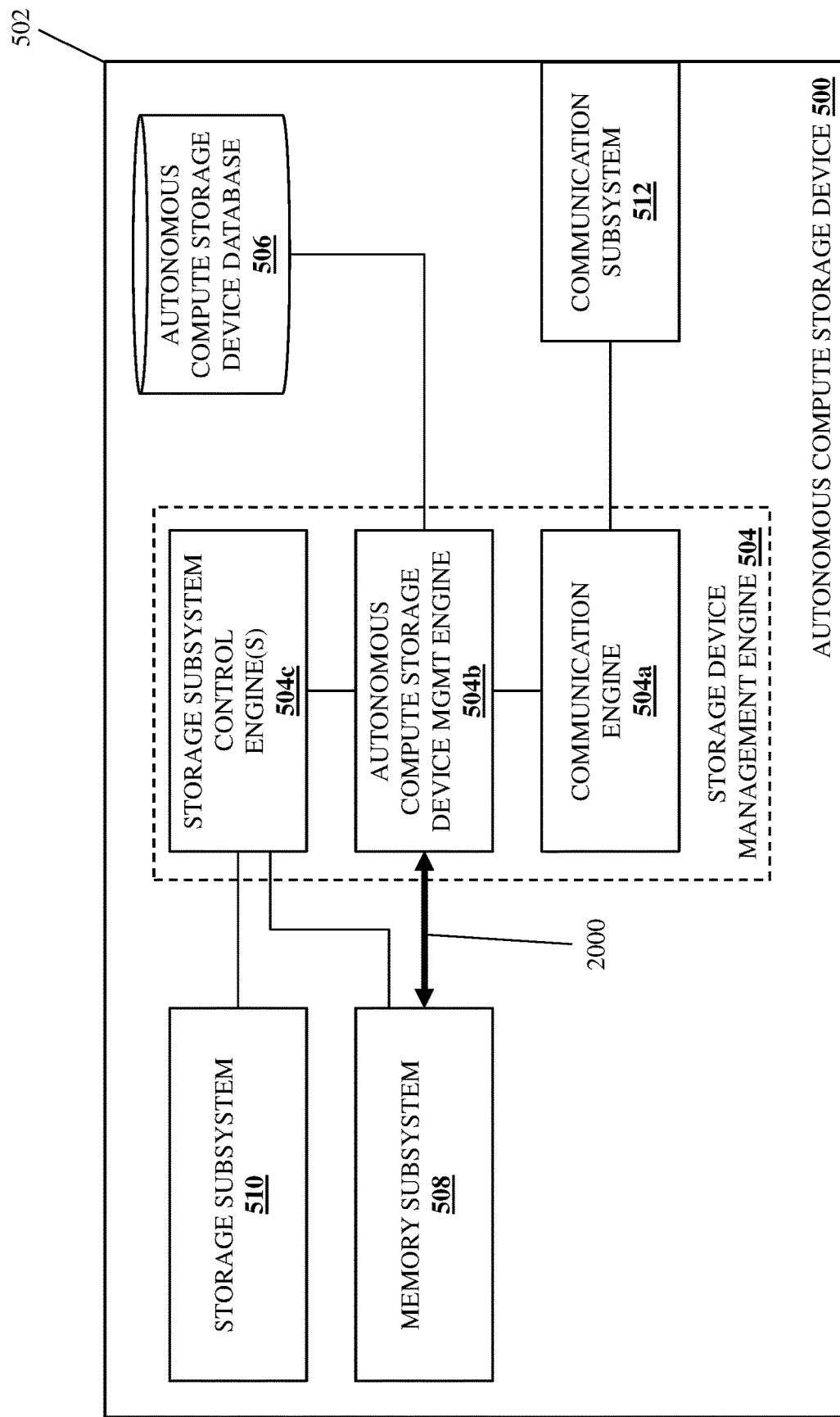
FIG. 20 is a schematic view illustrating an embodiment of the autonomous compute storage device of FIG. 5 operating during the method of FIG. 11.

With reference to FIG. 20, the autonomous compute storage device 504b may then perform autonomous compute application execution operations 2000 that may include executing the autonomous compute application corresponding to the autonomous compute signature that matched the data stored in the memory subsystem 508 as part of the storage operations performed at block 1104 in order to perform compute operations associated with that data and generate one or more compute operation results. FIG. 20 indicates the autonomous compute application execution operations 2000 as including or otherwise being performed using the data that was stored in the memory subsystem 508 as part of the storage operations performed at block 1104, but one of skill in the art in possession of the present disclosure will appreciate how data stored in the memory subsystem 508 as part of the storage operations performed at block 1104 may initiate compute operations using the autonomous compute application that need not include or otherwise be performed using that data while remaining within the scope of the present disclosure as well.

Figure 21:
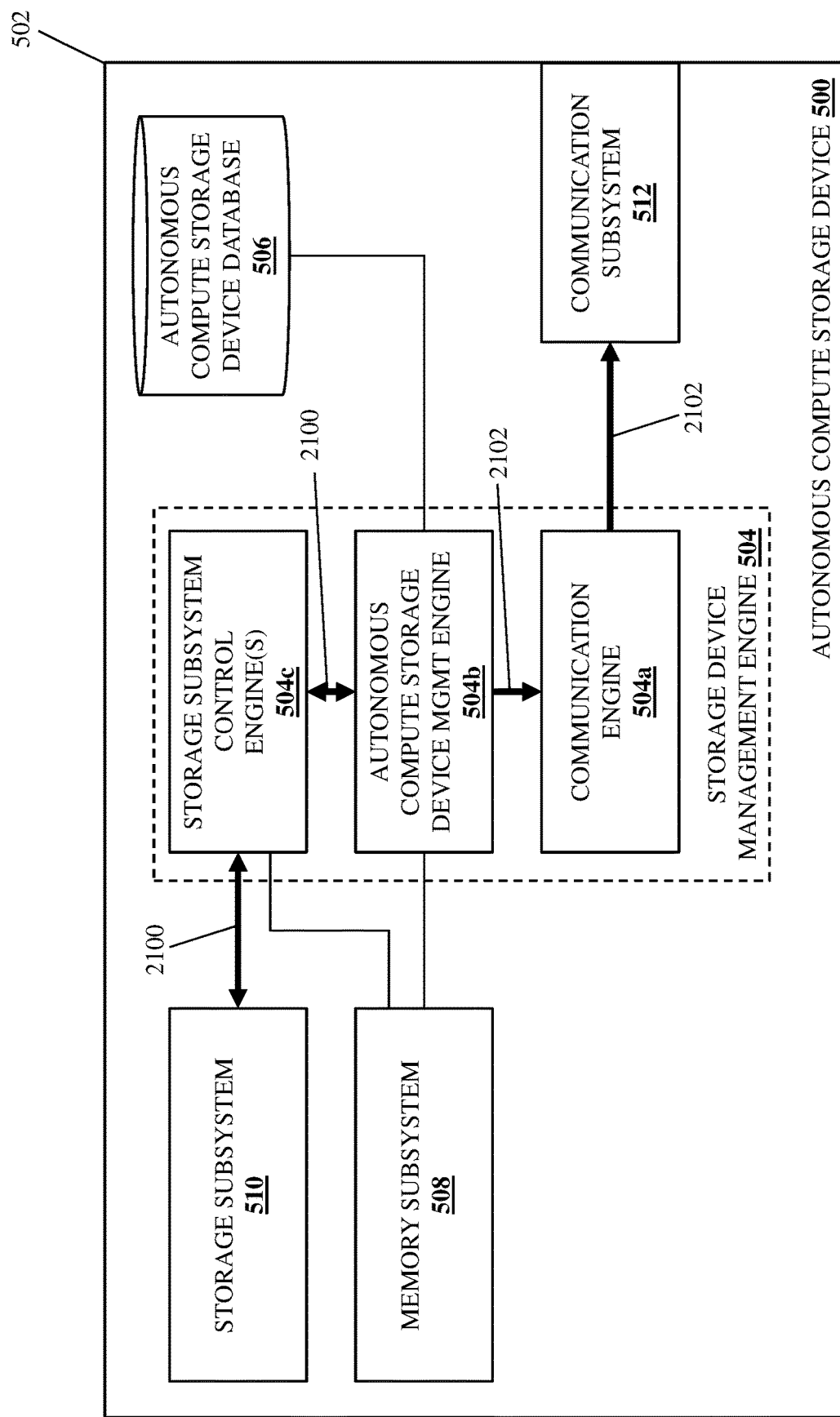
FIG. 21 is a schematic view illustrating an embodiment of the autonomous compute storage device of FIG. 5 operating during the method of FIG. 11.

To provide a specific example, the compute operations performed in response to the execution of the autonomous compute application at block 1112 may include virus scan compute operations. In this embodiment the autonomous compute signature may include a virus signature, and thus the matching of the autonomous compute signature with the data that was stored in the memory subsystem 508 as part of the storage operations at block 1104 may indicate that that data matches the virus signature included in the autonomous compute signature. With reference to FIG. 21, the execution of the autonomous compute application in this embodiment may include the autonomous compute storage device management engine 504*b* performing a variety of virus remediation compute operations 2100 via the storage subsystem control engine(s) 504*c* and with the storage subsystem 510 such as, for example, purging, deleting, erasing, and/or otherwise removing the data (i.e., the data that was stored in the memory subsystem 508 as part of the storage operations at block 1104) from the storage subsystem 510 (as well as from the memory subsystem 508), ensuring that that data will not be reconstructed (e.g., by configuring an FTL subsystem that provides the autonomous compute storage device management engine 504*b* to prevent reconstruction of that data as part of, for example, a RAID operation), generating a virus alert that may provide at least a portion of the compute operation result(s) described herein and performing compute operation result provisioning operations 2102 that may include transmitting that virus alert via the communication engine 504*a* and through the communication subsystem 512, and/or any other virus remediation actions and/or virus reporting actions that would be apparent to one of skill in the art in possession of the present disclosure.

Figure 22:
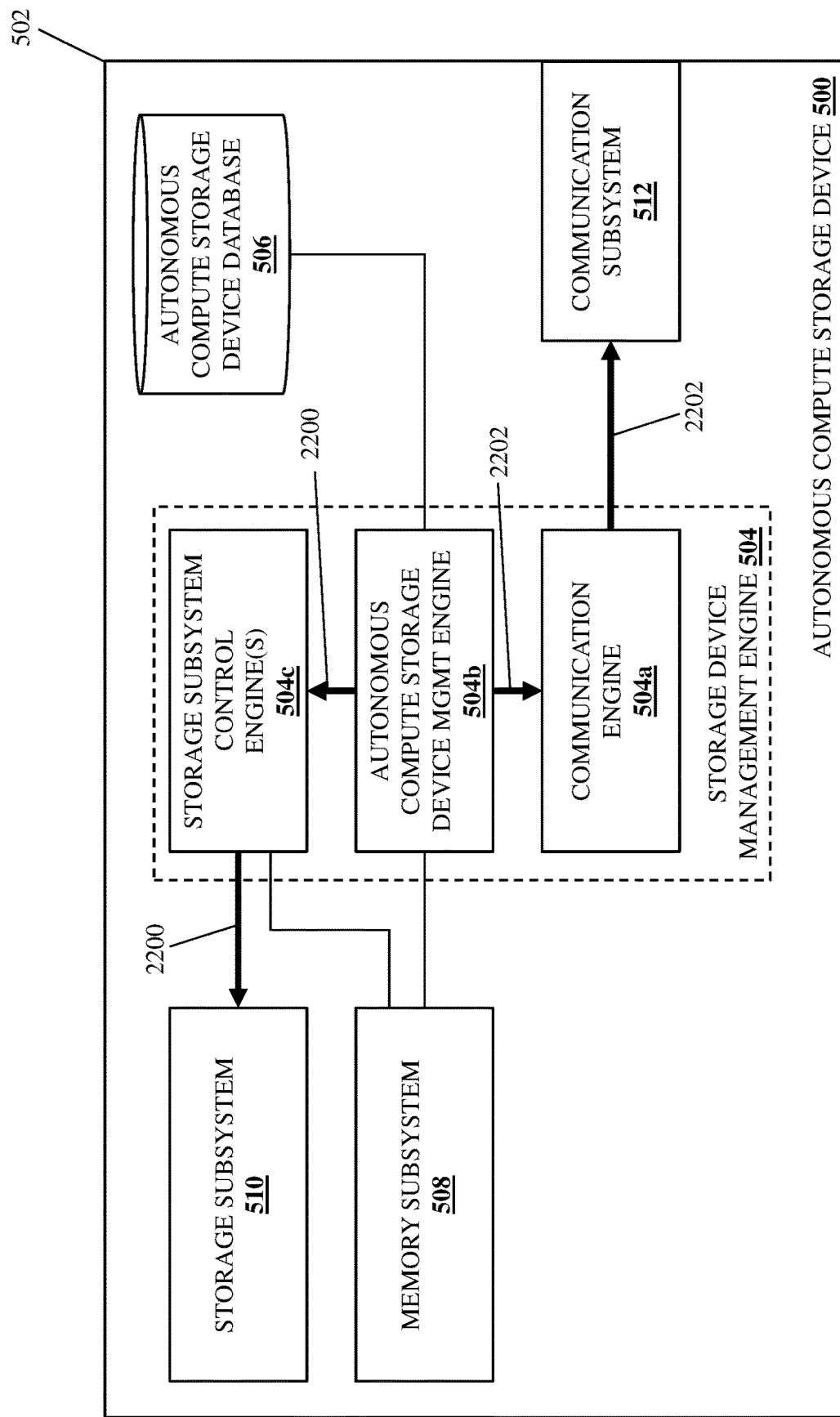
FIG. 22 is a schematic view illustrating an embodiment of the autonomous compute storage device of FIG. 5 operating during the method of FIG. 11.

To provide another specific example, the compute operations performed in response to the execution of the autonomous compute application at block 1112 may include database privacy compute operations. In this embodiment the autonomous compute signature may include a privacy/security data signature (e.g., a data format that matches a Social Security Number (SSN) format (e.g., xxx-xx-xxxx), a phone number format (e.g., (xxx) xxx-xxx), a bank account or credit card format, and/or other formats that one of skill in the art in possession of the present disclosure would recognize as being utilized by data such a Personal Identifiable Information (PII) that is associated with privacy/security issues), and thus the matching of the autonomous compute signature with the data that was stored in the memory subsystem 508 as part of the storage operations at block 1104 may indicate that that data matches the privacy/security data signature included in the autonomous compute signature. With reference to FIG. 22, the execution of the autonomous compute application in this embodiment may include the autonomous compute storage device management engine 504*b* performing a variety of privacy/security data modification compute operations 2200 via the storage subsystem control engine(s) 504*c* and with the storage subsystem 510 such as, for example, encrypting, masking, and/or otherwise obfuscating the data (i.e., the data that was stored in the memory subsystem 508 as part of the storage operations at block 1104) in the storage subsystem 510 and that is associated with privacy/security issues in order to satisfy privacy/security, governance, and/or other policies, generating a privacy/security data alert that may provide at least a portion of the compute operation result(s) described herein and performing compute operation result provisioning operations 2202 that may include transmitting that privacy/security data alert via the communication engine 504*a* and through the communication subsystem 512, and/or any other privacy/security data modification compute operations that would be apparent to one of skill in the art in possession of the present disclosure.

To provide yet another specific example, the compute operations performed in response to the execution of the autonomous compute application at block 1112 may include file system integrity check compute operations. In this embodiment the autonomous compute signature may include a file system signature (e.g., a data structure that matches a file system), and thus the matching of the autonomous compute signature with the data that was stored in the memory subsystem 508 as part of the storage operations at block 1104 may indicate that that data matches the file system signature included in the autonomous compute signature. As will be appreciated by one of skill in the art in possession of the present disclosure, such file system integrity check compute operations may be performed during boot operations or other initialization operations for the autonomous compute storage device 406/500, or during runtime for the autonomous compute storage device 406/500. With reference to FIG. 23, the execution of the autonomous compute application in this embodiment may include the autonomous compute storage device management engine 504*b* performing a variety of file system integrity verification compute operations that one of skill in the art in possession of the present disclosure will appreciate may be configured to verify the integrity of a file system, generating a file system integrity check result that may provide at least a portion of the compute operation result(s) described herein, performing compute operation result provisioning operations 2300 that may include transmitting that privacy/security data alert via the communication engine 504*a* and through the communication subsystem 512, and/or any other file system integrity check compute operations that would be apparent to one of skill in the art in possession of the present disclosure.

However, while several specific compute operations that may be performed via the execution of the autonomous compute applications of the present disclosure have been described above, one of skill in the art in possession of the present disclosure will appreciate how autonomous compute applications may be developed for execution by the autonomous compute storage device as discussed above in order to enable the performance of any desired compute operations while remaining within the scope of the present disclosure as well. For example, video stream surveillance systems may utilize video cameras to monitor a secure area, with video data generated by the video cameras (e.g., in response to detecting motion) stored on the autonomous compute storage devices of the present disclosure. As will be appreciated by one of skill in the art in possession of the present disclosure, the autonomous compute signatures and autonomous compute applications described herein may be utilized to execute an autonomous image inference application in response to an identified signature in the video data in order to, for example, recognize a face in the video data and determine an identity associated with that face, determine whether that identity is authorized to be in the area being surveilled, log that identity, append data (e.g., a timestamp, temperature, location, etc.) to the video data, etc.

Figure 24A:
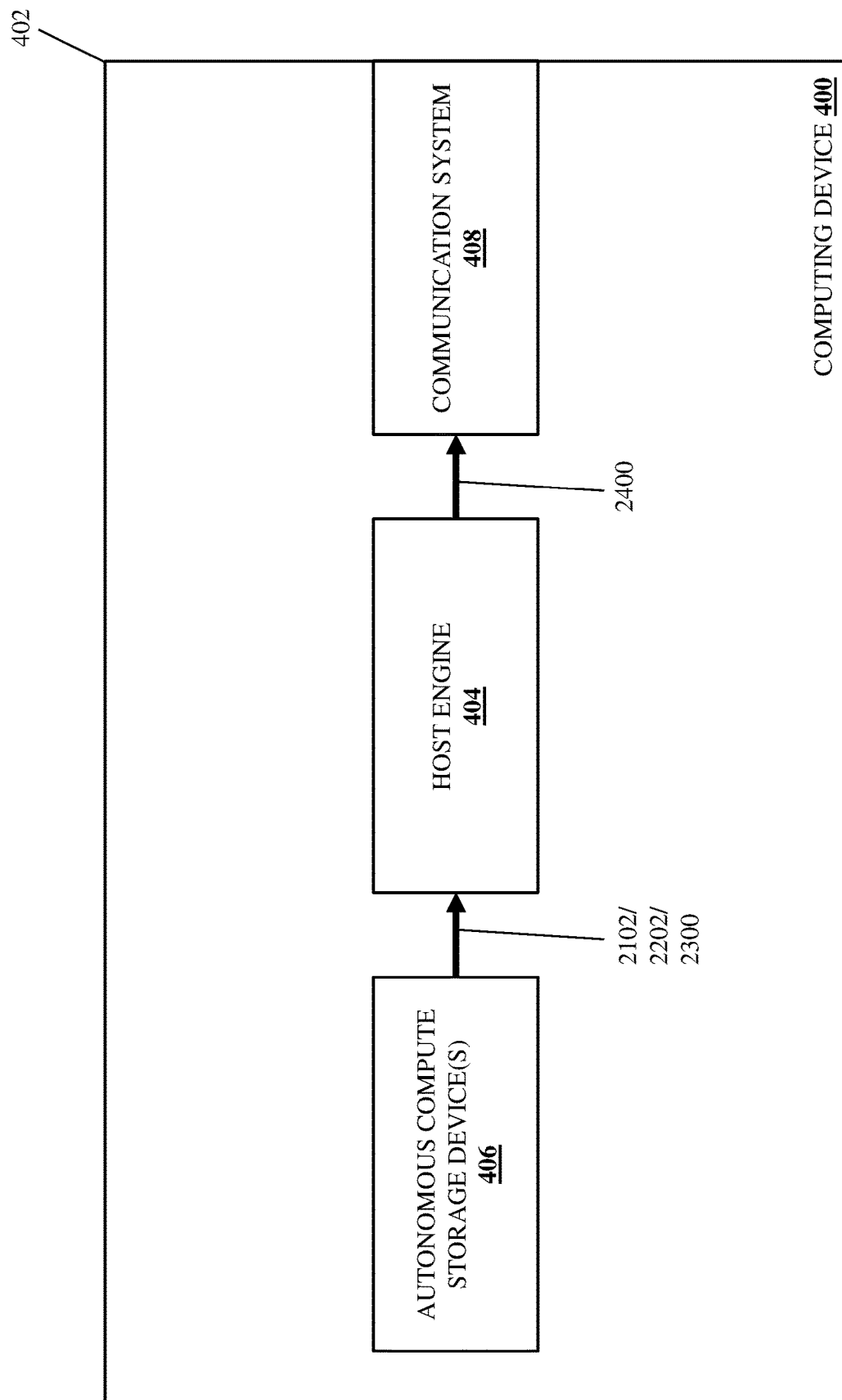
FIG. 24A is a schematic view illustrating an embodiment of the computing device of FIG. 4 operating during the method of FIG. 11.
Figure 24B:
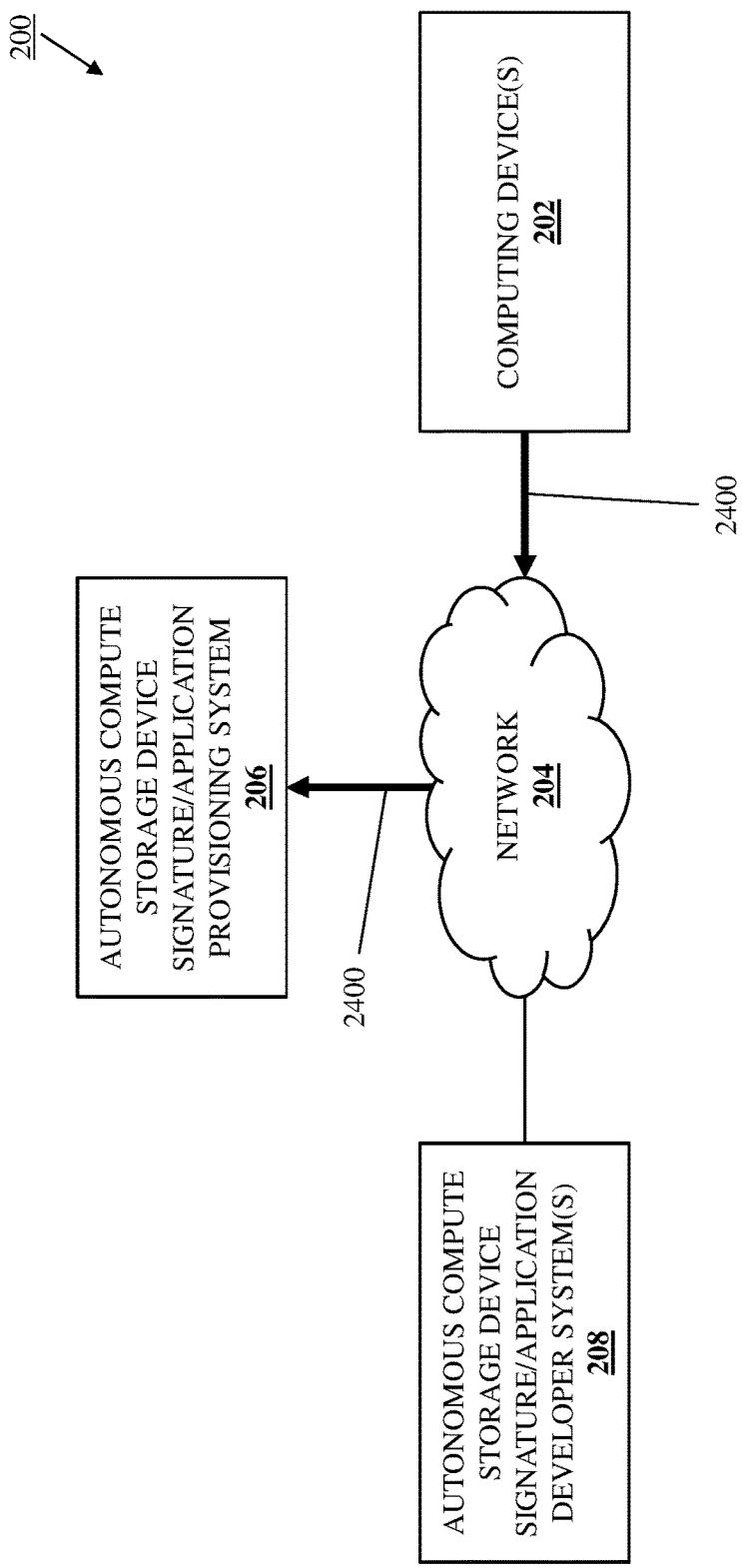
FIG. 24B is a schematic view illustrating an embodiment of the networked system of FIG. 2 operating during the method of FIG. 11.

The method 1100 then proceeds to block 1114 where the storage device transmits the compute operation result(s) via a network. With reference to FIG. 24A, in an embodiment of block 1114 and as part of compute operation result provisioning operations performed by the autonomous compute storage device management engine 504b (e.g., the compute operation result provisioning operations 2102, 2202, and/or 2300 performed in the specific examples provided above), compute operation result(s) may be transmitted by the autonomous compute storage device 406/500 to the host engine 404. As will be appreciated by one of skill in the art in possession of the present disclosure, in some embodiments the compute operations performed in response to the execution of the autonomous compute applications discussed above may only involve the provisioning of compute operation results to the host engine 404.

However, in other embodiments and in response to receiving the compute operation results, the host engine 404 may perform compute operation results transmission operations 2400 that include transmitting the compute operation results received from the autonomous compute storage device 406/500 via its communication system 408 and through the network 204 to the autonomous compute storage device signature/application provisioning system 206 such that the autonomous compute storage device signature/application provisioning engine 304 receives the compute operation results from via its communication system 308. In response to receiving the compute operation results, the autonomous compute storage device signature/application provisioning engine 304 may perform compute operation result storage operations 2402 that may include storing the compute operation results in the autonomous compute results database 306c. For example, the compute operation result storage operations 2402 may include the autonomous compute storage device signature/application provisioning engine 304 storing the compute operations results in the autonomous compute results database 306c in association with the autonomous compute application that was used to generate those autonomous compute results, although other compute operation result storage strategies are envisioned as falling within the scope of the present disclosure as well.

While the compute operation results are illustrated and described as being transmitted to the autonomous compute storage device signature/application provisioning system 206 via the host engine 404, one of skill in the art in possession of the present disclosure will appreciate how the autonomous compute storage device 406/500 may be configured to transmit the compute operation results directly to the autonomous compute storage device signature/application provisioning system 206 and without the use of the host engine 404 while remaining within the scope of the present disclosure as well. The method 1100 then returns to block 1102. As such, the method 1100 may loop such that storage operations are identified and performed such that data is stored in the memory subsystem 508 as part of those storage operations at blocks 1102 and 1104, and whenever an autonomous compute signature matches that data stored in the memory subsystem 508, an autonomous compute application is used to perform compute operations associated with that data in order to generate a compute operation result that may be transmitted via a network.

Thus, systems and methods have been described that provide storage devices that perform compute operations autonomously from the host processing system in the computing device in which they are included and on data that is subject to storage operations being performed on that data. For example, the autonomous compute storage device system of the present disclosure may include a computing device and a storage device that is included in the computing device. The storage device identifies a storage operation for a storage subsystem that is included in the storage device and, in response, performs the storage operation and stores data in a memory subsystem that is accessible to the storage device as part of the performance of the storage operation. If the storage device determines that an autonomous compute signature matches the data that was stored in the memory subsystem, it executes an autonomous compute application to perform compute operations that are associated with the data that was stored in the memory subsystem and generate at least one compute operation result. As such, storage device autonomous computing is enabled that addresses many of the issues present in conventional computational storage systems discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An autonomous compute storage device system, comprising:
   a computing device; and
   a storage device that is coupled to the computing device and that is configured to:
   perform a first background operation for a storage subsystem that is included in the storage device;
   copy, as part of the performance of the first background operation, first data from the storage subsystem to a memory subsystem that is accessible to the storage device;
   determine that a first autonomous compute signature matches the first data that was copied to the memory subsystem; and
   execute, in response to the determining that the first autonomous compute signature matches the first data that was copied to the memory subsystem during the performance of the first background operation, a first autonomous compute application to perform first compute operations that are associated with the first data that was copied to the memory subsystem during the performance of the first background operation and generate at least one first compute operation result.

2. The system of claim 1, wherein the storage device is configured to:
   receive, prior to performing the first background operation, the first autonomous compute signature.

3. The system of claim 1, wherein the storage device is configured to:
   retrieve, via a network in response to determining that the first autonomous compute signature matches the first data that was copied to the memory subsystem during the performance of the first background operation, the first autonomous compute application.

4. The system of claim 1, wherein the first background operation includes at least one of:
 a media scan background operation;
 a garbage collection background operation;
 an error recovery background operation;
 a heat map generation operation; or
 a wear leveling operation.

5. The system of claim 1, wherein the first compute operations that are associated with the first data that was copied to the memory subsystem include at least one of:
 virus scan compute operations;
 database privacy compute operations;
 file system integrity check compute operations; and
 image recognition operations.

6. The system of claim 1, wherein the storage device is configured to:
 perform a second background operation that is different than the first background operation for the storage subsystem that is included in the storage device;
 copy, as part of the performance of the second background operation, second data that is different than the first data from the storage subsystem to the memory subsystem that is accessible to the storage device;
 determine that a second autonomous compute signature that is different than the first autonomous compute signature matches the second data that was copied to the memory subsystem; and
 execute, in response to the determining that the second autonomous compute signature matches the second data that was copied to the memory subsystem during the performance of the second background operation, a second autonomous compute application that is different than the first autonomous compute application to perform second compute operations that are different than the first compute operations and that are associated with the second data that was copied to the memory subsystem during the performance of the second background operation and generate at least one second compute operation result.

7. An Information Handling System (IHS), comprising:
 a storage device chassis;
 a storage device processing system that is included in the storage device chassis; and
 a storage device memory system that is included in the storage device chassis, that is coupled to the storage device processing system, and that includes instructions that, when executed by the storage device processing system, cause the storage device processing system to provide an autonomous compute storage device engine that is configured to:
  perform a first background operation for a storage subsystem that is included in the storage device chassis;
  copy, as part of the performance of the first background operation, first data from the storage subsystem to a memory subsystem that is accessible to the autonomous compute storage device engine;
  determine that a first autonomous compute signature matches the first data that was copied to the memory subsystem; and
  execute, in response to the determining that the first autonomous compute signature matches the first data that was copied to the memory subsystem during the performance of the first background operation, a first autonomous compute application to perform first compute operations that are associated with the first data that was copied to the memory subsystem during the performance of the first background operation and generate at least one first compute operation result.

8. The IHS of claim 7, wherein autonomous compute storage device engine is configured to:
 receive, prior to performing the first background operation, the first autonomous compute signature.

9. The IHS of claim 7, wherein autonomous compute storage device engine is configured to:
 retrieve, via a network in response to determining that the first autonomous compute signature matches the first data that was copied to the memory subsystem during the performance of the first background operation, the first autonomous compute application.

10. The IHS of claim 7, wherein the first background operation includes at least one of:
 a media scan background operation;
 a garbage collection background operation;
 an error recovery background operation;
 a heat map generation operation; or
 a wear leveling operation.

11. The IHS of claim 7, wherein the first compute operations that are associated with the first data that was copied to the memory subsystem include at least one of:
 virus scan compute operations;
 database privacy compute operations;
 file system integrity check compute operations; and
 image recognition operations.

12. The IHS of claim 7, wherein autonomous compute storage device engine is configured to:
 perform a second background operation that is different than the first background operation for the storage subsystem that is included in the storage device chassis;
 copy, as part of the performance of the second background operation, second data that is different than the first data from the storage subsystem to the memory subsystem that is accessible to the autonomous compute storage device engine;
 determine that a second autonomous compute signature that is different than the first autonomous compute signature matches the second data that was copied to the memory subsystem; and
 execute, in response to the determining that the second autonomous compute signature matches the second data that was copied to the memory subsystem during the performance of the second background operation, a second autonomous compute application that is different than the first autonomous compute application to perform second compute operations that are different than the first compute operations and that are associated with the second data that was copied to the memory subsystem during the performance of the second background operation and generate at least one second compute operation result.

13. The IHS of claim 7, wherein the IHS is a Non-Volatile Memory express (NVMe) storage device.

14. A method for autonomously performing compute operations using a storage device based on background operations performed in the storage device, comprising:
 performing, by a storage device, a first background operation for a storage subsystem that is included in the storage device;

copying, by the storage device as part of the performance of the first background operation, first data from the storage subsystem to a memory subsystem that is accessible to the storage device;

determining, by the storage device, that a first autonomous compute signature matches the first data that was copied to the memory subsystem; and executing, by the storage device in response to the determining that the first autonomous compute signature matches the first data that was copied to the memory subsystem during the performance of the first background operation, a first autonomous compute application to perform first compute operations that are associated with the first data that was copied to the memory subsystem during the performance of the first background operation and generate at least one first compute operation result.

15. The method of claim 14, further comprising:

receiving, by the storage device prior to performing the first background operation, the first autonomous compute signature.

16. The method of claim 14, further comprising:

retrieving, by the storage device via a network in response to determining that the first autonomous compute signature matches the first data that was copied to the memory subsystem during the performance of the first background operation, the first autonomous compute application.

17. The method of claim 14, wherein the first background operation includes at least one of:

a media scan background operation;

a garbage collection background operation;

an error recovery background operation;

a heat map generation operation; or a wear leveling operation.

18. The method of claim 14, wherein the first compute operations that are associated with the first data that was copied to the memory subsystem include at least one of:

virus scan compute operations;

database privacy compute operations;

file system integrity check compute operations; and image recognition operations.

19. The method of claim 14, further comprising:

performing, by the storage device, a second background operation that is different than the first background operation for the storage subsystem that is included in the storage device;

copying, by the storage device as part of the performance of the second background operation, second data that is different than the first data from the storage subsystem to the memory subsystem that is accessible to the storage device;

determining, by the storage device, that a second autonomous compute signature that is different than the first autonomous compute signature matches the second data that was copied to the memory subsystem; and executing, by the storage device in response to the determining that the second autonomous compute signature matches the second data that was copied to the memory subsystem during the performance of the second background operation, a second autonomous compute application that is different than the first autonomous compute application to perform second compute operations that are different than the first compute operations and that are associated with the second data that was copied to the memory subsystem during the performance of the second background operation and generate at least one second compute operation result.

20. The method of claim 14, wherein the storage device is a Non-Volatile Memory express (NVMe) storage device.

* * * * *